US008305751B2

(12) United States Patent
Merrow

(10) Patent No.: US 8,305,751 B2
(45) Date of Patent: Nov. 6, 2012

(54) VIBRATION ISOLATION WITHIN DISK DRIVE TESTING SYSTEMS

(75) Inventor: Brian S. Merrow, Harvard, MA (US)

(73) Assignee: Teradyne, Inc., North Reading, MA (US)

( * ) Notice: Subject to any disclaimer, the term of this patent is extended or adjusted under 35 U.S.C. 154(b) by 601 days.

(21) Appl. No.: 12/105,105

(22) Filed: Apr. 17, 2008

(65) Prior Publication Data

US 2009/0261229 A1 Oct. 22, 2009

(51) Int. Cl.
*H05K 7/00* (2006.01)
*H05K 1/00* (2006.01)
*A47B 81/00* (2006.01)

(52) U.S. Cl. ......... 361/679.37; 361/679.33; 361/679.34; 361/679.35; 361/679.36; 361/679.38; 439/60; 312/223.1; 312/223.2

(58) Field of Classification Search .. 361/679.31–679.4, 361/679.55–679.6, 724–727; 312/223.1, 312/223.2; 212/26; 439/60, 151–160, 327, 439/328, 331; 369/75.11, 75.21, 76, 77.11, 369/77.21, 78, 79, 80, 81, 82
See application file for complete search history.

(56) References Cited

U.S. PATENT DOCUMENTS

| 557,186 | A | 3/1896 | Cahill |
| 2,224,407 | A | 12/1940 | Passur |
| 2,380,026 | A | 7/1945 | Clarke |
| 2,631,775 | A | 3/1953 | Gordon |
| 2,635,524 | A | 4/1953 | Jenkins |
| 3,120,166 | A | 2/1964 | Lyman | 98/39 |
| 3,360,032 | A | 9/1965 | Sherwood | |
| 3,364,838 | A | 1/1968 | Bradley | |
| 3,517,601 | A | 6/1970 | Courchesne | |
| 3,845,286 | A | 10/1974 | Aronstein et al. | |
| 4,147,299 | A | 4/1979 | Freeman | |
| 4,233,644 | A | 11/1980 | Hwang et al. | 361/384 |
| 4,336,748 | A | 6/1982 | Martin et al. | 98/33 |
| 4,379,259 | A | 4/1983 | Varadi et al. | 324/73 |
| 4,477,127 | A | 10/1984 | Kume | 312/8 |

(Continued)

FOREIGN PATENT DOCUMENTS

AU 583713 5/1989

(Continued)

OTHER PUBLICATIONS

Abramovitch, "Rejecting Rotational Disturbances on Small Disk Drives Using Rotational Accelerometers", Proceedings of the 1996 IFAC World Congress in San Francisco, CA, Jul. 1996 http://dabramovitch.com/pubs/amrfac_matj.pdf.

(Continued)

*Primary Examiner* — Jayprakash N Gandhi
*Assistant Examiner* — Jerry Wu
(74) *Attorney, Agent, or Firm* — Fish & Richardson P.C.

(57) ABSTRACT

A disk drive test slot includes a housing that defines a test compartment for receiving and supporting a disk drive transporter carrying a disk drive for testing. The housing also defines an open end that provides access to the test compartment for insertion and removal of disk drive transporter carrying a disk drive for testing. The disk drive test slot also includes a mounting plate connected to the housing. One or more isolators are disposed between the housing and the mounting plate. The one or more isolators are operable to inhibit transmission of vibrational energy between the housing and the mounting plate.

24 Claims, 41 Drawing Sheets

U.S. PATENT DOCUMENTS

| | | | |
|---|---|---|---|
| 4,495,545 A | 1/1985 | Dufresne et al. | 361/384 |
| 4,526,318 A | 7/1985 | Fleming et al. | 236/49 |
| 4,620,248 A | 10/1986 | Gitzendanner | 360/97 |
| 4,648,007 A | 3/1987 | Garner | 361/384 |
| 4,654,732 A | 3/1987 | Mesher | |
| 4,665,455 A | 5/1987 | Mesher | |
| 4,683,424 A | 7/1987 | Cutright et al. | |
| 4,685,303 A | 8/1987 | Branc et al. | 62/3 |
| 4,688,124 A | 8/1987 | Scribner et al. | |
| 4,713,714 A | 12/1987 | Gatti et al. | 360/137 |
| 4,739,444 A | 4/1988 | Zushi et al. | 361/383 |
| 4,754,397 A | 6/1988 | Varaiya et al. | 364/200 |
| 4,768,285 A | 9/1988 | Woodman, Jr. | |
| 4,778,063 A | 10/1988 | Ueberreiter | |
| 4,801,234 A | 1/1989 | Cedrone | |
| 4,809,881 A | 3/1989 | Becker | |
| 4,817,273 A | 4/1989 | Lape et al. | |
| 4,817,934 A | 4/1989 | McCormick et al. | |
| 4,851,965 A | 7/1989 | Gabuzda et al. | 361/383 |
| 4,881,591 A | 11/1989 | Rignall | 165/26 |
| 4,888,549 A | 12/1989 | Wilson et al. | 324/73 R |
| 4,911,281 A | 3/1990 | Jenkner | |
| 4,967,155 A | 10/1990 | Magnuson | 324/212 |
| 5,012,187 A | 4/1991 | Littlebury | 324/158 |
| 5,045,960 A | 9/1991 | Eding | |
| 5,061,630 A | 10/1991 | Knopf et al. | 435/290 |
| 5,119,270 A | 6/1992 | Bolton et al. | 361/384 |
| 5,122,914 A | 6/1992 | Hanson | 360/98.01 |
| 5,127,684 A | 7/1992 | Klotz et al. | 292/113 |
| 5,128,813 A | 7/1992 | Lee | |
| 5,136,395 A | 8/1992 | Ishii et al. | |
| 5,158,132 A | 10/1992 | Guillemot | 165/30 |
| 5,168,424 A | 12/1992 | Bolton et al. | 361/384 |
| 5,171,183 A | 12/1992 | Pollard et al. | 454/184 |
| 5,173,819 A | 12/1992 | Takahashi et al. | 360/97.03 |
| 5,176,202 A | 1/1993 | Richard | 165/48.1 |
| 5,205,132 A | 4/1993 | Fu | |
| 5,206,772 A | 4/1993 | Hirano et al. | |
| 5,207,613 A | 5/1993 | Ferchau et al. | 454/184 |
| 5,210,680 A | 5/1993 | Scheibler | 361/384 |
| 5,237,484 A | 8/1993 | Ferchau et al. | 361/689 |
| 5,263,537 A | 11/1993 | Plucinski et al. | 165/97 |
| 5,269,698 A | 12/1993 | Singer | 439/157 |
| 5,295,392 A | 3/1994 | Hensel et al. | |
| 5,309,323 A | 5/1994 | Gray et al. | 361/726 |
| 5,325,263 A | 6/1994 | Singer et al. | 361/683 |
| 5,349,486 A | 9/1994 | Sugimoto et al. | 360/97.01 |
| 5,368,072 A | 11/1994 | Cote | 137/872 |
| 5,374,395 A | 12/1994 | Robinson et al. | |
| 5,379,229 A | 1/1995 | Parsons et al. | |
| 5,398,058 A | 3/1995 | Hattori | |
| 5,412,534 A | 5/1995 | Cutts et al. | 361/695 |
| 5,414,591 A | 5/1995 | Kimura et al. | 361/695 |
| 5,426,581 A | 6/1995 | Kishi et al. | 364/167.01 |
| 5,469,037 A | 11/1995 | McMurtrey, Sr. et al. | 318/626 |
| 5,477,416 A | 12/1995 | Schkrohowsky et al. | 361/695 |
| 5,484,012 A | 1/1996 | Hiratsuka | 165/40 |
| 5,486,681 A | 1/1996 | Dagnac et al. | |
| 5,491,610 A | 2/1996 | Mok et al. | 361/695 |
| 5,543,727 A | 8/1996 | Bushard et al. | |
| 5,546,250 A | 8/1996 | Diel | 360/97.02 |
| 5,557,186 A | 9/1996 | McMurtrey, Sr. et al. | 318/626 |
| 5,563,768 A | 10/1996 | Perdue | 361/695 |
| 5,570,740 A | 11/1996 | Flores et al. | |
| 5,593,380 A | 1/1997 | Bittikofer | |
| 5,601,141 A | 2/1997 | Gordon et al. | 165/263 |
| 5,604,662 A | 2/1997 | Anderson et al. | 361/685 |
| 5,610,893 A | 3/1997 | Soga et al. | 369/84 |
| 5,617,430 A | 4/1997 | Angelotti et al. | |
| 5,644,705 A | 7/1997 | Stanley | 395/183.18 |
| 5,646,918 A | 7/1997 | Dimitri et al. | |
| 5,654,846 A | 8/1997 | Wicks et al. | 360/97.01 |
| 5,673,029 A | 9/1997 | Behl et al. | 340/635 |
| 5,694,290 A | 12/1997 | Chang | 361/685 |
| 5,718,627 A | 2/1998 | Wicks | 454/68 |
| 5,718,628 A | 2/1998 | Nakazato et al. | 454/184 |
| 5,731,928 A | 3/1998 | Jabbari et al. | |
| 5,751,549 A | 5/1998 | Eberhardt et al. | 361/687 |
| 5,754,365 A | 5/1998 | Beck et al. | |
| 5,761,032 A | 6/1998 | Jones | 361/685 |
| 5,793,610 A | 8/1998 | Schmitt et al. | 361/695 |
| 5,811,678 A | 9/1998 | Hirano | 73/461 |
| 5,812,761 A | 9/1998 | Seki et al. | 395/185.07 |
| 5,819,842 A | 10/1998 | Potter et al. | 165/206 |
| 5,831,525 A | 11/1998 | Harvey | 340/507 |
| 5,851,143 A | 12/1998 | Hamid | 454/57 |
| 5,859,409 A | 1/1999 | Kim et al. | 219/400 |
| 5,859,540 A | 1/1999 | Fukumoto | 324/760 |
| 5,862,037 A | 1/1999 | Behl | 361/687 |
| 5,870,630 A | 2/1999 | Reasoner et al. | 395/894 |
| 5,886,639 A | 3/1999 | Behl et al. | 340/635 |
| 5,890,959 A | 4/1999 | Pettit et al. | 454/184 |
| 5,912,799 A | 6/1999 | Grouell et al. | 361/685 |
| 5,913,926 A | 6/1999 | Anderson et al. | 714/6 |
| 5,914,856 A | 6/1999 | Morton et al. | 361/690 |
| 5,927,386 A | 7/1999 | Lin | 165/80.3 |
| 5,956,301 A | 9/1999 | Dimitri et al. | |
| 5,959,834 A | 9/1999 | Chang | 361/685 |
| 5,999,356 A | 12/1999 | Dimitri et al. | 360/71 |
| 5,999,365 A | 12/1999 | Hasegawa et al. | 360/97.02 |
| 6,000,623 A | 12/1999 | Blatti et al. | 236/49.3 |
| 6,005,404 A | 12/1999 | Cochran et al. | 324/760 |
| 6,005,770 A | 12/1999 | Schmitt | 361/695 |
| 6,008,636 A | 12/1999 | Miller et al. | |
| 6,008,984 A | 12/1999 | Cunningham et al. | 361/685 |
| 6,011,689 A | 1/2000 | Wrycraft | 361/695 |
| 6,031,717 A | 2/2000 | Baddour et al. | 361/687 |
| 6,034,870 A | 3/2000 | Osborn et al. | 361/690 |
| 6,042,348 A | 3/2000 | Aakalu et al. | 417/423.5 |
| 6,045,113 A | 4/2000 | Itakura | |
| 6,055,814 A | 5/2000 | Song | |
| 6,066,822 A | 5/2000 | Nemoto et al. | |
| 6,067,225 A | 5/2000 | Reznikov et al. | 361/685 |
| 6,069,792 A | 5/2000 | Nelik | 361/687 |
| 6,084,768 A | 7/2000 | Bolognia | 361/685 |
| 6,094,342 A | 7/2000 | Dague et al. | 361/685 |
| 6,104,607 A | 8/2000 | Behl | 361/687 |
| 6,115,250 A | 9/2000 | Schmitt | 361/695 |
| 6,122,131 A | 9/2000 | Jeppson | |
| 6,122,232 A | 9/2000 | Schell et al. | |
| 6,124,707 A | 9/2000 | Kim et al. | 324/158.1 |
| 6,130,817 A | 10/2000 | Flotho et al. | 361/685 |
| 6,144,553 A | 11/2000 | Hileman et al. | 361/687 |
| 6,166,901 A | 12/2000 | Gamble et al. | 361/685 |
| 6,169,413 B1 | 1/2001 | Pack et al. | 324/760 |
| 6,169,930 B1 | 1/2001 | Blachek et al. | |
| 6,177,805 B1 | 1/2001 | Pih | 324/754 |
| 6,178,835 B1 | 1/2001 | Orriss et al. | 73/865.9 |
| 6,181,557 B1 | 1/2001 | Gatti | 361/695 |
| 6,185,065 B1 | 2/2001 | Hasegawa et al. | 360/97.02 |
| 6,185,097 B1 | 2/2001 | Behl | 361/695 |
| 6,188,191 B1 | 2/2001 | Frees et al. | |
| 6,192,282 B1 | 2/2001 | Smith et al. | |
| 6,193,339 B1 | 2/2001 | Behl et al. | 312/223.2 |
| 6,209,842 B1 | 4/2001 | Anderson et al. | 248/560 |
| 6,227,516 B1 | 5/2001 | Webster, Jr. et al. | 248/694 |
| 6,229,275 B1 | 5/2001 | Yamamoto | |
| 6,231,145 B1 | 5/2001 | Liu | 312/332.1 |
| 6,233,148 B1 | 5/2001 | Shen | |
| 6,236,563 B1 | 5/2001 | Buican et al. | 361/685 |
| 6,247,944 B1 | 6/2001 | Bolognia et al. | 439/157 |
| 6,249,824 B1 | 6/2001 | Henrichs | |
| 6,252,769 B1 | 6/2001 | Tullstedt et al. | 361/694 |
| 6,262,863 B1 | 7/2001 | Ostwald et al. | |
| 6,272,007 B1 | 8/2001 | Kitlas et al. | |
| 6,272,767 B1 | 8/2001 | Botruff et al. | |
| 6,281,677 B1 | 8/2001 | Cosci et al. | 324/212 |
| 6,282,501 B1 | 8/2001 | Assouad | 702/117 |
| 6,285,524 B1 | 9/2001 | Boigenzahn et al. | |
| 6,289,678 B1 | 9/2001 | Pandolfi | 62/3.2 |
| 6,297,950 B1 | 10/2001 | Erwin | 361/685 |
| 6,298,672 B1 | 10/2001 | Valicoff, Jr. | |
| 6,302,714 B1 | 10/2001 | Bolognia et al. | 439/157 |
| 6,304,839 B1 | 10/2001 | Ho et al. | 703/18 |
| 6,307,386 B1 | 10/2001 | Fowler et al. | |
| 6,327,150 B1 | 12/2001 | Levy et al. | 361/724 |
| 6,330,154 B1 | 12/2001 | Fryers et al. | 361/695 |

| Patent No. | Date | Inventor | Class |
|---|---|---|---|
| 6,351,379 B1 | 2/2002 | Cheng | 361/685 |
| 6,354,792 B1 | 3/2002 | Kobayashi et al. | |
| 6,356,409 B1 | 3/2002 | Price et al. | 360/98.07 |
| 6,356,415 B1 | 3/2002 | Kabasawa | 360/256.3 |
| 6,384,995 B1 | 5/2002 | Smith | 360/31 |
| 6,388,437 B1 | 5/2002 | Wolski et al. | |
| 6,388,875 B1 | 5/2002 | Chen | 361/685 |
| 6,388,878 B1 | 5/2002 | Chang | 361/687 |
| 6,389,225 B1 | 5/2002 | Malinoski et al. | 392/479 |
| 6,411,584 B2 | 6/2002 | Davis et al. | |
| 6,421,236 B1 | 7/2002 | Montoya et al. | 361/685 |
| 6,434,000 B1 | 8/2002 | Pandolfi | 361/685 |
| 6,434,498 B1 | 8/2002 | Ulrich et al. | 702/115 |
| 6,434,499 B1 | 8/2002 | Ulrich et al. | 702/115 |
| 6,464,080 B1 | 10/2002 | Morris et al. | 306/591 |
| 6,467,153 B2 | 10/2002 | Butts et al. | 29/603.03 |
| 6,473,297 B1 | 10/2002 | Behl et al. | 361/685 |
| 6,473,301 B1 | 10/2002 | Levy et al. | 361/685 |
| 6,476,627 B1 | 11/2002 | Pelissier et al. | 324/760 |
| 6,477,044 B2 | 11/2002 | Foley et al. | |
| 6,477,442 B1 | 11/2002 | Valerino, Sr. | |
| 6,480,380 B1 | 11/2002 | French et al. | 361/690 |
| 6,480,382 B2 | 11/2002 | Cheng | 361/695 |
| 6,487,071 B1 | 11/2002 | Tata et al. | 361/685 |
| 6,489,793 B2 | 12/2002 | Jones et al. | 324/760 |
| 6,494,663 B2 | 12/2002 | Ostwald et al. | |
| 6,525,933 B2 | 2/2003 | Eland | 361/686 |
| 6,526,841 B1 | 3/2003 | Wanek et al. | 73/865.6 |
| 6,535,384 B2 | 3/2003 | Huang | 361/695 |
| 6,537,013 B2 | 3/2003 | Emberty et al. | |
| 6,544,309 B1 | 4/2003 | Hoefer et al. | 55/283 |
| 6,546,445 B1 | 4/2003 | Hayes | 710/305 |
| 6,553,532 B1 | 4/2003 | Aoki | |
| 6,560,107 B1 | 5/2003 | Beck et al. | |
| 6,565,163 B2 | 5/2003 | Behl et al. | 312/223.1 |
| 6,566,859 B2 | 5/2003 | Wolski et al. | 324/158.1 |
| 6,567,266 B2 | 5/2003 | Ives et al. | |
| 6,570,734 B2 | 5/2003 | Ostwald et al. | |
| 6,577,586 B1 | 6/2003 | Yang et al. | |
| 6,577,687 B2 | 6/2003 | Hall et al. | |
| 6,618,254 B2 | 9/2003 | Ives | |
| 6,626,846 B2 | 9/2003 | Spencer | |
| 6,628,518 B2 | 9/2003 | Behl et al. | 361/687 |
| 6,635,115 B1 | 10/2003 | Fairbairn et al. | |
| 6,640,235 B1 | 10/2003 | Anderson | 708/100 |
| 6,644,982 B1 | 11/2003 | Ondricek et al. | |
| 6,651,192 B1 | 11/2003 | Viglione et al. | 714/47 |
| 6,654,240 B1 | 11/2003 | Tseng et al. | 361/685 |
| 6,679,128 B2 | 1/2004 | Wanek et al. | 73/865.6 |
| 6,693,757 B2 | 2/2004 | Hayakawa et al. | 360/69 |
| 6,741,529 B1 | 5/2004 | Getreuer | |
| 6,746,648 B1 | 6/2004 | Mattila et al. | |
| 6,751,093 B1 | 6/2004 | Hsu et al. | 361/685 |
| 6,791,785 B1 | 9/2004 | Messenger et al. | |
| 6,791,799 B2 | 9/2004 | Fletcher | 360/255 |
| 6,798,651 B2 | 9/2004 | Syring et al. | 361/685 |
| 6,798,972 B1 | 9/2004 | Ito et al. | |
| 6,801,834 B1 | 10/2004 | Konshak et al. | |
| 6,806,700 B2 | 10/2004 | Wanek et al. | 324/158.1 |
| 6,811,427 B2 | 11/2004 | Garrett et al. | 439/378 |
| 6,826,046 B1 | 11/2004 | Muncaster et al. | 361/687 |
| 6,830,372 B2 | 12/2004 | Liu et al. | 374/57 |
| 6,832,929 B2 | 12/2004 | Garrett et al. | 439/378 |
| 6,861,861 B2 | 3/2005 | Song et al. | |
| 6,862,173 B1 | 3/2005 | Konshak et al. | |
| 6,867,939 B2 | 3/2005 | Katahara et al. | 360/53 |
| 6,892,328 B2 | 5/2005 | Klein et al. | 714/42 |
| 6,904,479 B2 | 6/2005 | Hall et al. | |
| 6,908,330 B2 | 6/2005 | Garrett et al. | 439/378 |
| 6,928,336 B2 | 8/2005 | Peshkin et al. | |
| 6,937,432 B2 | 8/2005 | Sri-Jayantha et al. | 360/97.01 |
| 6,957,291 B2 | 10/2005 | Moon et al. | |
| 6,965,811 B2 | 11/2005 | Dickey et al. | |
| 6,974,017 B2 | 12/2005 | Oseguera | |
| 6,976,190 B1 | 12/2005 | Goldstone | 714/42 |
| 6,980,381 B2 | 12/2005 | Gray et al. | 360/31 |
| 6,982,872 B2 | 1/2006 | Behl et al. | 361/687 |
| 7,006,325 B2 | 2/2006 | Emberty et al. | |
| 7,039,924 B2 | 5/2006 | Goodman et al. | |
| 7,054,150 B2 | 5/2006 | Orriss et al. | 361/685 |
| 7,070,323 B2 | 7/2006 | Wanek et al. | 374/45 |
| 7,076,391 B1 | 7/2006 | Pakzad et al. | 702/118 |
| 7,077,614 B1 | 7/2006 | Hasper et al. | |
| 7,088,541 B2 | 8/2006 | Orriss et al. | 360/71 |
| 7,092,251 B1 * | 8/2006 | Henry | 361/679.36 |
| 7,106,582 B2 | 9/2006 | Albrecht et al. | 361/685 |
| 7,123,477 B2 | 10/2006 | Coglitore et al. | |
| 7,126,777 B2 | 10/2006 | Flechsig et al. | 360/59 |
| 7,130,138 B2 | 10/2006 | Lum et al. | 360/31 |
| 7,134,553 B2 | 11/2006 | Stephens | |
| 7,139,145 B1 | 11/2006 | Archibald et al. | 360/53 |
| 7,164,579 B2 | 1/2007 | Muncaster et al. | 361/685 |
| 7,167,360 B2 | 1/2007 | Inoue et al. | |
| 7,181,458 B1 | 2/2007 | Higashi | |
| 7,203,021 B1 | 4/2007 | Ryan et al. | |
| 7,203,060 B2 | 4/2007 | Kay et al. | 361/685 |
| 7,206,201 B2 | 4/2007 | Behl et al. | |
| 7,216,968 B2 | 5/2007 | Smith et al. | |
| 7,219,028 B2 | 5/2007 | Bae et al. | |
| 7,219,273 B2 | 5/2007 | Fisher et al. | |
| 7,227,746 B2 | 6/2007 | Tanaka et al. | 361/685 |
| 7,232,101 B2 | 6/2007 | Wanek et al. | 248/346.06 |
| 7,243,043 B2 | 7/2007 | Shin | |
| 7,248,467 B2 | 7/2007 | Sri-Jayantha et al. | 361/685 |
| 7,259,966 B2 | 8/2007 | Connelly, Jr. et al. | 361/727 |
| 7,273,344 B2 | 9/2007 | Ostwald et al. | |
| 7,280,353 B2 | 10/2007 | Wendel et al. | |
| 7,289,885 B2 | 10/2007 | Basham et al. | |
| 7,304,855 B2 | 12/2007 | Milligan et al. | 361/724 |
| 7,315,447 B2 | 1/2008 | Inoue et al. | |
| 7,349,205 B2 | 3/2008 | Hall et al. | |
| 7,353,524 B1 | 4/2008 | Lin et al. | |
| 7,385,385 B2 | 6/2008 | Magliocco et al. | |
| 7,395,133 B2 | 7/2008 | Lowe | |
| 7,403,451 B2 | 7/2008 | Goodman et al. | |
| 7,421,623 B2 | 9/2008 | Haugh | 714/47 |
| 7,437,212 B2 | 10/2008 | Farchmin et al. | |
| 7,447,011 B2 | 11/2008 | Wade et al. | |
| 7,457,112 B2 | 11/2008 | Fukuda et al. | |
| 7,467,024 B2 | 12/2008 | Flitsch | |
| 7,476,362 B2 | 1/2009 | Angros | 422/100 |
| 7,483,269 B1 | 1/2009 | Marvin, Jr. et al. | |
| 7,505,264 B2 | 3/2009 | Hall et al. | |
| 7,554,811 B2 | 6/2009 | Scicluna et al. | |
| 7,568,122 B2 | 7/2009 | Mechalke et al. | |
| 7,570,455 B2 | 8/2009 | Deguchi et al. | |
| 7,573,715 B2 | 8/2009 | Mojaver et al. | |
| 7,584,851 B2 | 9/2009 | Hong et al. | |
| 7,612,996 B2 | 11/2009 | Atkins et al. | |
| 7,625,027 B2 | 12/2009 | Kiaie et al. | |
| 7,630,196 B2 | 12/2009 | Hall et al. | |
| 7,643,289 B2 | 1/2010 | Ye et al. | |
| 7,646,596 B2 | 1/2010 | Ng | |
| 7,729,107 B2 | 6/2010 | Atkins et al. | |
| 2001/0006453 A1 | 7/2001 | Glorioso et al. | 361/685 |
| 2001/0044023 A1 | 11/2001 | Johnson et al. | |
| 2001/0046118 A1 | 11/2001 | Yamanashi et al. | 361/687 |
| 2001/0048590 A1 | 12/2001 | Behl et al. | |
| 2002/0030981 A1 | 3/2002 | Sullivan et al. | |
| 2002/0044416 A1 | 4/2002 | Harmon, III et al. | 361/685 |
| 2002/0051338 A1 | 5/2002 | Jiang et al. | |
| 2002/0071248 A1 | 6/2002 | Huang et al. | 361/685 |
| 2002/0079422 A1 | 6/2002 | Jiang | |
| 2002/0090320 A1 | 7/2002 | Burow et al. | |
| 2002/0116087 A1 | 8/2002 | Brown | |
| 2002/0161971 A1 | 10/2002 | Dimitri et al. | 711/114 |
| 2002/0172004 A1 | 11/2002 | Ives et al. | 361/685 |
| 2003/0035271 A1 | 2/2003 | Lelong et al. | 361/724 |
| 2003/0043550 A1 | 3/2003 | Ives | 361/726 |
| 2003/0206397 A1 | 11/2003 | Allgeyer et al. | 361/685 |
| 2004/0165489 A1 | 8/2004 | Goodman et al. | |
| 2004/0230399 A1 | 11/2004 | Shin | 702/182 |
| 2004/0236465 A1 | 11/2004 | Butka et al. | 700/245 |
| 2004/0264121 A1 | 12/2004 | Orriss et al. | 361/685 |
| 2005/0004703 A1 | 1/2005 | Christie | |
| 2005/0010836 A1 | 1/2005 | Bae et al. | 714/25 |
| 2005/0018397 A1 | 1/2005 | Kay et al. | 361/685 |
| 2005/0055601 A1 | 3/2005 | Wilson et al. | |

| | | | | | |
|---|---|---|---|---|---|
| 2005/0057849 A1 | 3/2005 | Twogood et al. | EP | 741508 | 11/1996 |
| 2005/0069400 A1 | 3/2005 | Dickey et al. | EP | 0757320 | 2/1997 |
| 2005/0109131 A1 | 5/2005 | Wanek et al. ............... 73/865.9 | EP | 0757351 | 2/1997 |
| 2005/0116702 A1 | 6/2005 | Wanek et al. ............. 324/158.1 | EP | 0840476 | 5/1998 |
| 2005/0131578 A1 | 6/2005 | Weaver | EP | 1 045 301 A | 10/2000 |
| 2005/0179457 A1 | 8/2005 | Min et al. | EP | 1209557 | 5/2002 |
| 2005/0207059 A1 | 9/2005 | Cochrane | EP | 1422713 | 5/2004 |
| 2005/0219809 A1 | 10/2005 | Muncaster et al. ......... 361/685 | EP | 1234308 | 5/2006 |
| 2005/0225338 A1 | 10/2005 | Sands et al. .................. 324/754 | EP | 1760722 | 3/2007 |
| 2005/0270737 A1 | 12/2005 | Wilson et al. ................ 361/685 | EP | 1612798 | 11/2007 |
| 2006/0010353 A1 | 1/2006 | Haugh ........................... 714/47 | GB | 2241118 | 8/1991 |
| 2006/0023331 A1 | 2/2006 | Flechsig et al. | GB | 2276275 | 9/1994 |
| 2006/0028802 A1 | 2/2006 | Shaw et al. ................... 361/728 | GB | 2299436 | 10/1996 |
| 2006/0066974 A1 | 3/2006 | Akamatsu et al. | GB | 2312984 | 11/1997 |
| 2006/0130316 A1 | 6/2006 | Takase et al. ............. 29/603.09 | GB | 2328782 | 3/1999 |
| 2006/0190205 A1 | 8/2006 | Klein et al. | GB | 2439844 | 7/2008 |
| 2006/0227517 A1 | 10/2006 | Zayas et al. .................. 361/748 | JP | 61-115279 | 6/1986 |
| 2006/0250766 A1 | 11/2006 | Blaalid et al. ................ 361/685 | JP | 62-177621 | 8/1987 |
| 2006/0269384 A1 | 11/2006 | Kiaie et al. ............... 414/222.02 | JP | 62-239394 | 10/1987 |
| 2007/0034368 A1 | 2/2007 | Atkins et al. .................. 165/247 | JP | 62-251915 | 11/1987 |
| 2007/0035874 A1 | 2/2007 | Wendel et al. | JP | 63-002160 | 1/1988 |
| 2007/0035875 A1 | 2/2007 | Hall et al. | JP | 63-004483 | 1/1988 |
| 2007/0053154 A1 | 3/2007 | Fukuda et al. | JP | 63-016482 | 1/1988 |
| 2007/0082907 A1 | 4/2007 | Canada et al. | JP | 63-062057 | 3/1988 |
| 2007/0127202 A1 | 6/2007 | Scicluna et al. ............... 361/685 | JP | 63-201946 | 8/1988 |
| 2007/0127206 A1 | 6/2007 | Wade et al. ................... 361/687 | JP | 63-214972 | 9/1988 |
| 2007/0195497 A1 | 8/2007 | Atkins .......................... 361/685 | JP | 63-269376 | 11/1988 |
| 2007/0248142 A1 | 10/2007 | Roundtree et al. | JP | 63-195697 | 12/1988 |
| 2007/0253157 A1 | 11/2007 | Atkins et al. .................. 361/685 | JP | 64-089034 | 4/1989 |
| 2007/0286045 A1 | 12/2007 | Onagi et al. | JP | 2-091565 | 3/1990 |
| 2008/0007865 A1 | 1/2008 | Orriss et al. ............... 360/97.01 | JP | 2-098197 | 4/1990 |
| 2008/0030945 A1 | 2/2008 | Mojaver et al. | JP | 2-185784 | 7/1990 |
| 2008/0112075 A1 | 5/2008 | Farquhar et al. ........... 360/97.02 | JP | 2-199690 | 8/1990 |
| 2008/0239564 A1* | 10/2008 | Farquhar et al. ........... 360/97.02 | JP | 2-278375 | 11/1990 |
| 2008/0282275 A1 | 11/2008 | Zaczek et al. | JP | 2-297770 | 12/1990 |
| 2008/0282278 A1 | 11/2008 | Barkley | JP | 3-008086 | 1/1991 |
| 2009/0028669 A1 | 1/2009 | Rebstock | JP | 3-078160 | 4/1991 |
| 2009/0082907 A1 | 3/2009 | Stuvel et al. | JP | 3-105704 | 5/1991 |
| 2009/0122443 A1 | 5/2009 | Farquhar et al. | JP | 3-207947 | 9/1991 |
| 2009/0142169 A1 | 6/2009 | Garcia et al. | JP | 3-210662 | 9/1991 |
| 2009/0153992 A1 | 6/2009 | Garcia et al. | JP | 3-212859 | 9/1991 |
| 2009/0153993 A1 | 6/2009 | Garcia et al. | JP | 3-214490 | 9/1991 |
| 2009/0153994 A1 | 6/2009 | Merrow | JP | 3-240821 | 10/1991 |
| 2009/0175705 A1 | 7/2009 | Nakao et al. | JP | 3-295071 | 12/1991 |
| 2009/0261047 A1 | 10/2009 | Merrow | JP | 4-017134 | 1/1992 |
| 2009/0261228 A1 | 10/2009 | Merrow | JP | 4-143989 | 5/1992 |
| 2009/0261229 A1 | 10/2009 | Merrow | JP | 4-172658 | 6/1992 |
| 2009/0262444 A1 | 10/2009 | Polyakov et al. | JP | 4-214288 | 8/1992 |
| 2009/0262445 A1 | 10/2009 | Noble et al. | JP | 4-247385 | 9/1992 |
| 2009/0262454 A1 | 10/2009 | Merrow | JP | 4-259956 | 9/1992 |
| 2009/0262455 A1 | 10/2009 | Merrow | JP | 4-307440 | 10/1992 |
| 2009/0265032 A1 | 10/2009 | Toscano et al. | JP | 4-325923 | 11/1992 |
| 2009/0265043 A1 | 10/2009 | Merrow | JP | 5-035053 | 2/1993 |
| 2009/0265136 A1 | 10/2009 | Garcia et al. | JP | 5-035415 | 2/1993 |
| 2009/0297328 A1 | 12/2009 | Slocum, III | JP | 5-066896 | 3/1993 |
| | | | JP | 5-068257 | 3/1993 |
| FOREIGN PATENT DOCUMENTS | | | JP | 5-073566 | 3/1993 |
| CN | 1177187 | 3/1998 | JP | 5-073803 | 3/1993 |
| CN | 2341188 | 9/1999 | JP | 5-101603 | 4/1993 |
| CN | 1114109 | 7/2003 | JP | 5-173718 | 7/1993 |
| CN | 1192544 | 3/2005 | JP | 5-189163 | 7/1993 |
| DE | 3786944 | 11/1993 | JP | 5-204725 | 8/1993 |
| DE | 69111634 | 5/1996 | JP | 5-223551 | 8/1993 |
| DE | 69400145 | 10/1996 | JP | 6-004220 | 1/1994 |
| DE | 19701548 | 8/1997 | JP | 6-004981 | 1/1994 |
| DE | 19804813 | 9/1998 | JP | 6-162645 | 6/1994 |
| DE | 69614460 | 6/2002 | JP | 6-181561 | 6/1994 |
| DE | 69626584 | 12/2003 | JP | 6-215515 | 8/1994 |
| DE | 19861388 | 8/2007 | JP | 6-274943 | 9/1994 |
| EP | 0210497 | 7/1986 | JP | 6-314173 | 11/1994 |
| EP | 0242970 | 10/1987 | JP | 7-007321 | 1/1995 |
| EP | 0 277 634 A | 8/1988 | JP | 7-029364 | 1/1995 |
| EP | 0356977 | 8/1989 | JP | 7-037376 | 2/1995 |
| EP | 0442642 | 2/1991 | JP | 7-056654 | 3/1995 |
| EP | 0466073 | 7/1991 | JP | 7-111078 | 4/1995 |
| EP | 0776009 | 11/1991 | JP | 7-115497 | 5/1995 |
| EP | 0582017 | 2/1994 | JP | 7-201082 | 8/1995 |
| EP | 0617570 | 9/1994 | JP | 7-226023 | 8/1995 |
| EP | 0635836 | 1/1995 | JP | 7-230669 | 8/1995 |

| | | |
|---|---|---|
| JP | 7-257525 | 10/1995 |
| JP | 1982246 | 10/1995 |
| JP | 7-307059 | 11/1995 |
| JP | 8007994 | 1/1996 |
| JP | 8-030398 | 2/1996 |
| JP | 8-030407 | 2/1996 |
| JP | 8-079672 | 3/1996 |
| JP | 8-106776 | 4/1996 |
| JP | 8-110821 | 4/1996 |
| JP | 8-167231 | 6/1996 |
| JP | 8-212015 | 8/1996 |
| JP | 8-244313 | 9/1996 |
| JP | 8-263525 | 10/1996 |
| JP | 8-263909 | 10/1996 |
| JP | 8-297957 | 11/1996 |
| JP | 2553315 | 11/1996 |
| JP | 9-044445 | 2/1997 |
| JP | 9-064571 | 3/1997 |
| JP | 9-082081 | 3/1997 |
| JP | 2635127 | 7/1997 |
| JP | 9-306094 | 11/1997 |
| JP | 9-319466 | 12/1997 |
| JP | 10-040021 | 2/1998 |
| JP | 10-049365 | 2/1998 |
| JP | 10-064173 | 3/1998 |
| JP | 10-098521 | 4/1998 |
| JP | 2771297 | 7/1998 |
| JP | 10-275137 | 10/1998 |
| JP | 10-281799 | 10/1998 |
| JP | 10-320128 | 12/1998 |
| JP | 10-340139 | 12/1998 |
| JP | 2862679 | 3/1999 |
| JP | 11-134852 | 5/1999 |
| JP | 11-139839 | 5/1999 |
| JP | 2906930 | 6/1999 |
| JP | 11-203201 | 7/1999 |
| JP | 11-213182 | 8/1999 |
| JP | 11-327800 | 11/1999 |
| JP | 11-353128 | 12/1999 |
| JP | 11-353129 | 12/1999 |
| JP | 2000-056935 | 2/2000 |
| JP | 2000-066845 | 3/2000 |
| JP | 2000-112831 | 4/2000 |
| JP | 2000-113563 | 4/2000 |
| JP | 2000-114759 | 4/2000 |
| JP | 2000-125290 | 4/2000 |
| JP | 3052183 | 4/2000 |
| JP | 2000-132705 | 5/2000 |
| JP | 2000-149431 | 5/2000 |
| JP | 2000-228686 | 8/2000 |
| JP | 2000-235762 | 8/2000 |
| JP | 2000-236188 | 8/2000 |
| JP | 2000-242598 | 9/2000 |
| JP | 2000-278647 | 10/2000 |
| JP | 3097994 | 10/2000 |
| JP | 2000-305860 | 11/2000 |
| JP | 2001-005501 | 1/2001 |
| JP | 2001-023270 | 1/2001 |
| JP | 2001-100925 | 4/2001 |
| JP | 2002-42446 | 2/2002 |
| JP | 2007-87498 | 4/2007 |
| JP | 2007-188615 | 7/2007 |
| JP | 2007-220184 | 8/2007 |
| JP | 2007-293936 | 11/2007 |
| JP | 2007-305206 | 11/2007 |
| JP | 2007-305290 | 11/2007 |
| JP | 2007-328761 | 12/2007 |
| JP | 2008-503824 | 2/2008 |
| KR | 10-1998-0035445 | 8/1998 |
| KR | 10-0176527 | 11/1998 |
| KR | 10-0214308 | 8/1999 |
| KR | 10-0403039 | 10/2003 |
| SG | 45223 | 1/1998 |
| TW | 387574 | 4/2000 |
| WO | WO 89/01682 | 8/1988 |
| WO | WO 97/06532 | 2/1997 |
| WO | WO 00/49487 | 2/2000 |
| WO | WO 00/67253 | 11/2000 |
| WO | WO 01/09627 | 2/2001 |
| WO | WO 01/41148 | 6/2001 |
| WO | WO 03/013783 | 2/2003 |
| WO | WO 03/021597 | 3/2003 |
| WO | WO 03/021598 | 3/2003 |
| WO | WO 03/067385 | 8/2003 |
| WO | WO 2004/006260 | 1/2004 |
| WO | WO 2004/114286 | 12/2004 |
| WO | WO 2005/024830 | 3/2005 |
| WO | WO 2005/024831 | 3/2005 |
| WO | WO 2005/109131 | 11/2005 |
| WO | WO 2006/030185 | 3/2006 |
| WO | WO 2006/048611 | 5/2006 |
| WO | WO 2006/100441 | 9/2006 |
| WO | WO 2006/100445 | 9/2006 |
| WO | WO 2007/031729 | 3/2007 |

OTHER PUBLICATIONS

Ali et al., "Modeling and Simulation of Hard Disk Drive Final Assembly Using a HDD Template" Proceedings of the 2007 Winter Simulation Conference, IEEE pp. 1641-1650, 2007 http://portal.acm.org/citation.cfm?id=1351837.

Anderson et al., "Clinical chemistry: concepts and applications", The McGraw-Hill Companies, Inc., pp. 131-132, 2003.

Curtis et al., "InPhase Professional Archive Drive Architecture" Dec. 17, 2007 http://www.science.edu/TechoftheYear/Nominees/InPhase/Holographic%20Storage.pdf.

Findeis et al., "Vibration Isolation Techniques Sutiable for Portable Electronic Speckle Pattern Interferometry", Proc. SPIE vol. 4704, pp. 159-167, 2002 http://www.ndt.uct.ac.za/Papers/spiendt2002.pdf.

Frankovich, "The Basics of Vibration Isolation Using Elastomeric Materials", EARSC 2005 http://www.isoloss.com/pdfs/engineering/BasicsofVibrationIsolation.pdf.

Grochowski et al., "Future Trends in Hard Disk Drives" IEEE Transactions on Magnetics, vol. 32, No. 3, pp. 1850-1854, May 1996 http://svn.tribler.org/abc/branches/leo/dataset/preferences/johan/johan-68.pdf.

Gurumurthi et al., "Disk Drive Roadmap from the Thermal Perspective: A Case for Dynamic Thermal Management", International Symposium on Computer Architecture Proceedings of the $32^{nd}$ Annual International Symposium on Computer Architecture, pp. 38-49, 2005 http://portal.acm.org/citation.cfm?id=1069807.1069975.

Johnson et al., "Performance Measurements of Tertiary Storage Devices", Proceedings of the $24^{th}$ VLDB Conference, New York, pp. 50-61, 1998.

Nagarajan, "Survey of Cleaning and cleanliness Measurement in Disk Drive Manufacture", North Carolina Department of Environment and Natural Resources, Feb. 1997.

Yee Leong Low et al., "Thermal network model for temperature prediction in hard disk drive" Journal Microsystem Technologies, vol. 15, No. 10-11, pp. 1653-1656, Oct. 2009 http://www.springerlink.com/content/20668jn67pk426r5/.

Notification of Transmittal of the International Search Report and the Written Opinion of the International Searching Authority, or the Declaration, for International Application No. PCT/US2009/039590, Oct. 30, 2009, 10 pages.

Notification of Transmittal of the International Search Report and the Written Opinion of the International Searching Authority, or the Declaration, for International Application No. PCT/US2009/040757, Nov. 23, 2009, 12 pages.

Notification of Transmittal of the International Search Report and the Written Opinion of the International Searching Authority, or the Declaration, for International Application No. PCT/US2009/039898, Nov. 24, 2009, 12 pages.

Notification of Transmittal of the International Search Report and the Written Opinion of the International Searching Authority, or the Declaration, for International Application No. PCT/US2009/040795, Nov. 26, 2009, 13 pages.

Notification of Transmittal of the International Search Report and the Written Opinion of the International Searching Authority, or the Declaration, for International Application No. PCT/US2009/045583, Nov. 27, 2009, 13 pages.

Notification of Transmittal of the International Search Report and the Written Opinion of the International Searching Authority, or the Declaration, for International Application No. PCT/US2009/040888, Dec. 29, 2009, 14 pages.

Notification of Transmittal of the International Search Report and the Written Opinion of the International Searching Authority, or the Declaration, for International Application No. PCT/US2009/040894, Dec. 22, 2009, 12 pages.

Notification of Transmittal of the International Search Report and the Written Opinion of the International Searching Authority, or the Declaration, for International Application No. PCT/US2009/039934, Dec. 23, 2009, 12 pages.

Notification of Transmittal of the International Search Report and the Written Opinion of the International Searching Authority, or the Declaration, for International Application No. PCT/US2009/040965, Dec. 23, 2009, 12 pages.

Notification of Transmittal of the International Search Report and the Written Opinion of the International Searching Authority, or the Declaration, for International Application No. PCT/US2009/040973, Jan. 11, 2010, 13 pages.

Cardinal Intellectual Property's search report including the results of a search for the features of the claims included in the U.S. patent application entitled "Transferring Disk Drives Within Disk Drive Testing Systems", inventors: Polyakov et al, and having assigned U.S. Appl. No. 12/727,150. The forgoing U.S. patent application is a continuation of U.S. Appl. No. 12/104,536.

Cardinal Intellectual Property's search report including the results of a search for the features of the claims included in the U.S. patent application entitled "Transferring Storage Devices Within Storage Device Testing Systems", inventors: John P. Toscano et al., and having assigned U.S. Appl. No. 12/727,201. The forgoing U.S. patent application is a continuation of the U.S. Appl. No. 12/424,980.

Cardinal Intellectual Property's search report including the results of a search for the features of the claims included in the U.S. patent application entitled "Processing Storage Devices", inventors: Richard W. Slocum III., and having assigned Ser. No. 727,619. The forgoing U.S. patent application is a continuation of U.S. Appl. No. 12/474,388.

Cardinal Intellectual Property's search report including the results of a search for the features of the claims included in the U.S. patent application entilted "Bulk Feeding Disk Drives To Disk Drive Testing Systems", inventors: Noble et al., and having assigned U.S. Appl. No. 12/726,856. The forgoing U.S. patent application is a continuation of U.S. Appl. No. 12/104,869.

Cardinal Intellectual Property's search report including the results of a search for the features of the claims included in the U.S. patent application entitled "Dependent Temperature Control Within Disk Drive Testing Systems", inventors: Merrow et al., and having assigned U.S. Appl. No. 12/727,207. The forgoing U.S. patent application is a continuation of U.S. Appl. No. 12/105,069.

Cardinal Intellectual Property's search report including the results of a search for the features of the claims included in the U.S. patent application entitled "Test Slot Cooling System for a Storage Device Testing System", inventors: Merrow et al., and having assigned U.S. Appl. No. 12/727,700. The foregoing U.S. patent application is a continuation of U.S. Appl. No. 12/503,567.

Cardinal Intellectual Property's search report including the results of a search for the features of the claims included in the U.S. patent application entitled "Storage Device Testing System Cooling", inventors: Brian S. Merrow and having assigned U.S. Appl. No. 12/775,560. The foregoing U.S. patent application is a continuation of U.S. Appl. No. 12/698,575.

Cardinal Intellectual Property's search report including the results of a search for the features of the claims included in the U.S. patent application entitled "Conductive Heating", inventors: Brian S. Merrow et al., and having assigned U.S. Appl. No. 12/760,164. The foregoing U.S. patent application is a continuation of U.S. Appl. No. 12/503,593.

Cardinal Intellectual Property's search report including the results of a search for the features of the claims included in the U.S. patent application entitled "Conductive Temperature Sensing", inventors: Brian S. Merrow et al., and having assigned U.S. Appl. No. 12/760,305. The foregoing U.S. patent application is a continuation of U.S. Appl. No. 12/503,687.

Cardinal Intellectual Property's search report including the results of a search for the features of the claims included in the U.S. patent application entitled "Solid State Temperature Control of Hard Drive Tester", inventors: Brian S. Merrow and having assigned U.S. Appl. No. 12/856,056. The foregoing U.S. patent application is a continuation of U.S. Appl. No. 12/105,103.

Cardinal Intellectual Property's search report including the results of a search for the features of the claims including the U.S. patent application entitled "Single Test Slot for Dynamic Isolation of a Hard Drive", inventors: Brian S. Merrow and having assigned U.S. Appl. No. 12/767,142. The foregoing U.S. patent application is a continuation of U.S. Appl. No. 12/105,105.

Cardinal Intellectual Property's search report including the results of a search for the features of the claims included in the U.S. patent application entitled "Hard Drive Transport Sled", inventors: Brian S. Merrow et al., and having assigned U.S. Appl. No. 12/766,680. The foregoing U.S. patent application is a continuation of U.S. Appl. No. 12/959,133.

Bakken et al., "Low Cost, Rack Mounted, Direct Access Disk Storage Device", www.ip.com, 4 pages, Mar. 3, 2005.

Biber et al., "Disk Drive Drawer Thermal Management", Advances in Electronic Packaging vol. 1:43-46, 1995.

Chung et al., "Vibration Absorber for Reduction of the In-plane Vibration in an Optical Disk Drive", IEEE Transactions on Consumer Electronics, Vo. 48, May 2004.

FlexStar Technology, 30E/Cascade Users Manual, Doc #98-36387-00 Rev. 1.8, pp. 1-33.

FlexStar Technology, "A World of Storage Testing Solutions," http://www.flexstar.com, 1 page (1999).

FlexStar Technology, "Environment Chamber Products,"•http://www.flexstar.com, 1 page (1999).

FlexStar Technology, "FlexStar's Family of Products," http://www.flexstar.com, 1 page (1999).

Gurumurthi, "The Need for temperature-Aware Storage Systems", The Tenth Intersociety conference on Thermal and Thermomechanical Phenomena in Electronics, ITHERM pp. 387-394, 2006.

Gurumurthi et al., "Thermal Issues in Disk Drive Design: Challenges and Possible Solutions", ACM Transactions on Storage 2:41-73, Feb. 2006.

Henderson, "HAD High Aerial Densities Require Solid Test Fixtures", Flexstar Technology.

Lindner, "Disk drive mounting", IBM Technical Disclosure Brochure, vol. 16, No. 3, pp. 903-904, Aug. 1973.

Morgenstern, Micropolis Drives Target High-end Apps; Technology Provides Higher Uninterrupted Data Transfer. (Applications; Microdisk AV LS 3020 and 1050AV and 1760AV LT Stackable Hard Drive Systems) (Product Announcement) MacWeek, vol. 8, No. 6, p. 8; Feb. 7, 1994.

Morris, "Zero Cost Power and Cooling Monitor System", www.delphion.com/tdbs/tdb?order=94A+61950, 3 pages, Jan. 15, 2008.

Notification of Transmittal of The International Search Report and the Written Opinion of the International Searching Authority, or the Declaration, PCT/US2008/086181, 15 pages, Mar. 16, 2009.

Park, "Vibration and Noise Reduction of an Optical Disk Drive by Using a Vibration Absorber Methods and Apparatus for Securing Disk Drives in a Disk", IEEE Transactions on Consumer Electronics, vol. 48, Nov. 2002.

Ruwart et al., "Performance Impact of External Vibration on Consumer-grade and enterprise-class Disk Drives", Proceedings of the $22^{nd}$ IEEE/$13^{th}$ Goddard Conference on Mass Storage Systems and Technologies, 2005.

Seagate Product Marketing, "Seagate's Advanced Multidrive System (SAMS) Rotational Vibration Feature", Publication TP-229D, Feb. 2000.

Schroeder et al., "Disk Failures in the Real World: What does an MTTP of 1,000,000 hours mean to you?", in FAST'07: $5^{th}$ USENIX Conference on File and Storage Technologies, San Jose, CA, Feb. 14-16, 2007.

Schulze et al., "How Reliable is a Raid?," COMPCON Spring apos; 89. Thirty-Fouth IEEE Computer Society International Conference: Intellectual Leverage, Digest of papers; pp. 118-123, Feb. 27-Mar. 3, 1989.

Winchester, "Automation Specialists Use Machine Vision as a System Development Tool", IEE Computing & Control Engineering, Jun./Jul. 2003.

Xyratex website "Storage Infrastructure" www.xyratex.com/Products/storage-infrastructure/default.aspx 1995-2008.

Xyratex website "Production Test Systems" www.xyratex.com/Products/production-test-systems/default.aspx 1995-2008.

Xyratex website "Single cell—Production Test Systems" www.xyratex.com/products/production-test-system/single-cell.aspx 1995-2008.

Xyratex website "Continuous Innovation—Production Test Systems" www.xyratex.com/products/production-test-systems/continuous-innovation.aspx 1995-2008.

Xyratex website "Key Advantages—Production Test Systems" www.xyratex.com/products/production-test-systems/advantages.aspx 1995-2008.

Xyratex website "Testing Drives Colder—Production Test Systems" www.xyratex.com/products/productino-test-systems/colder.aspx 1995-2008.

"Xyratex to Debut its New Automated Test Solution for 2.5-Inch Disk Drives at DISKCON USA 2004" 2004 PR Newswire Europe www.prnewswire.co.uk/cgi/news/release?id=130103.

"Automated Production Test Solutions", Xyratex Product Test brochure, 2006.

Xyratex "Process Challenges in the Hard Drive Industry" slide presentation, 2006 Asian Diskcon.

Suwa et al., "Evaluation System for Residual Vibration from HDD Mounting Mechanism" IEEE Transactions on Magnetics, vol. 35, No. 2, pp. 868-873, Mar. 1999.

Suwa et al., "Rotational Vibration Suppressor" IBM Technical Disclosure Bulletin Oct. 1991.

Cardinal Intellectual Property's search report including the results of a search for the features of the claims included in the U.S. patent application entitled "Vibration Isolation Within Disk Drive Testing Systems", inventors: Brian S. Merrow and having assigned U.S. Appl. No. 12/767,142. The foregoing U.S. patent application is a continuation of U.S. Appl. No. 12/105,105. Revised as of Mar. 30, 2010.

Cardinal Intellectual Property's search report including the results of a search for the features of the claims included in the U.S. patent application entitled "Disk Drive Clamping Transport and Testing", inventors: Brian S. Merrow et al., and having assigned U.S. Appl. No. 12/767,113. The foregoing U.S. patent application is a continuation of U.S. Appl. No. 11/959,133.

Cardinal Intellectual Property's search report including the results of a search for features of the claims included in the U.S. patent application entitled "Disk Drive Clamping Transport and Testing", inventors: Brian S. Merrow et al., and having assigned U.S. Appl. No. 12/766,680. The foregoing U.S. patent application is a continuation of U.S. Appl. No. 11/959,133. Revised as of Apr. 1, 2010.

Exhibit 1 in *Xyratex Technology, Ltd v. Teradyne, Inc.*; Newspaper picture that displays the CSO tester; 1990.

Exhibit 2 in *Xyratex Technology, Ltd v. Teradyne, Inc.*; Photos of the CSO tester obtained from Hitachi; 1990.

Exhibit 1326 in *Xyratex Technology, Ltd v. Teradyne, Inc.*; Image of the back of Exhibit 1 and Exhibit 2 photos, which display the photos' dates; 1990.

Exhibit 1314 in *Xyratex Technology, Ltd. V. Teradyne, Inc.*; Case, "Last products of Disk-File Development at Hursley and Millbrook," IBM, Oct. 12, 1990.

Exhibit 1315 in *Xyratex Technology, Ltd. V. Teradyne, Inc.*; Case, "History of Disk-File Development at Hursley and Millbrook," IBM, Oct. 17, 1990.

*Xyratex Technology, Ltd. V. Teradyne, Inc.*, Teradyne, Inc's Prior Art Notice Pursuant to 35 U.S.C. Section 282. Case No. CV 08-04545 SJO (PLAx), Oct. 16, 2009.

*Xyratex Technology, Ltd. V. Teradyne, Inc.*, Amended Joint Trial Exhibit List of Xyratex and Teradyne. Case No. CV 08-04545 SJO (PLAx), Nov. 12, 2009.

Notification of Transmittal of the International Search Report and the Written Opinion of the International Searching Authority, or the Declaration, for International Application No. PCT/GB2005/003490, Jan. 26, 2006, 10 pages.

Abraham et al., "Thermal Proximity Imaging of Hard-Disk Substrates", IEEE Transactions on Mathematics 36:3997-4004, Nov. 2000.

Anderson et al., "High Reliability Variable Load Time Controllable Vibration Free Thermal Processing Environment", Delphion, hhttps://www.delphion.com/tdbs/tdb?order=93A+63418, 3 pages, Mar. 18, 2009.

Asbrand, "Engineers at One Company Share the Pride and the Profits of Successful Product Design", Professional Issues, 4 pages, 1987.

Bair et al., "Measurements of Asperity Temperatures of a Read/Write Head Slider Bearing in Hard Magnetic Recording Disks", Journal of Tribology 113:547-554, Jul. 1991.

Christensen, "How Can Great firms Fail? Insights from the hard Disk Drive Industry", Harvard Business School Press, pp. 1-26, 2006.

Haddad et al., "A new Mounting Adapter for Computer Peripherals with Improved Reliability, Thermal Distribution, Low Noise and Vibration Reduction", ISPS, Advances in Information Storage and Processing Systems, 1:97-108, 1995.

HighBeam Research website "ACT debuts six-zone catalytic gas heater. (American Catalytic Technologies offers new heaters)" www.highbeam.com, 4 pages, 1998.

HighBeam Research website "Asynchronous Testing Increases Throughput." www.highbeam.com, 7 pages, 2000.

HighBeam Research website "Credence announces Production Release of the EPRO AQ Series for Integrated Test and Back-end Processing." www.highbeam.com, 4 pages, 1995.

HighBeam Research website "Test Multiple Parts At Once for Air Leaks. (Brief Article)", www.highbeam.com, 1 page, 1999.

Iwamiya, "Hard Drive Cooling Using a Thermoelectric Cooler", EEP-vol. 19-2, Advances in Electronic Packaging, vol. 2:2203-2208, ASME 1997.

Ku, "Investigation of Hydrodynamic Bearing Friction in Data Storage information System Spindle Motors", ISPSvol. 1, Advances in Information Storage and Processing Systems, pp. 159-165, ASME 1995.

McAuley, "Recursive Time Trapping for Synchronization of Product and Chamber Profiles for Stress Test", Delphion, www.delphion.com/tdbs/tdb?order=88A+60957, 3 pages, Mar. 18, 2009.

Prater et al., "Thermal and Heat-Flow Aspects of Actuators for Hard Disk Drives", InterSociety Conference on Thermal Phenomena, pp. 261-268, 1994.

Terwiesch et al., "An Exploratory Study of International Product Transfer and Production Ramp-Up in the Data Storage Industry", The Information Storage Industry Center, University of California, www-irps.ucsd.edu/~sloan/, pp. 1-31, 1999.

Tzeng, "Dynamic Torque Characteriestics of Disk-Drive Spindle Bearings", ISPS-vol. 1, Advances in Information Storage and Processing Systems, pp. 57-63, ASME 1995.

Tzeng, "Measurements of Transient Thermal Strains in a Disk-Drive Actuator", InterSociety conference on Thermal Phenomena, pp. 269-274, 1994.

Wilson-7000 disk Drive Analyzer Product Literature, date accessed Jan. 28, 2009, 2 pages.

Annex to Form PCT/ASA/206 Communication Relating to the Results of the Partial International Search, for International Application No. PCT/US2008/086814, dated Apr. 3, 2009, 1 page.

Annex to Form PCT/ASA/206 Communication Relating to the Results of the Partial International Search, for International Application No. PCT/US2008/086809, dated Apr. 3, 2009, 1 page.

Notification of Transmittal of the International Search Report and the Written Opinion of the International Searching Authority, or the Declaration, for International Application No. PCT/US2009/039926, Sep. 1, 2009, 13 pages.

Notification of Transmittal of the International Search Report and the Written Opinion of the International Searching Authority, or the Declaration, for International Application No. PCT/US2009/039591, Aug. 31, 2009, 10 pages.

Notification of Transmittal of the International Search Report and the Written Opinion of the International Searching Authority, or the Declaration, for International Application No. PCT/US2008/086814, Sep. 18, 2009, 17 pages.

Notification of Transmittal of the International Search Report and the Written Opinion of the International Searching Authority, or the Declaration, for International Application No. PCT/US2009/039888, Sep. 28, 2009, 13 pages.

Notification of Transmittal of the International Search Report and the Written Opinion of the International Searching Authority, or the Declaration, for International Application No. PCT/US2009/039921, Sep. 25, 2009, 14 pages.

Notification of Transmittal of the International Search Report and the Written Opinion of the International Searching Authority, or the Declaration, for International Application No. PCT/US2009/040058, Sep. 29, 2009, 13 pages.

Notification of Transmittal of the International Search Report and the Written Opinion of the International Searching Authority, or the Declaration, for International Application No. PCT/US2009/040829, Oct. 28, 2009, 13 pages.

Notification of Transmittal of the International Search Report and the Written Opinion of the International Searching Authority, or the Declaration, for International Application No. PCT/US2009/040835, Oct. 30, 2009, 13 pages.

Notification Concerning Transmittal of International Preliminary Report on Patentability (Chapter 1 of the Patent Cooperation Treaty), International Application No. PCT/US2009/039898, Oct. 28, 2010, 6 pages.

* cited by examiner

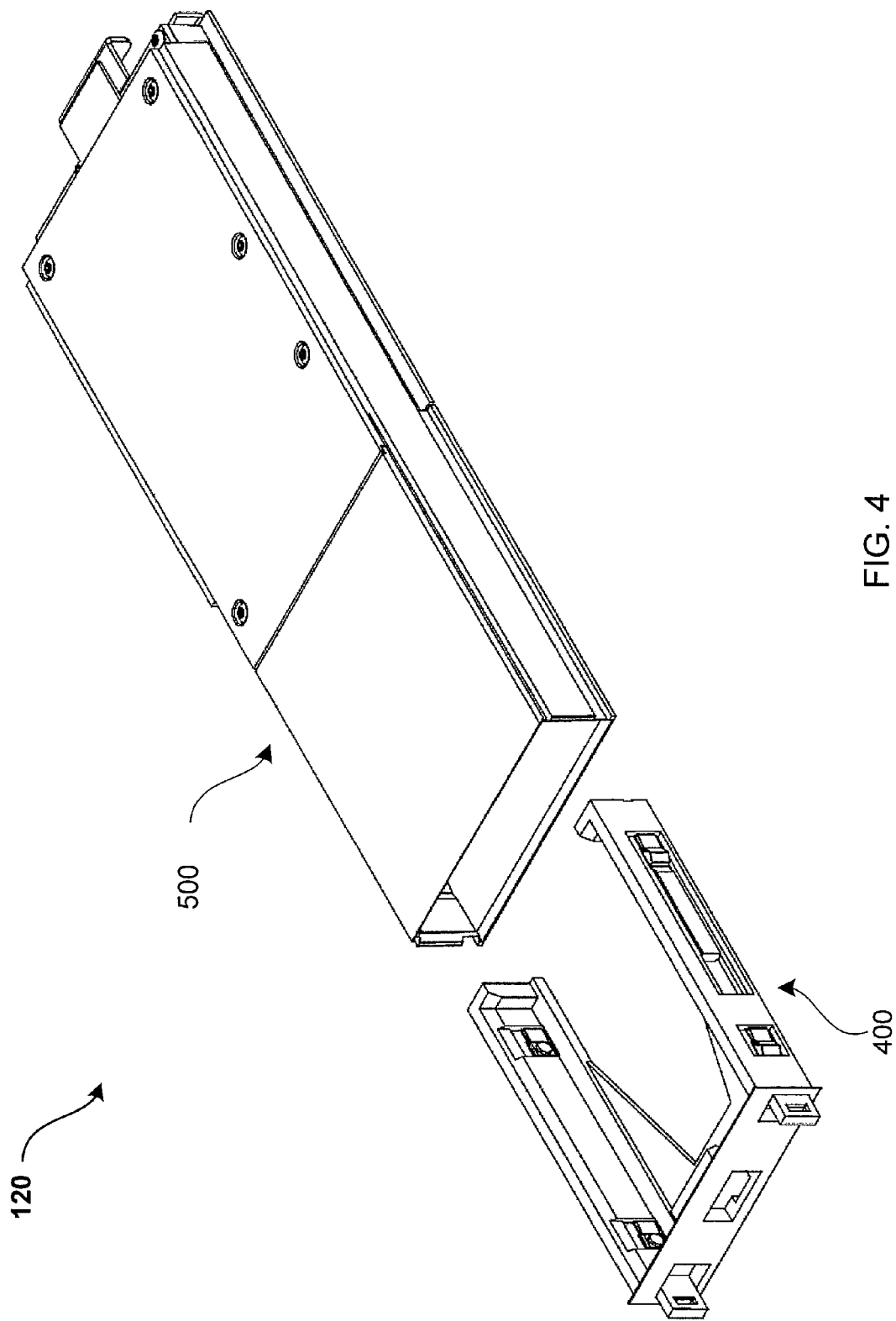

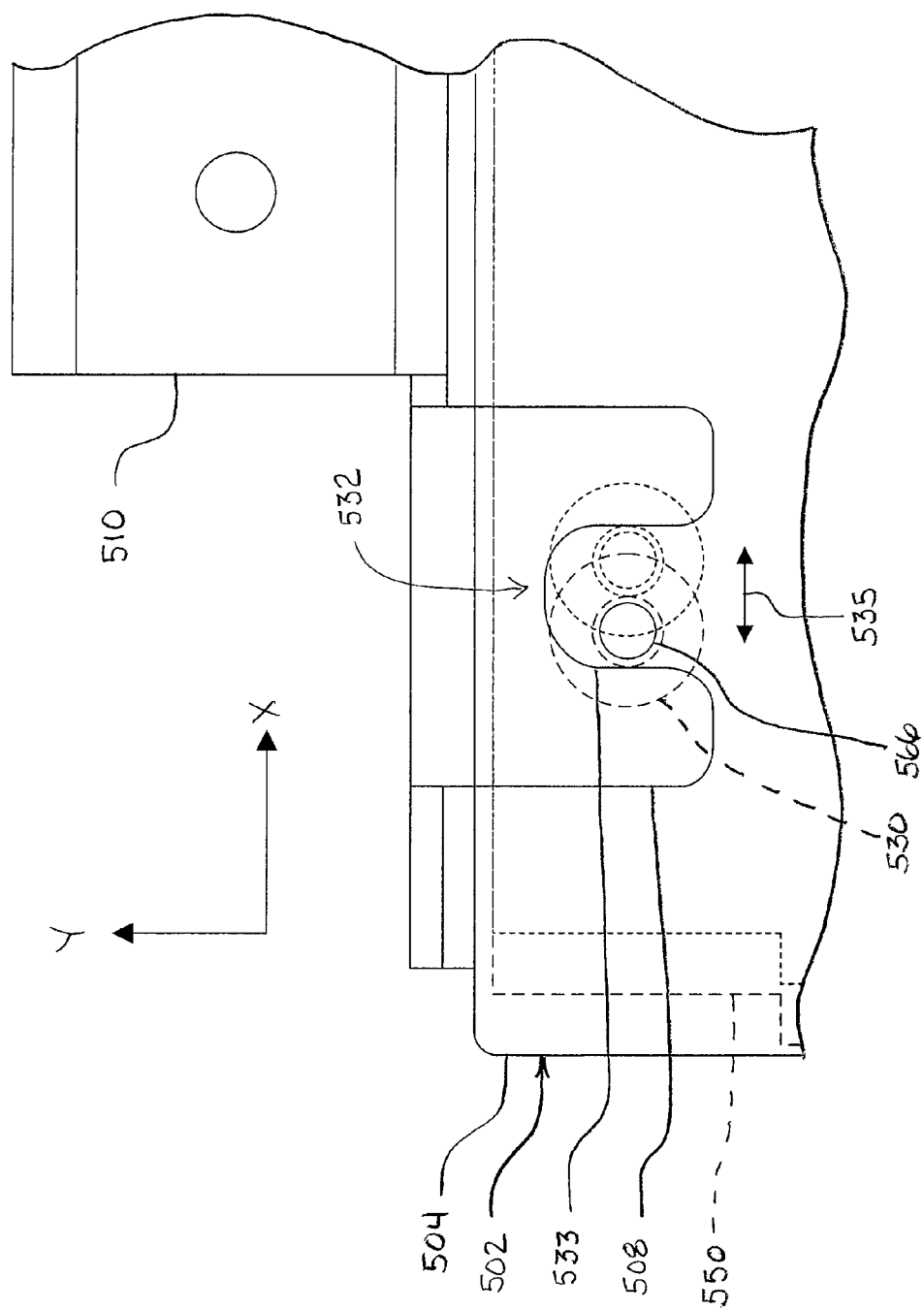

VIBRATION ISOLATION WITHIN DISK DRIVE TESTING SYSTEMS

TECHNICAL FIELD

This disclosure relates to isolating vibrations in a disk drive testing system.

BACKGROUND

Disk drive manufacturers typically test manufactured disk drives for compliance with a collection of requirements. Test equipment and techniques exist for testing large numbers of disk drives serially or in parallel. Manufacturers tend to test large numbers of disk drives simultaneously or in batches. Disk drive testing systems typically include one or more tester racks having multiple test slots that receive disk drives for testing. In some cases, the disk drives are placed in carriers which are used for loading and unloading the disk drives to and from the test racks.

The testing environment immediately around the disk drive is closely regulated. Minimum temperature fluctuations in the testing environment are critical for accurate test conditions and for safety of the disk drives. The latest generations of disk drives, which have higher capacities, faster rotational speeds and smaller head clearance, are more sensitive to vibration. Excess vibration can affect the reliability of test results and the integrity of electrical connections. Under test conditions, the drives themselves can propagate vibrations through supporting structures or fixtures to adjacent units. This vibration "cross-talking," together with external sources of vibration, contributes to bump errors, head slap and non-repetitive runout (NRRO), which may result in lower yields and increased manufacturing costs. Current disk drive testing systems employ automation and structural support systems that contribute to excess vibrations in the system and/or require large footprints.

In some cases, in order to combat undesirable vibrations, disk drives are clamped to a carrier and/or to a tester rack in such a manner as to inhibit or dampen vibrations. A well known way of inhibiting the effects of vibration originating at the disk drive is to mount the disk drive to a mounting device (e.g., a carrier) such that a center of rotation of the mounting device is outside of the footprint of the disk drive. For example, FIG. 1 shows a conventional disk drive mounting arrangement (e.g., for a disk drive test apparatus 50). As shown in FIG. 1, the apparatus 50 includes a carrier 52 having a disk drive receiving portion 54 for receiving a disk drive 600 therein. The disk drive 600 is rigidly connected to the carrier 52 (e.g., with fasteners 56 and/or clamps 57). The carrier 52 is received in bay 62 of a chassis 60, which may include plural bays (e.g., multiple rows and or columns of bays). A mounting arrangement supports the carrier 52 within the chassis 60 such that a center of rotation 58 of the carrier 52 is spaced a distance away from the disk drive receiving portion 54 and the disk drive 600. Known mounting arrangements include, for example, a pin 64 about which the carrier 52 can pivot. Arrow 70 illustrates the resultant movement of the carrier 52 relative to the chassis 60 effected by rotation (arrow 72) of a disk 620 of the disk drive 600 in the carrier 52.

SUMMARY

In one aspect, a disk drive test slot includes a housing that defines a test compartment for receiving and supporting a disk drive transporter carrying a disk drive for testing. The housing also defines an open end that provides access to the test compartment for insertion and removal of disk drive transporter carrying a disk drive for testing. The disk drive test slot also includes a mounting plate connected to the housing. One or more isolators are disposed between the housing and the mounting plate. The one or more isolators are operable to inhibit transmission of vibrational energy between the housing and the mounting plate.

Embodiments can include one or more of the following features.

In some embodiments, the main body member includes one or more self-clinching studs connecting the main body member to at least one of the one or more isolators.

In some implementations, the one or more isolators include a male-female isolator. The male-female isolator can include a body formed of urethane elastomer.

In some embodiments, the one or more isolators include one or more grommets. In some cases, the one or more grommets are displaceable relative to the mounting plate. In some examples, the housing includes a plurality of contact pins each of which engage a corresponding one of the grommets. The contact pins can be disposed at a first end of the housing opposite the open end. The mounting plate can include a main body member, and a flange member connected to main body member and configured to receive and support the grommets. The flange member can be configured to support the grommets in a position spaced apart from the main body member. In some cases, the flange member includes a plurality of forked openings each configured to receive and support one of the grommets. The housing can be connected to the grommets in such a manner as to preload the grommets. The grommets can be formed of thermoplastic vinyl. In some examples, the one or more isolators also include one or more male-female isolators disposed between the housing and the mounting plate.

In some embodiments, the one or more isolators include a plurality of said isolators each disposed between the housing and the mounting plate, wherein the plurality of isolators are each operable to inhibit transmission of vibrational energy between the housing and the mounting plate.

In some implementations, in the absence of a disk drive and a disk drive transporter, the test slot housing carries substantially no moving parts.

According to another aspect, a disk drive testing system includes a plurality of test slots. Each of the test slots includes a housing, and a mounting plate assembly. Each of the housings define a test compartment for receiving and supporting a disk drive transporter carrying a disk drive for testing, and an open end providing access to the test compartment for insertion and removal of disk drive transporter carrying a disk drive for testing. The mounting plate assembly is connected to the housing. The disk drive testing system also includes a chassis that defines a plurality of test slot receptacles each configured to receive and support one of the test slots. Each of the test slot receptacles includes a corresponding card guide assembly configured to releasably engage one of the mounting plate assemblies.

Embodiments can include one or more of the following features. In some embodiments the test slots are each independently removable from the chassis.

In some implementations, the mounting plate assemblies are operable to inhibit transmission of vibrational energy between the test slot housings and the chassis.

In some embodiments, at least one of the mounting plate assemblies includes a mounting plate, and one or more isolators disposed between the mounting plate and an associated one of the test slot housings. The one or more isolators are operable to inhibit transmission of vibrational energy between the associated one of the housings and the mounting plate. The mounting plate can include a mounting flange sized to fit within one of the card guide assemblies to provide a mechanical connection between the associated test slot and the chassis. The one or more isolators can include one or more grommets. In some cases, the grommets are displaceable relative to the mounting plate. The housings can include a plurality of contact pins each of which engages a corresponding one of the grommets. The one or more isolators can include one or a male-female isolators.

In some implementations, the chassis includes test electronics configured to communicate a functional test routine to a disk drive within one of the test slots. In some examples, at least one of the test slots also includes a connection interface circuit configured to provide electrical communication between the test electronics and a disk drive within the test compartment of the at least one of the test slots.

In some embodiments, the test slots are interchangeable with each other within the test slot receptacles.

In yet another aspect, a disk drive testing system includes a plurality of test slots. Each test slot includes a housing defining a test compartment for receiving and supporting a disk drive transporter carrying a disk drive for testing, and an open end providing access to the test compartment for insertion and removal of disk drive transporter carrying a disk drive for testing. Each test slot also includes a mounting plate, and one or more isolators disposed between the housing and the mounting plate. The one or more isolators being operable to inhibit transmission of vibrational energy between the housing and the mounting plate. The disk drive testing system can also include a chassis defining a plurality of test slot receptacles each configured to receive and support one of the test slots. In some cases, the test slots are each independently removable from the chassis.

Embodiments can include one or more of the following features. In some implementations, the test slot receptacles are each configured to releasably enagage one of the test slot mounting plates thereby mechanically connecting the associated test slot to the chassis.

In some embodiments, the isolators are operable to inhibit transmission of vibrational energy between the test slot housings and the chassis.

In some implementations, the isolators include grommets.

In some embodiments, the isolators include male-female isolators

In some implementations, in the absence of a disk drive and a disk drive transporter, the test slot housings carry substantially no moving parts.

In some embodiments, the chassis includes test electronics configured to communicate a functional test routine to a disk drive within one of the test slots. In some cases, a first one of the test slots includes a connection interface circuit configured to provide electrical communication between the test electronics and a disk drive within the test compartment of the first one of the test slots.

In some implementations, the test slots are interchangeable with each other within the test slot receptacles.

In another aspect, a disk drive test slot includes a housing defining a test compartment for receiving and supporting a disk drive transporter carrying a disk drive for testing, and an open end providing access to the test compartment for insertion and removal of disk drive transporter carrying a disk drive for testing. The disk drive test slot can also include a mounting plate connected to the housing, and a plurality of floating contacts disposed between the housing and the mounting plate and operable to inhibit transmission of vibra-tional energy between the housing and the mounting plate. The floating contacts are displaceable relative to the mounting plate.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 is a perspective view of a test slot assembly.

FIGS. 20A-20F illustrate movements of the test housing relative to the mounting plate assembly of the test slot of FIG. 19.

Like reference symbols in the various drawings indicate like elements.

DETAILED DESCRIPTION

System Overview

Figure 1:
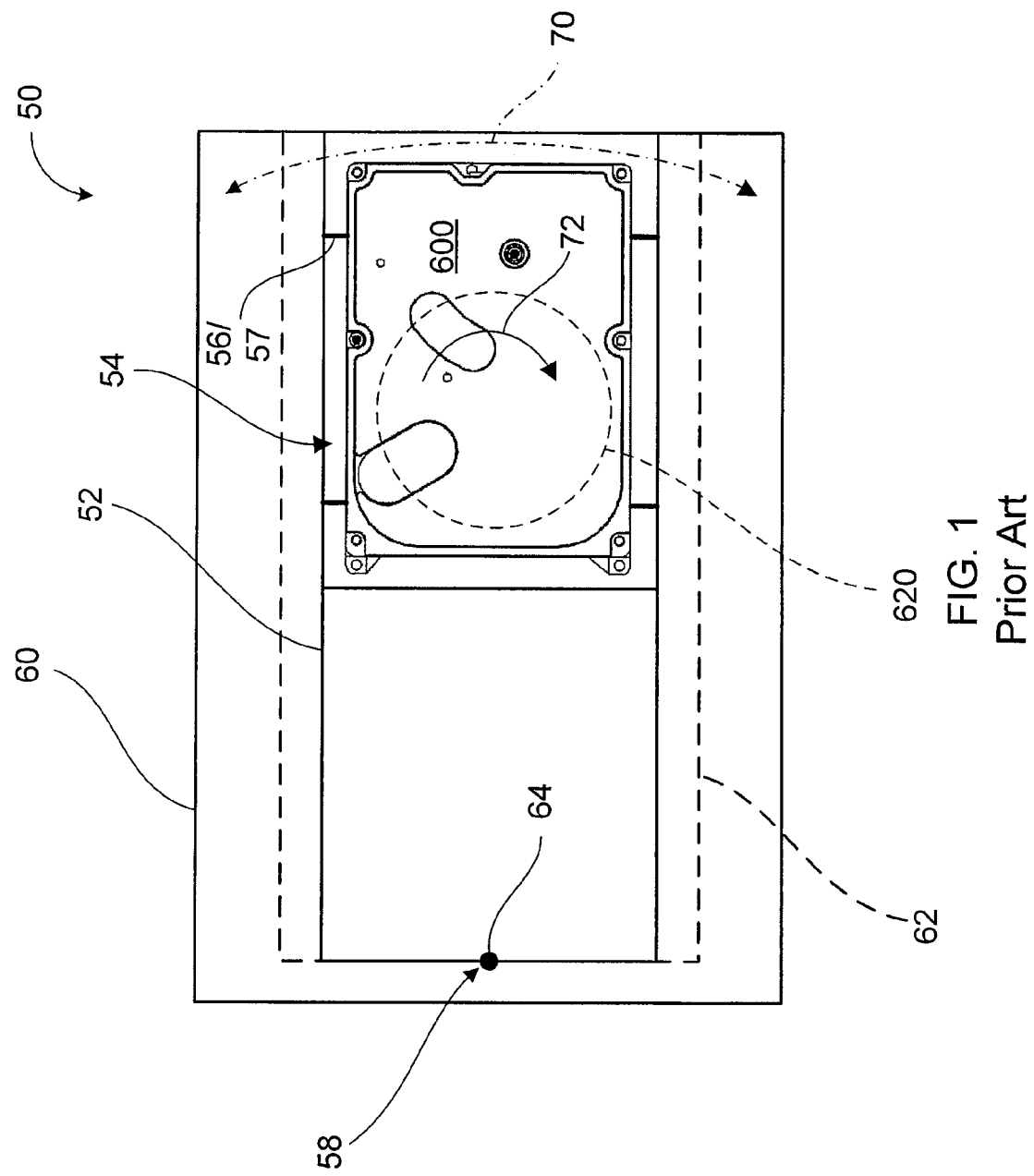
FIG. 1 is a schematic view of a disk drive mounting arrangement of the prior art.
Figure 2:
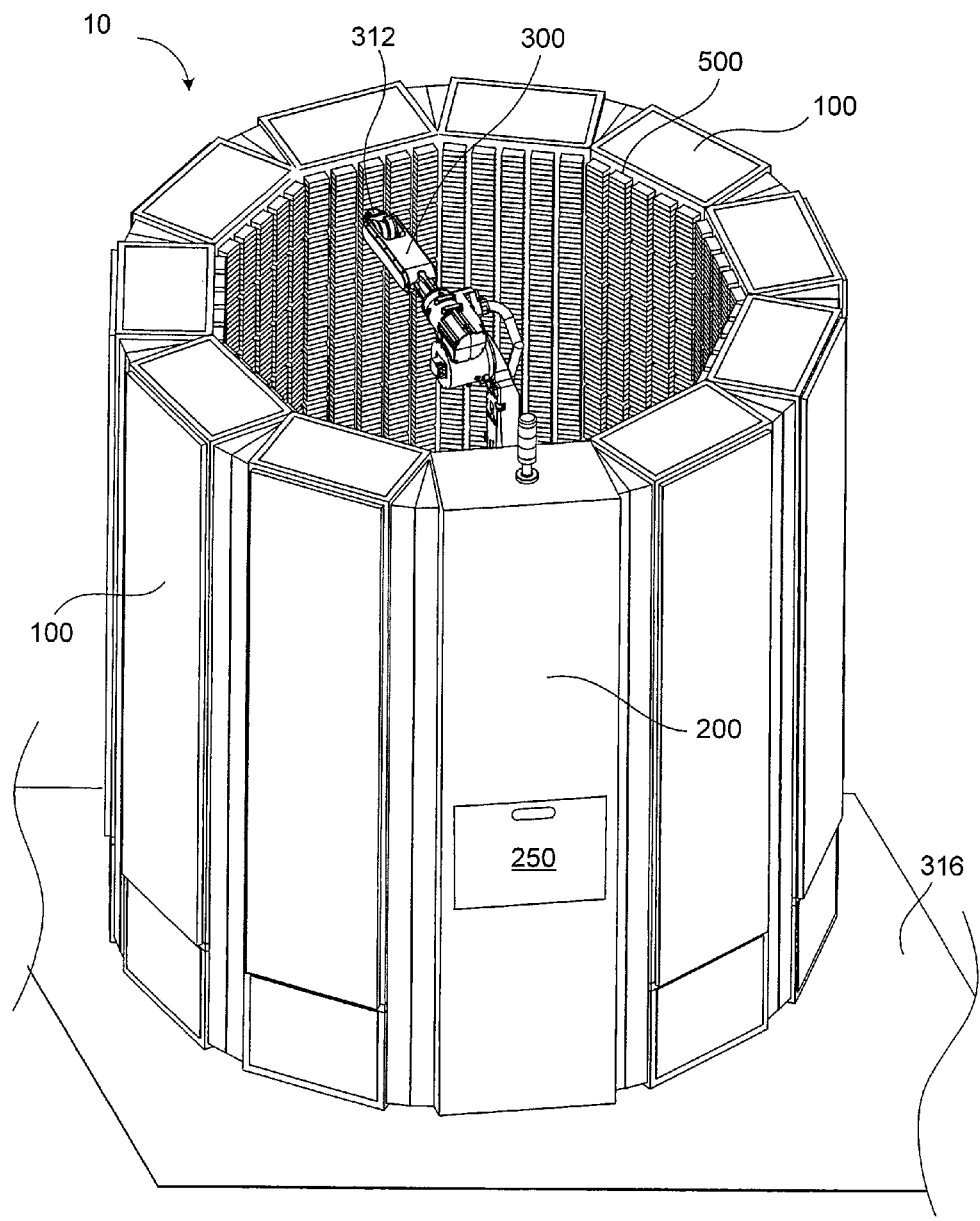
FIG. 2 is a perspective view of a disk drive testing system.
Figure 3B:
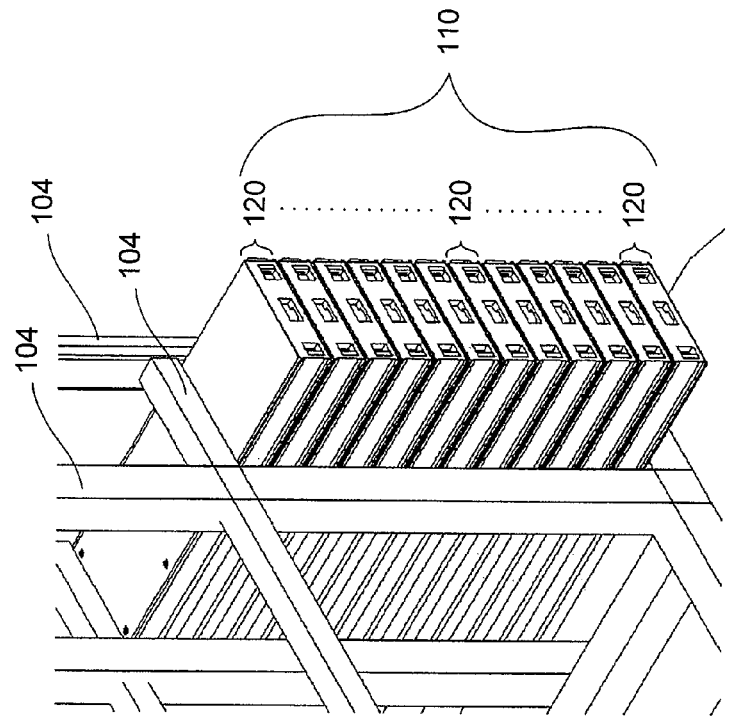
FIG. 3B is a detailed perspective view of a slot bank from the test rack of FIG. 2A.
Figure 3A:
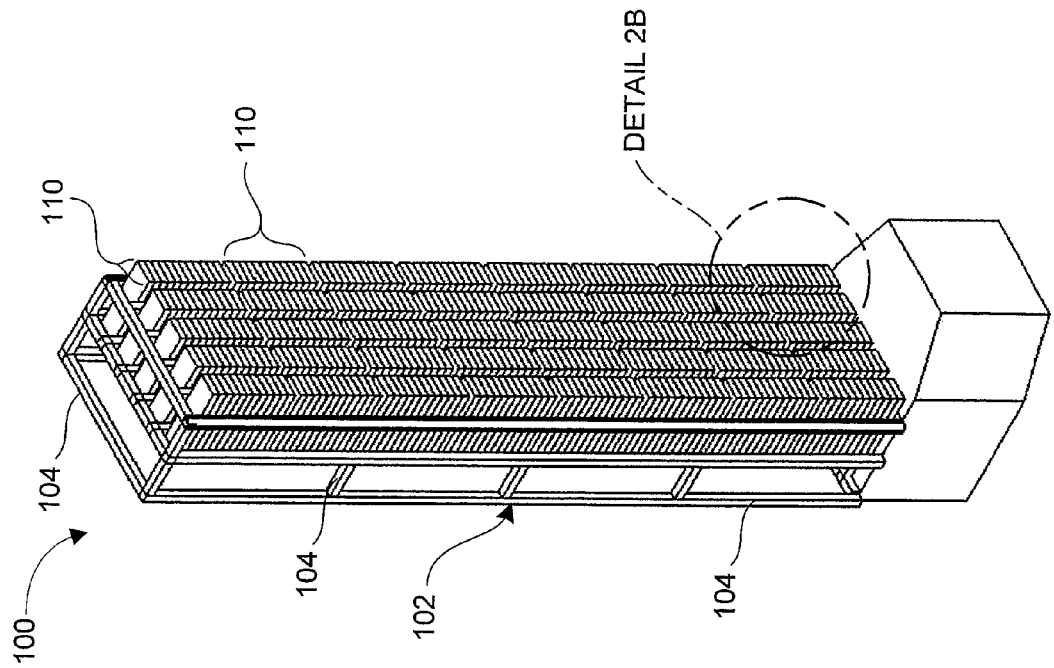
FIG. 3A is perspective view of a test rack.

As shown in FIG. 2, a disk drive testing system 10 includes a plurality of test racks 100 (e.g., 10 test racks shown), a transfer station 200, and a robot 300. As shown in FIGS. 3A and 3B, each test rack 100 generally includes a chassis 102. The chassis 102 can be constructed from a plurality of structural members 104 (e.g., extruded aluminum, steel tubing, and/or composite members) which are fastened together and together define a plurality of slot banks 110. Each slot bank 110 can support a plurality of test slot assemblies 120. As shown in FIG. 4, each test slot assembly 120 includes a disk drive transporter 400 and a test slot 500. The disk drive transporter 400 is used for capturing disk drives 600 (e.g., from the transfer station 200) and for transporting the disk drive 600 to one of the test slots 500 for testing.

Figure 5A:
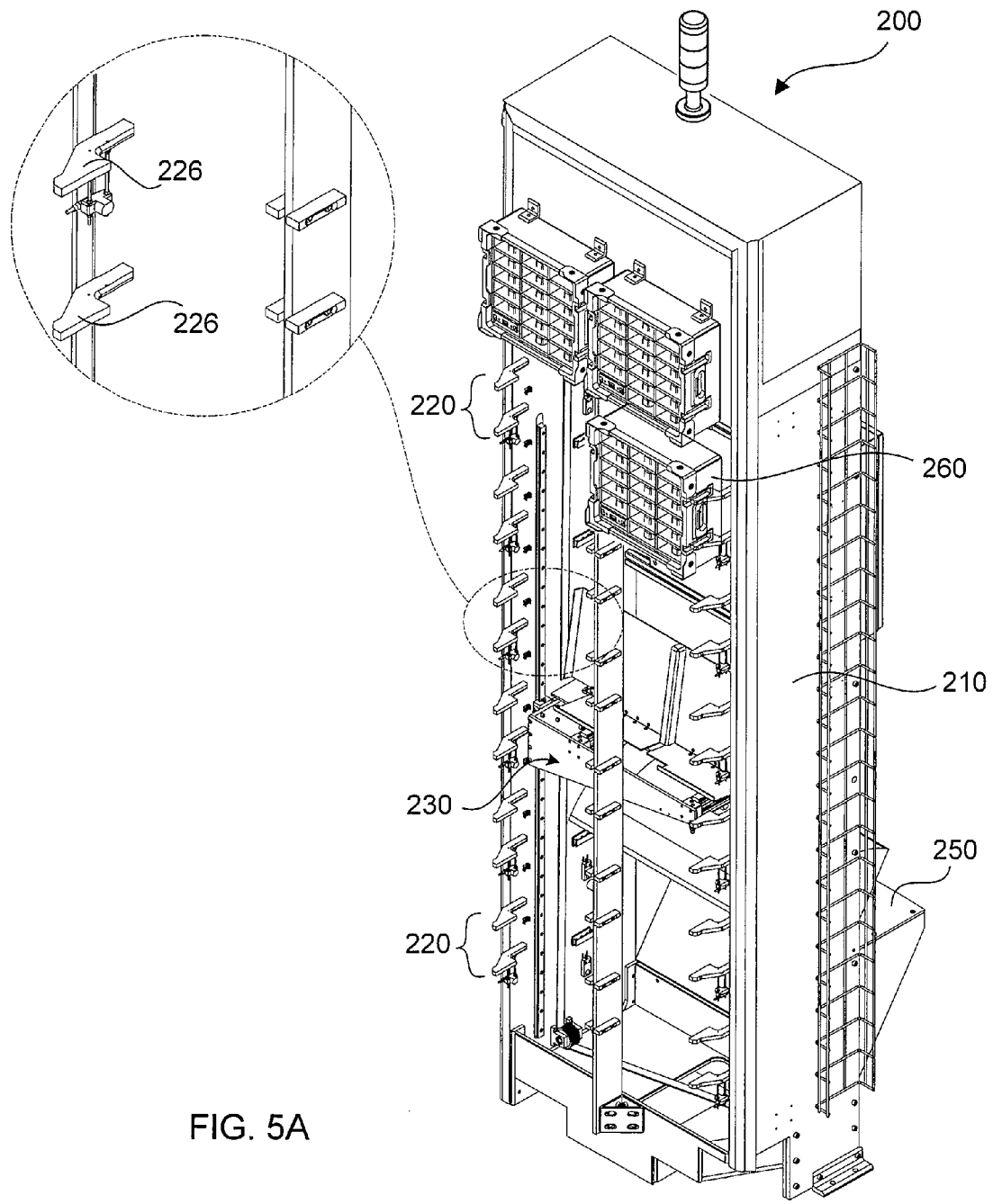
FIG. 5A is a perspective view of a transfer station.

Referring to FIG. 5A, in some implementations, the transfer station 200 includes a transfer station housing 210 and multiple tote presentation support systems 220 disposed on the transfer station housing 210. Each tote presentation support system 220 is configured to receive and support a disk drive tote 260 in a presentation position for servicing by the robot 300.

In some implementations, the tote presentation support systems 220 are each disposed on the same side of the transfer station housing 210 and arranged vertically with respect to the others. Each tote presentation support systems 220 has a different elevation with respect to the others. In some examples, as shown in FIG. 5A, the tote presentation support system 220 includes tote support arms 226 configured to be received by respective arm grooves 266 (FIG. 5B) defined by the disk drive tote 260.

A tote mover 230 is disposed on the transfer station housing 210 and is configured to move relative thereto. The tote mover 230 is configured to transfer the totes 260 between the tote presentation support systems 220 for servicing by the disk drive testing system 10 (e.g. by the robot 300) and a staging area 250 where the totes 260 can be loaded into and unloaded from the transfer station 200 (e.g., by an operator).

Figure 5B:
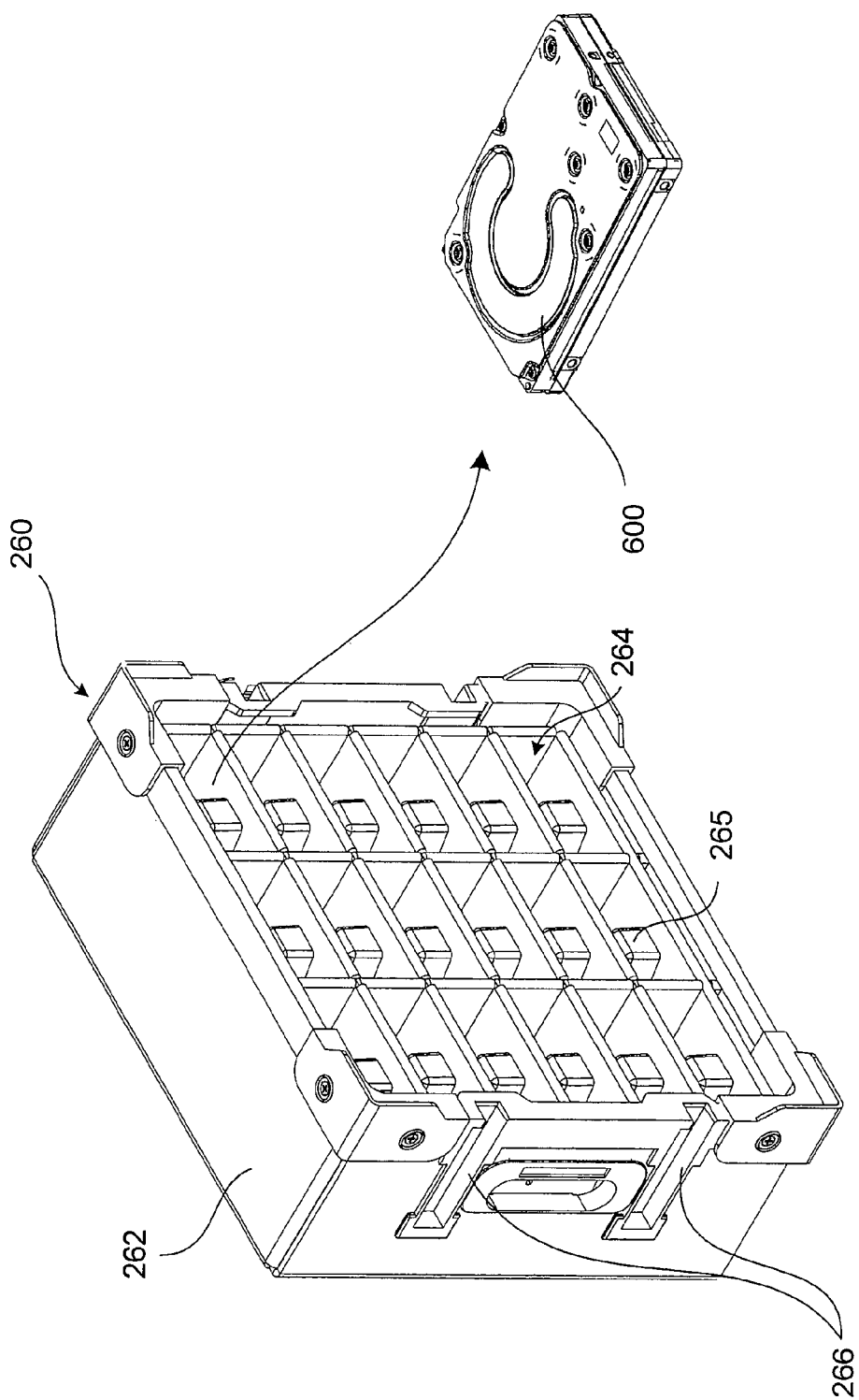
FIG. 5B is a perspective view of a tote and disk drive.

As illustrated in FIG. 5B, the totes 260 include a tote body 262 which defines multiple disk drive receptacles 264 (e.g., 18 shown) that are each configured to house a disk drive 600. Each of the disk drive receptacles 264 includes a disk drive support 265 configured to support a central portion of a received disk drive 600 to allow manipulation of the disk drive 600 along non-central portions. The tote body 262 also defines arm grooves 266 that are configured to engage the tote support arms 226 (FIG. 5A) of the transfer station housing 210 thereby to support the tote 260 (e.g., for servicing by the robot 300 (FIG. 2)).

Figure 6A:
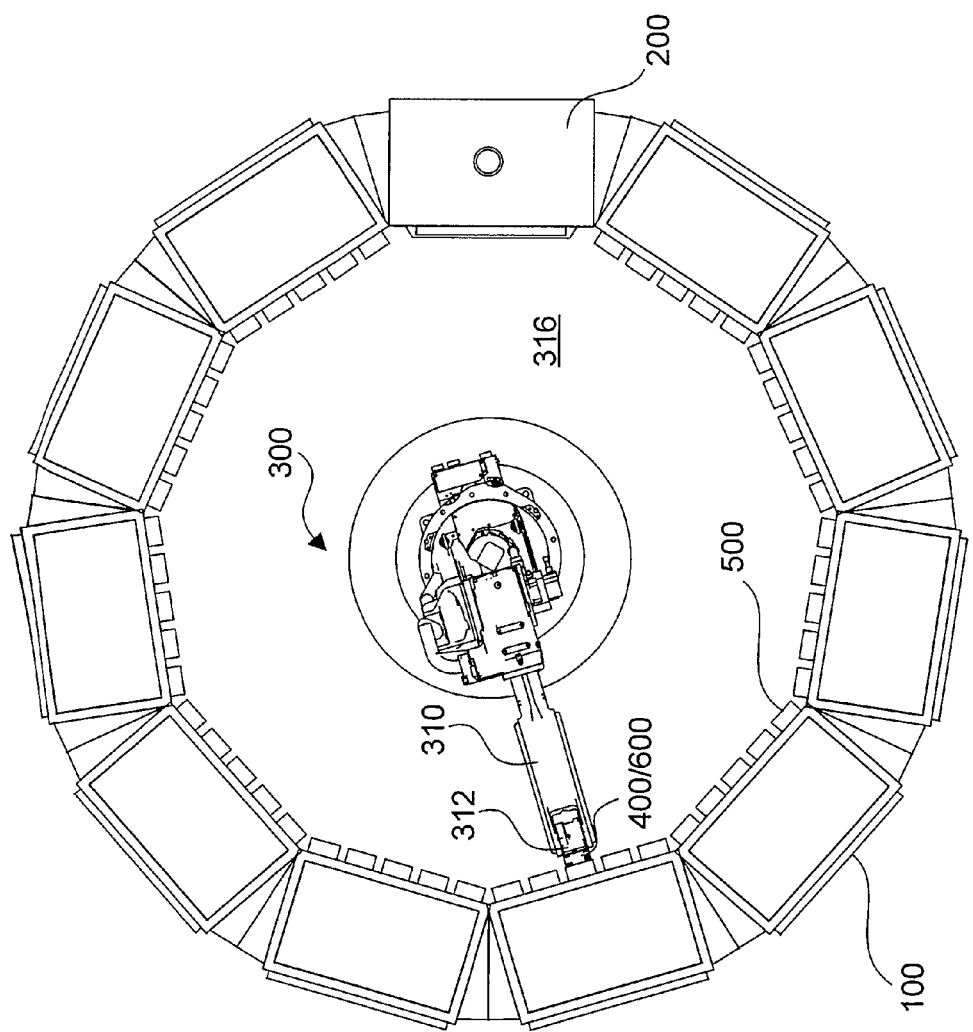
FIG. 6A is a top view of a disk drive testing system.
Figure 6B:
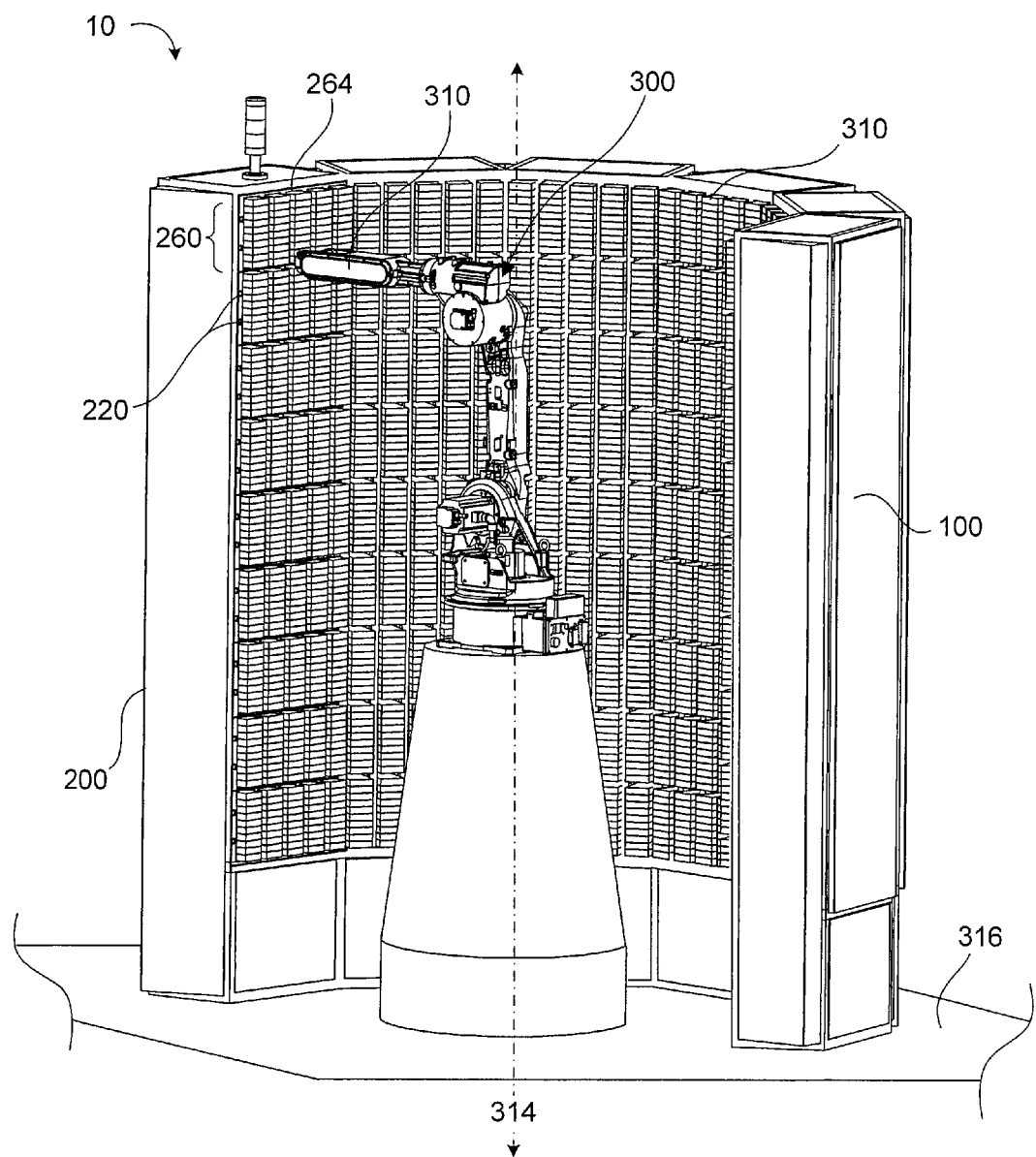
FIG. 6B is a perspective view of a disk drive testing system.

As shown in FIGS. 6A and 6B, the robot 300 includes a robotic arm 310 and a manipulator 312 (FIG. 6A) disposed at a distal end of the robotic arm 310. The robotic arm 310 defines a first axis 314 normal to a floor surface 316 and is operable to rotate through a predetermined arc about and extends radially from the first axis 314. The robotic arm 310 is configured to independently service each test slot 500 by transferring disk drives 600 between the transfer station 200 and one of the test racks 100. In particular, the robotic arm 310 is configured to remove a disk drive transporter 400 from one of the test slots 500 with the manipulator 312, then pick up a disk drive 600 from one the disk drive receptacles 264 at the transfer station 200 with the disk drive transporter 400, and then return the disk drive transporter 400, with a disk drive 600 therein, to the test slot 500 for testing of the disk drive 600. After testing, the robotic arm 310 retrieves the disk drive transporter 400, along with the supported disk drive 600, from one of the test slots 500 and returns it to one of the disk drive receptacles 264 at the transfer station 200 by manipulation of the disk drive transporter 400 (i.e., with the manipulator 312).

Figure 7A:
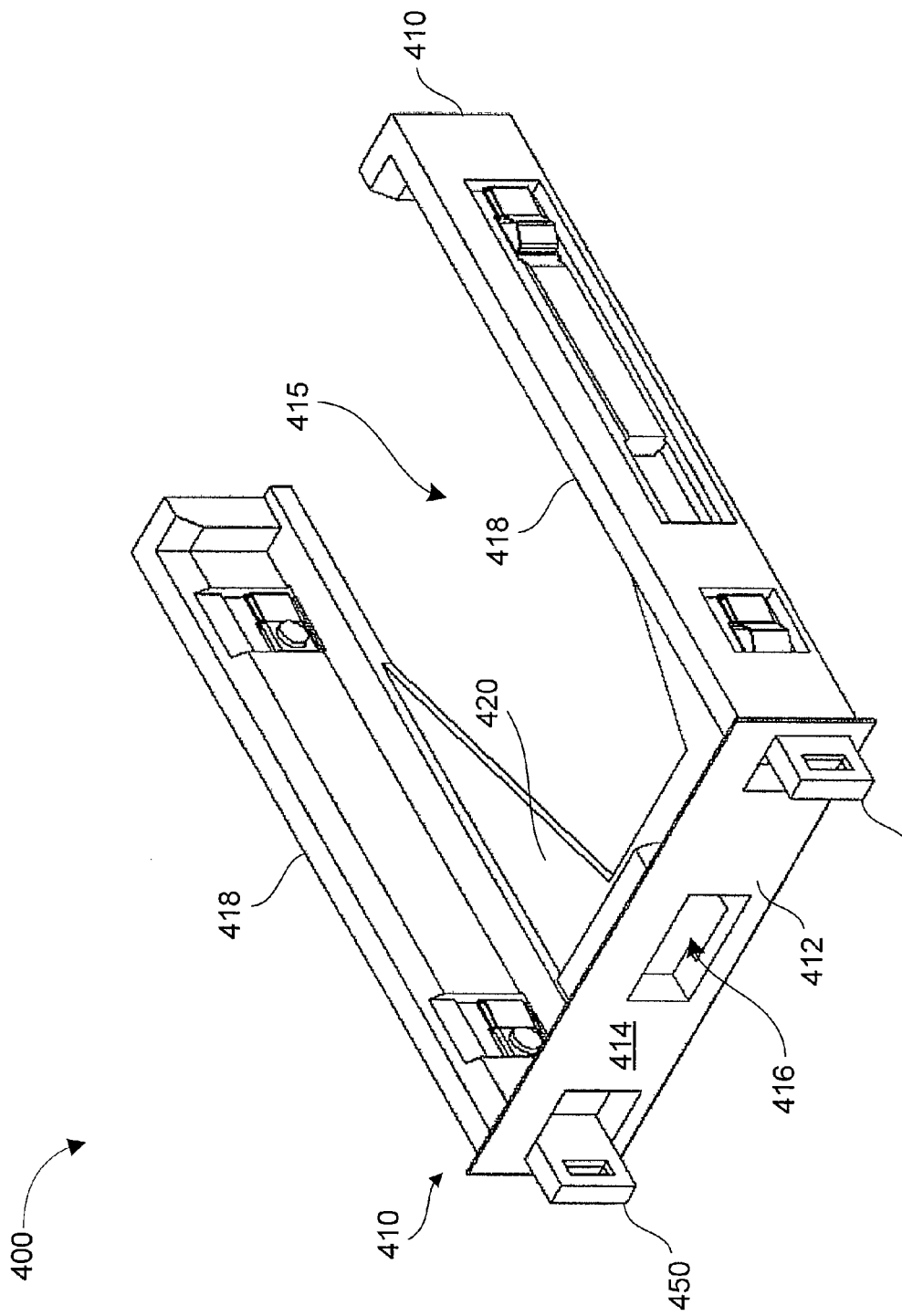
FIGS. 7A and 7B are perspective views of a disk drive transporter.
Figure 7B:
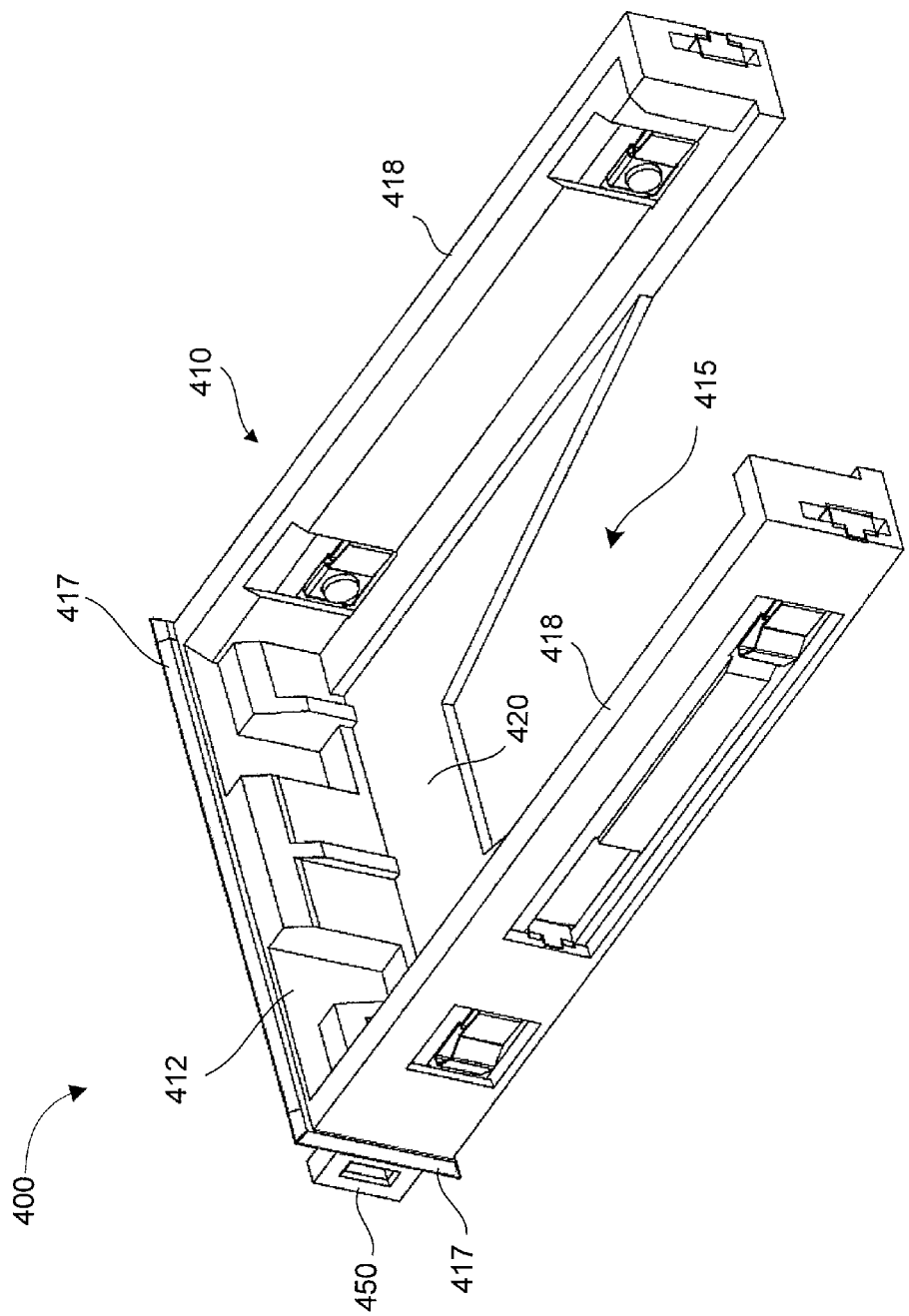

Referring to FIGS. 7A and 7B, the disk drive transporter 400 includes a frame 410 and a clamping mechanism 450. The frame 410 includes a face plate 412. As shown in FIG. 7A, along a first surface 414, the face plate 412 defines an indentation 416. The indentation 416 can be releaseably engaged by the manipulator 312 (FIG. 6A) of the robotic arm 310, which allows the robotic arm 310 to grab and move the transporter 400. As shown in FIG. 7B, the face plate 412 also includes beveled edges 417. When the frame 410 is inserted into one of the test slots 500, the beveled edges 417 of the face plate 412 abut complimentary beveled edges 562 (FIG. 14A) of the test slot 500 to form a seal, which, as described below, helps to inhibit the flow of air into and out of the of the test slot 500. This may be particularly beneficial, for example, when disk drive transporters 400 are inserted into and removed from the test slots 500 via a robot 300. In use, one of the disk drive transporters 400 is removed from one of the test slots 500 with the robot 300 (e.g., by grabbing, or otherwise engaging, the indentation 416 of the transporter 400 with the manipulator 312 of the robot 300). The frame 410 defines a substantially U-shaped opening 415 formed by sidewalls 418 and a base plate 420 that collectively allow the frame 410 to fit around the disk drive support 265 (FIG. 5B) in the tote 260 (FIG. 5B) so that the disk drive transporter 400 can be moved (e.g., via the robotic arm 300) into a position beneath one of the disk drives 600 housed in one of the disk drive receptacles 264 of the tote 260. The disk drive transporter 400 can then be raised (e.g., by the robotic arm 310) into a position engaging the disk drive 600 for removal off of the disk drive support 265 in the tote 260.

Figure 8A:
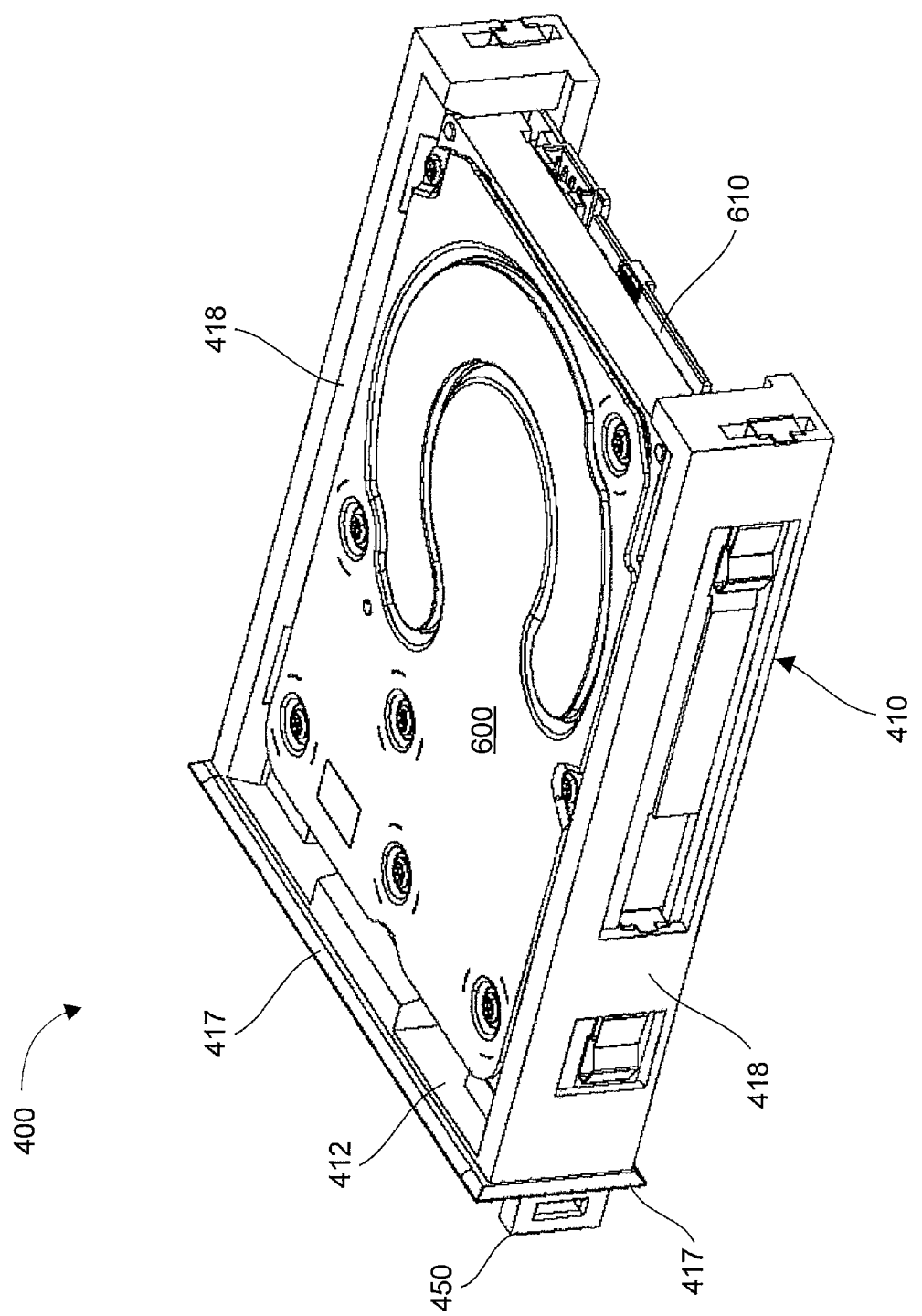
FIG. 8A is a perspective view of a disk drive transporter supporting a disk drive.
Figure 8B:
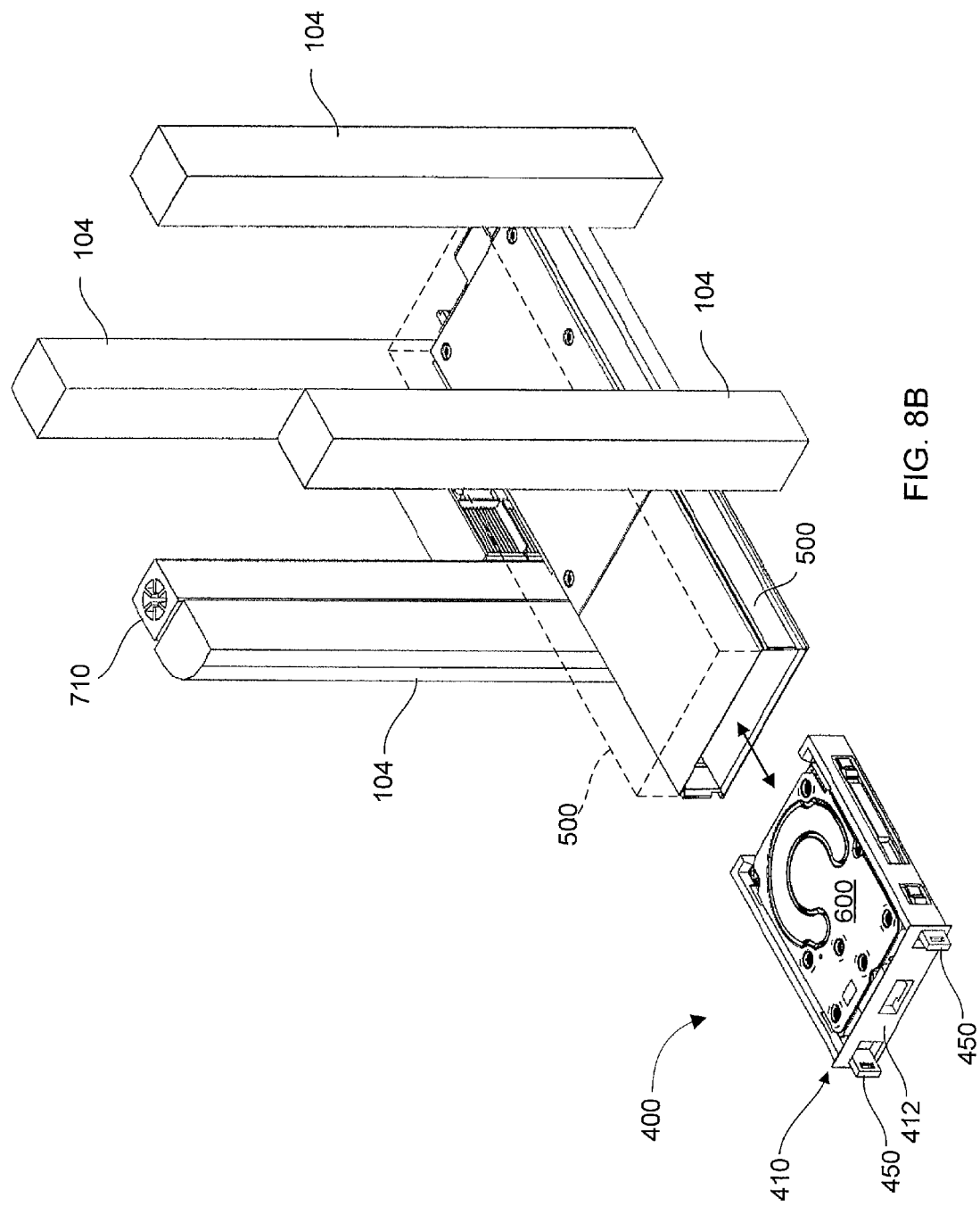
FIG. 8B is a perspective view of a disk drive transporter carrying a disk drive aligned for insertion into a test slot.
Figure 16:
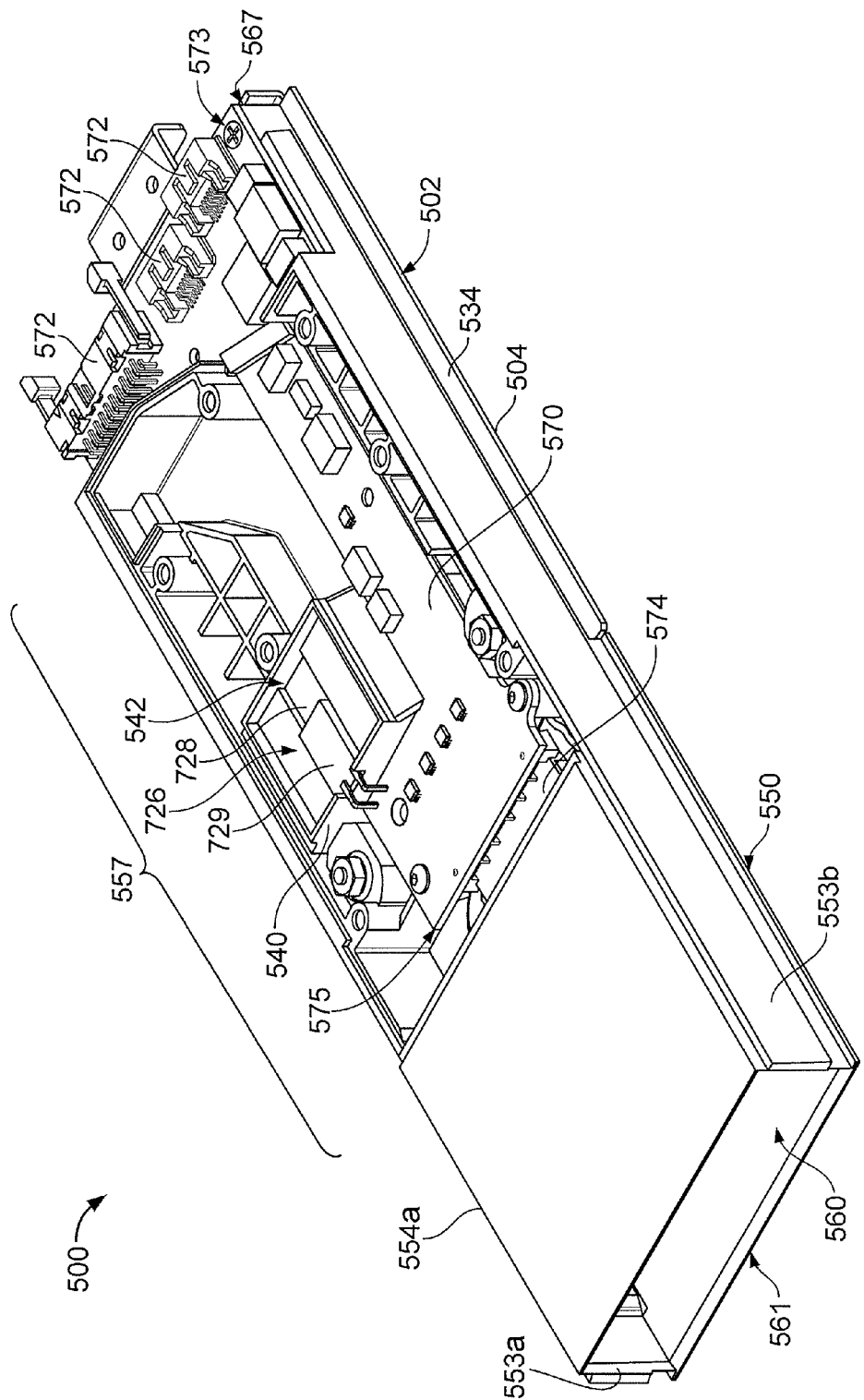
FIGS. 16 and 17 are front and rear perspective views of a test slot showing a connection interface board mounted to the test slot housing.

As illustrated in FIGS. 8A and 8B, with the disk drive 600 in place within the frame 410 of the disk drive transporter 400, the disk drive transporter 400 and the disk drive 600 together can be moved by the robotic arm 310 (FIG. 6A) for placement within one of the test slots 500. The manipulator 312 (FIG. 6A) is also configured to initiate actuation of a clamping mechanism 450 disposed in the disk drive transporter 400. A detailed description of the manipulator and other details and features combinable with those described herein may be found in the following U.S. patent application filed concurrently herewith, entitled "Transferring Disk Drives Within Disk Drive Testing Systems", inventors: Evgeny Polyakov et al., and having assigned Ser. No. 12/104,536, the entire contents of the aforementioned application is hereby incorporated by reference. This allows actuation of the clamping mechanism 450 before the transporter 400 is moved from the tote 260 to the test slot 500 to inhibit movement of the disk drive 600 relative to the disk drive transporter 400 during the move. Prior to insertion in the test slot 500, the manipulator 312 can again actuate the clamping mechanism 450 to release the disk drive 600 within the frame 410. This allows for insertion of the disk drive transporter 400 into one of the test slots 500, until the disk drive 600 is in a test position with a disk drive connector 610 engaged with a test slot connector 574 (FIG. 16). The clamping mechanism 450 may also be configured to engage the test slot 500, once received therein, to inhibit movement of the disk drive transporter 400 relative to the test slot 500. In such implementations, once the disk drive 600 is in the test position, the clamping mechanism 450 is engaged again (e.g., by the manipulator 312) to inhibit movement of the disk drive transporter 400 relative to the test slot 500. The clamping of the transporter 400 in this manner can help to reduce vibrations during testing. A detailed description of the clamping mechanism 450 and other details and features combinable with those described herein may be found in the following U.S. patent application filed Dec. 18, 2007, entitled "DISK DRIVE TRANSPORT, CLAMPING AND TESTING", inventors: Brian Merrow et al., and having assigned Ser. No. 11/959,133, the entire contents of the which are hereby incorporated by reference.

Figure 9:
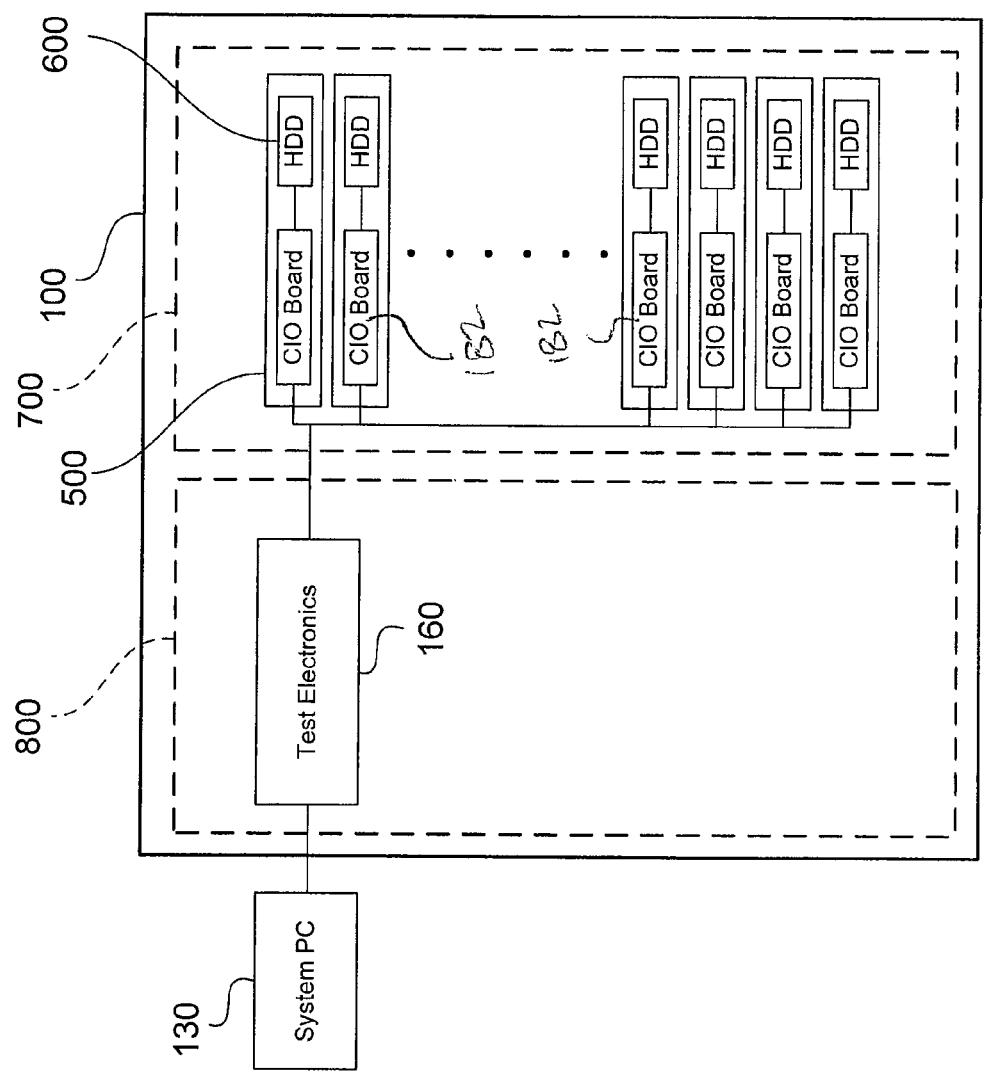
FIGS. 9 and 10 are schematic views of self-test and functional test circuitry.

Referring to FIG. 9, in some implementations, the disk drive testing system 10 also includes at least one computer 130 in communication with the test slots 500. The computer 130 may be configured to provide inventory control of the disk drives 600 and/or an automation interface to control the disk drive testing system 10. Test electronics 160 are in communication with each test slot 500. The test electronics 160 are configured to communicate with a disk dive 600 received by within the test slot 500.

Figure 10:
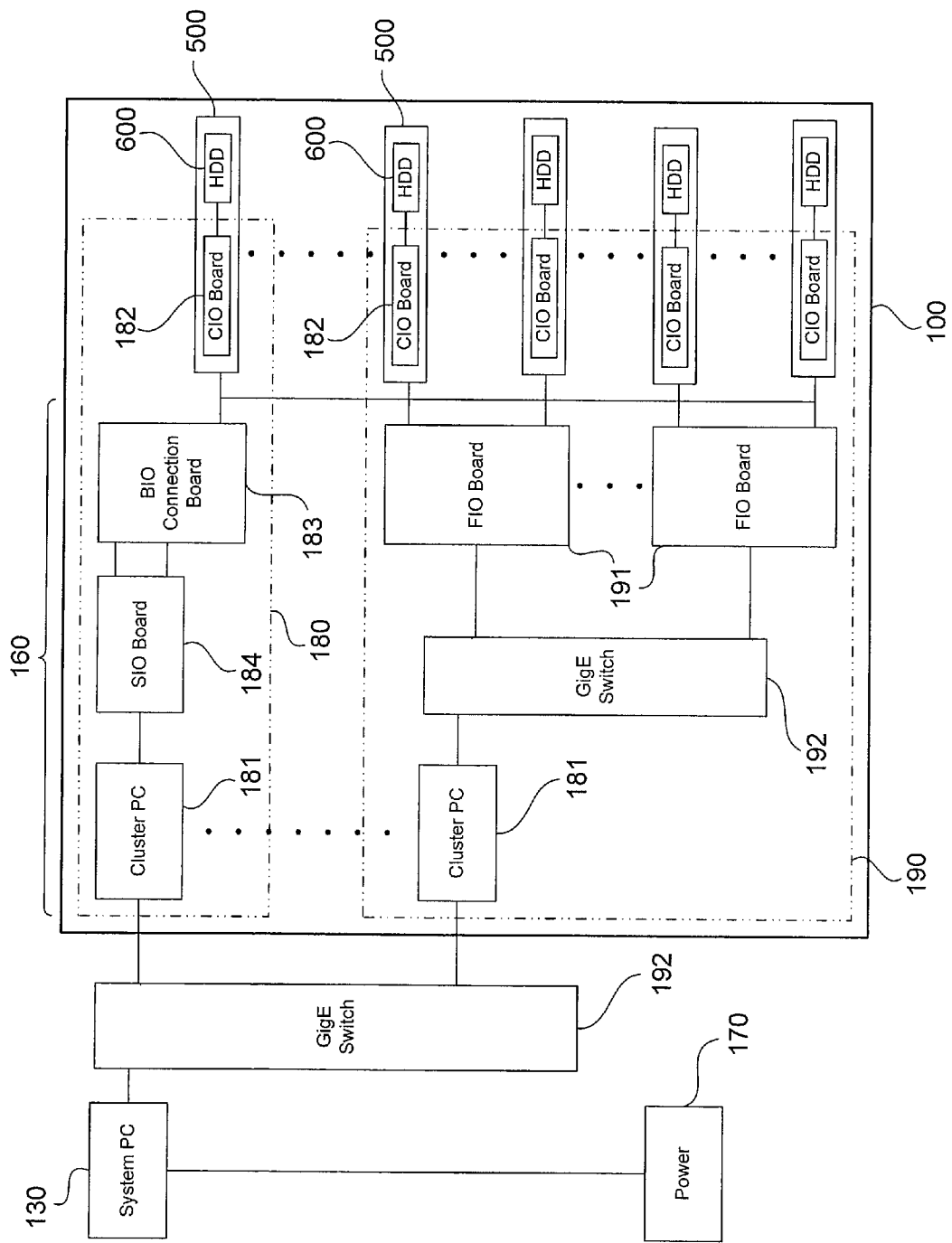

Referring to FIG. 10, a power system 170 supplies power to the disk drive testing system 10. The power system 170 may monitor and/or regulate power to the received disk drive 600 in the test slot 500. In the example illustrated in FIG. 10, the test electronics 160 within each test rack 100 include at least one self-testing system 180 in communication with at least one test slot 500. The self-testing system 180 tests whether the test rack 100 and/or specific sub-systems, such as the test slot 500, are functioning properly. The self-testing system 180 includes a cluster controller 181, one or more connection interface circuits 182 each in electrical communication with a disk drive 600 received within the test slot 500, and one or more block interface circuits 183 in electrical communication with the connection interface circuit 182. The cluster controller 181, in some examples, is configured to run one or more testing programs with a capacity of approximately 120 self-tests and/or 60 functionality tests of disk drives 600. The connection interface circuits 182 and the block interface circuit(s) 183 are configured to self-test. However, the self-testing system 180 may include a self-test circuit 184 configured to execute and control a self-testing routine on one or more components of the disk drive testing system 10. The cluster controller 181 may communicate with the self-test circuit 184 via Ethernet (e.g. Gigabit Ethernet), which may communicate with the block interface circuit(s) 183 and onto the connection interface circuit(s) 182 and disk drive(s) 600 via universal asynchronous receiver/transmitter (UART) serial links. A UART is usually an individual (or part of an) integrated circuit used for serial communications over a computer or peripheral device serial port. The block interface circuit(s) 183 is/are configured to control power to and temperature of the test slots 500, and each block interface circuit 183 may control one or more of the test slots 500 and/or disk drives 600.

In some examples, the test electronics 160 can also include at least one functional testing system 190 in communication with at least one test slot 500. The functional testing system 190 tests whether a received disk drive 600, held and/or supported in the test slot 500 by the disk drive transporter 400, is functioning properly. A functionality test may include testing the amount of power received by the disk drive 600, the operating temperature, the ability to read and write data, and the ability to read and write data at different temperatures (e.g. read while hot and write while cold, or vice versa). The functionality test may test every memory sector of the disk drive 600 or only random samplings. The functionality test may test an operating temperature of air around the disk drive 600 and also the data integrity of communications with the disk drive 600. The functional testing system 190 includes a cluster controller 181 and at least one functional interface circuit 191 in electrical communication with the cluster controller 181. A connection interface circuit 182 is in electrical communication with a disk drive 600 received within the test slot 500 and the functional interface circuit 191. The functional interface circuit 191 is configured to communicate a functional test routine to the disk drive 600. The functional testing system 190 may include a communication switch 192 (e.g. Gigabit Ethernet) to provide electrical communication between the cluster controller 181 and the one or more functional interface circuits 191. Preferably, the computer 130, communication switch 192, cluster controller 181, and functional interface circuit 191 communicate on an Ethernet network. However, other forms of communication may be used. The functional interface circuit 191 may communicate to the connection interface circuit 182 via Parallel AT Attachment (a hard disk interface also known as IDE, ATA, ATAPI, UDMA and PATA), SATA, or SAS (Serial Attached SCSI).

Test Slot

Figure 11:
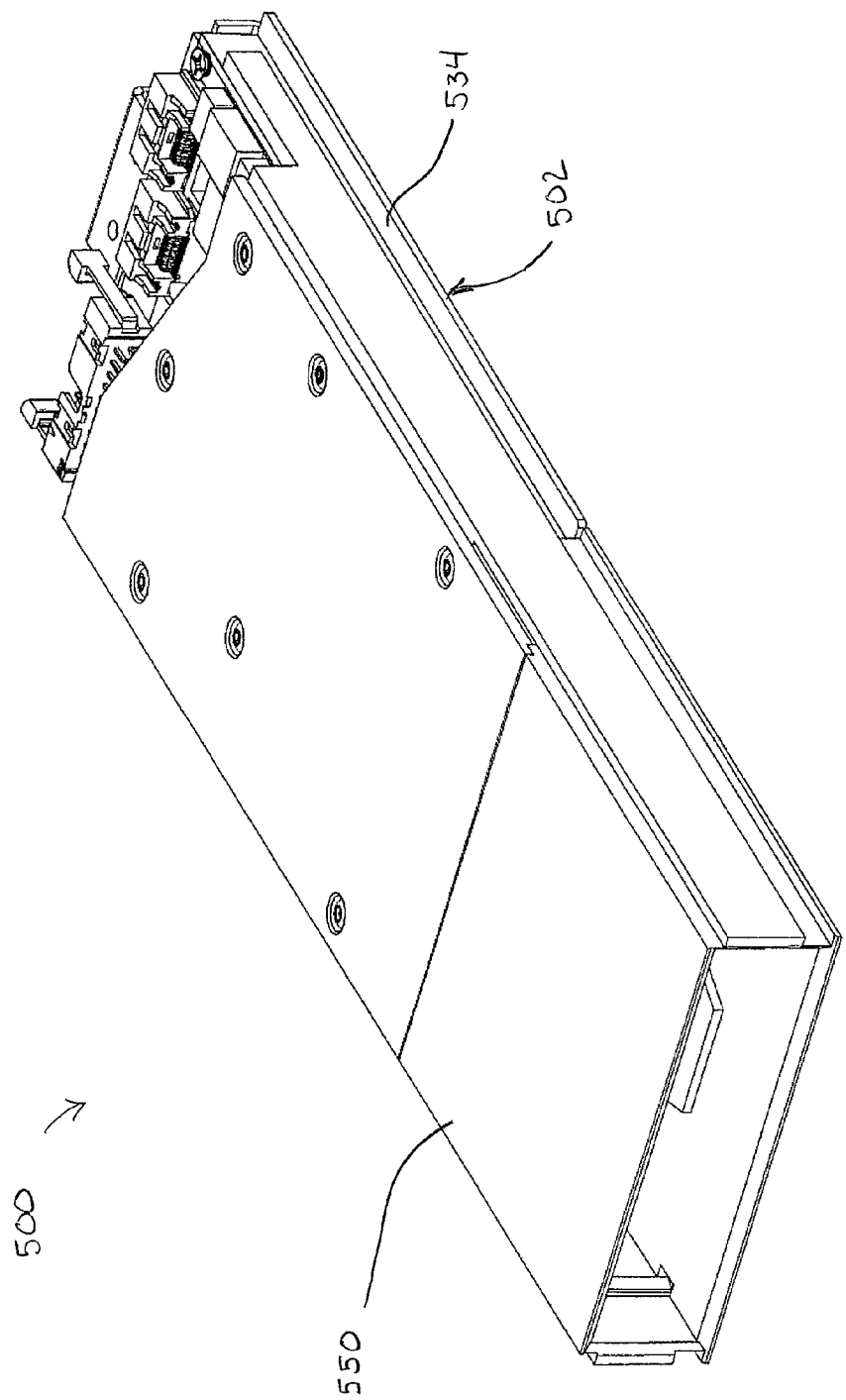
FIG. 11 is a perspective view of a test slot.
Figure 12:
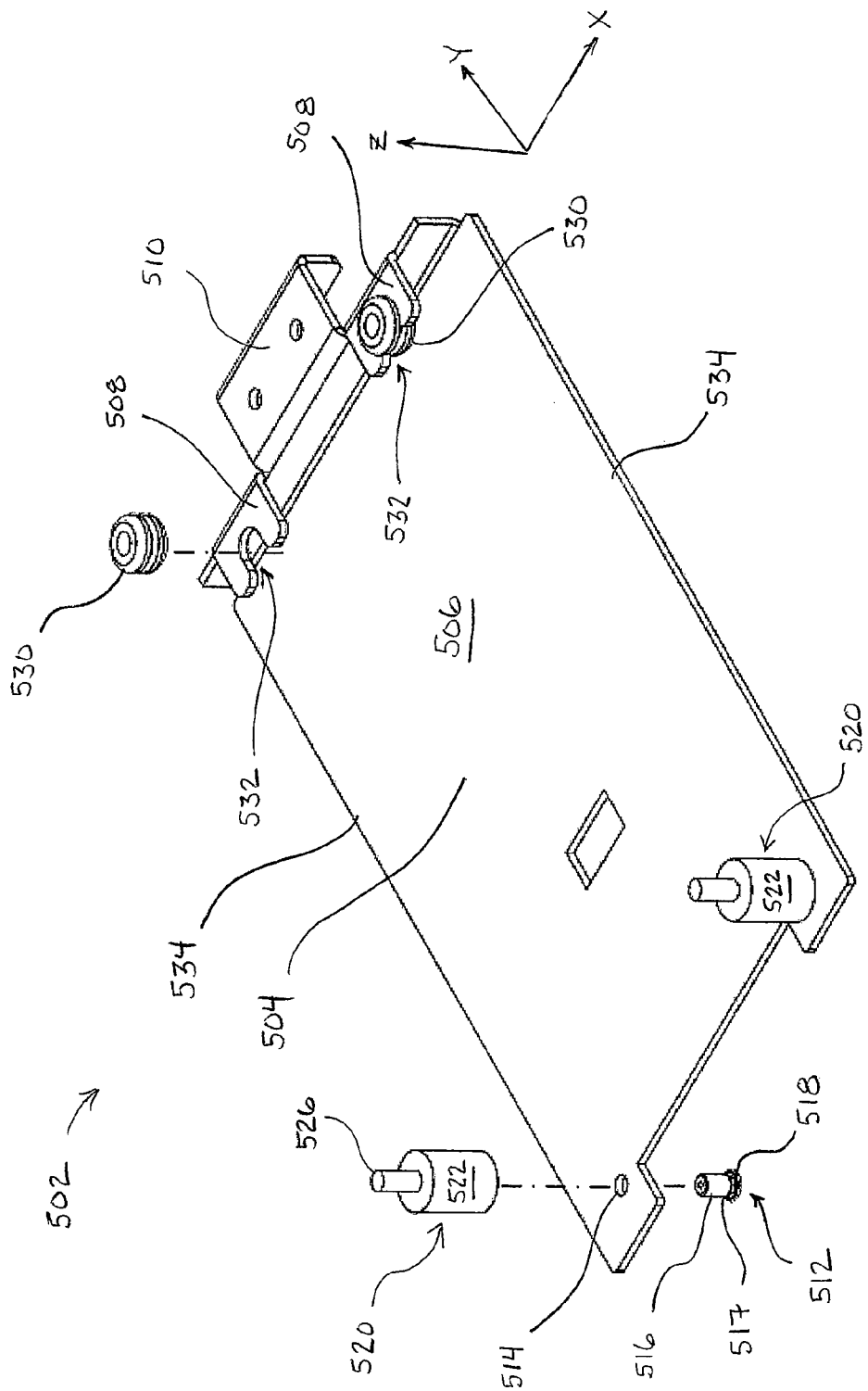
FIG. 12 is a perspective view of a mounting plate assembly.

As shown in FIG. 11, each of the test slots 500 includes a housing 550 that is mounted to and supported by a mounting plate assembly 502. As shown in FIG. 12 the mounting plate assembly 502 includes a mounting plate 504 that includes a main body member 506, a flange member 508, and a handle 510. The main body member 506 also includes a pair of self-clinching studs 512 (one shown), such as available from PennEngineering of Danboro, Pa., which are press fit into through holes 514 in the main body member 506. The self-clinching studs 512 generally include a threaded screw portion 516 and a head 518 disposed at a first end 517 of the screw portion 516. As illustrated in FIG. 12, the threaded screw portion passes through the through hole 514 in the main body member 506 and the head 518 engages the main body member 506 in a press-fit manner, thereby securing the self-clinching studs 512 against movement relative to the main body member 506.

Figure 13:
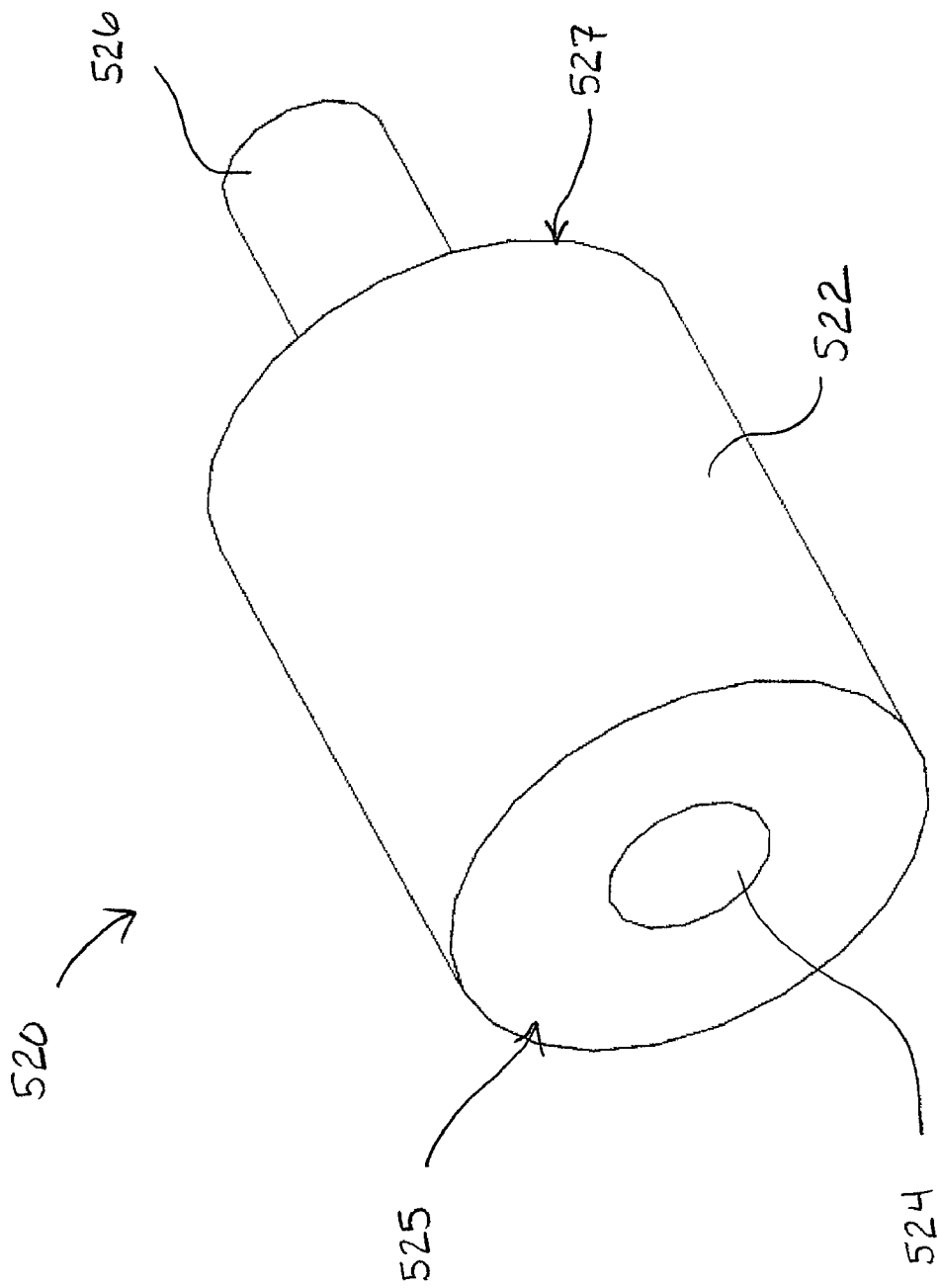
FIG. 13 is a perspective view of a male-female isolator.

The mounting plate assembly 502 also includes a pair of isolators (e.g., male-female isolators 520). As shown in FIG. 13, the male-female isolators 520 generally include a body portion 522 formed from a mechanical vibration isolating material, such as urethane elastomer, e.g., having a durometer of between about 45 shore A and about 60 shore A. The body portion 522 is sandwiched between a female threaded fastener 524, disposed at a first end 525 of the body portion 522, and a male threaded fastener 526 male threaded fastener 526 disposed at a second end 527 of the body portion 522. As illustrated in FIG. 12, the male-female isolators 520 are fastened the main body member 506 by screwing the female threaded fastener 524 of the male-female isolators 520 on to one of the self-clinching studs 512.

Referring still to FIG. 12, the mounting plate assembly 502 also includes a pair of isolators (e.g., grommets 530). The grommets 530 may be formed from a mechanical vibration isolating material, such as thermoplastic vinyl, e.g., having a durometer of between about 45 shore A and about 60 shore A.

This multiple isolator arrangement also provides the ability to tune the test slot 500 (e.g., via isolator selection) to better isolate particular frequencies and axes of interest. For example, if a drive was sensitive to y-rotary (rotation about the long axis of the drive), the isolators (e.g., the male-female isolators 520 and/or the grommets 530) could be made stiffer (e.g., replaced with harder components) to limit y rotation. As shown in FIG. 12, the flange member 508 defines a pair of U-shaped indentures or forked openings 532 each of which is configured to receive and support one of the grommets 530. The main body member 506 also defines a pair of mounting flanges 534, which, as discussed below, are configured to form a mounting connection with the test rack chassis 102.

Figure 14A:
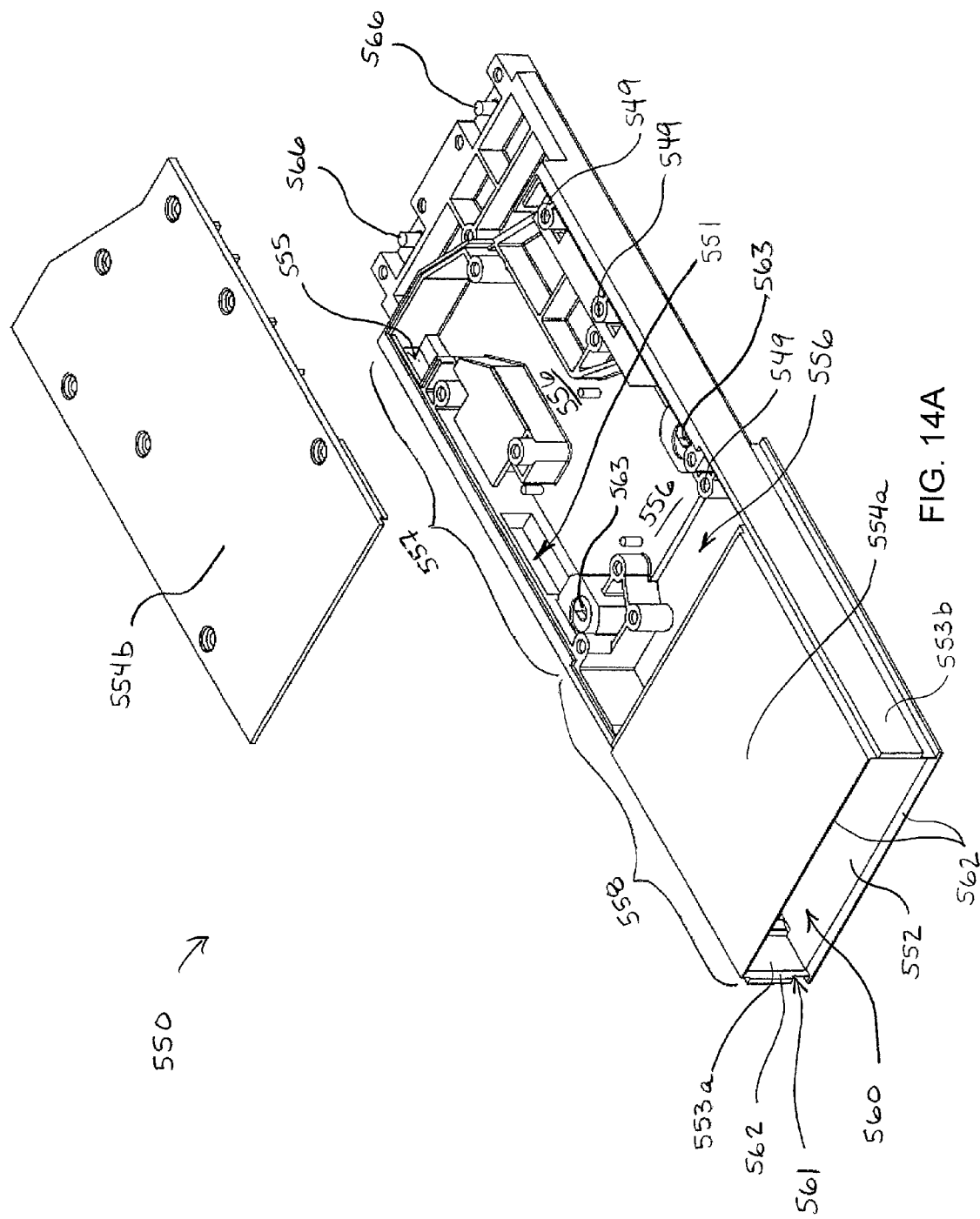
FIGS. 14A-14C are perspective views of a test slot housing.
Figure 14B:
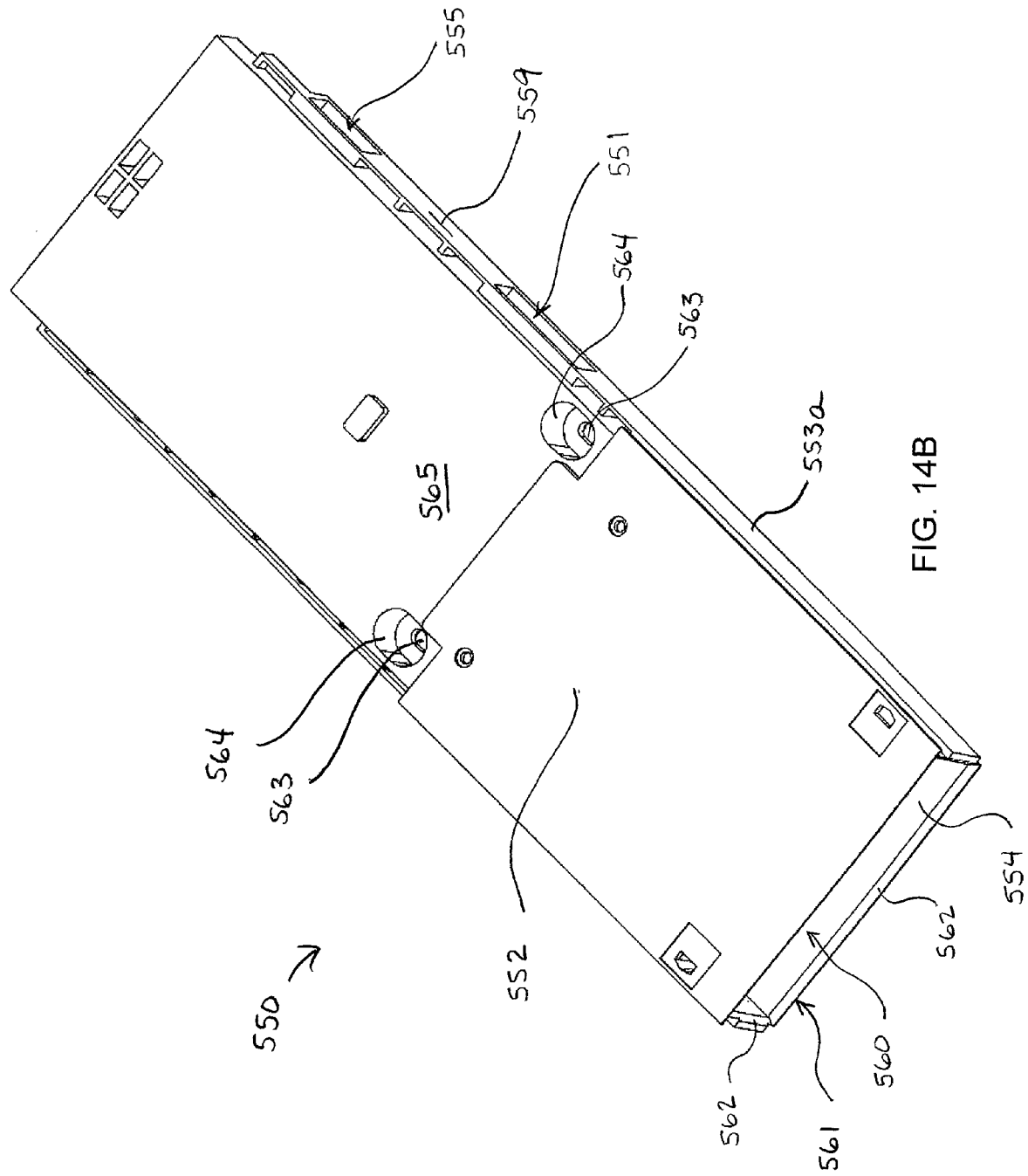

Referring to FIGS. 14A and 14B, as mentioned above, each of the test slots 500 also includes a housing 550 having a base 552, first and second upstanding walls 553a, 553b and first and second covers 554a, 554b. In the illustrated embodiment, the first cover 554a is integrally molded with the base 552 and the upstanding walls 553a, 553b. The housing 550 defines an internal cavity 556 which includes a rear portion 557 and a front portion 558. The front portion 558 defines a test compartment 560 for receiving and supporting one of the disk drive transporters 400. The base 552, upstanding walls 553a, 553b, and the first cover 514a together define a first open end 561, which provides access to the test compartment 560 (e.g., for inserting and removing the disk drive transporter 400), and the beveled edges 562, which abut the face plate 412 of a disk drive transporter 400 inserted in the test slot 500 to provide a seal that inhibits the flow of air into and out of the test slot 500 via the first open end 561. The first upstanding wall 553*a* defines an inlet aperture 551 and an outlet aperture 555. The inlet and outlet apertures 551, 555 extend between an outer surface 559 (FIGS. 14B and 14C) of the housing 550 and the internal cavity 556.

As shown in FIG. 14A, the rear portion 557 of the internal cavity 556 includes a pair of through holes 563 that are configured to receive the male threaded fasteners 526 of the male-female isolators 520 (see, e.g., FIGS. 12 & 13) therein. As shown in FIG. 14B, the through holes 563 extend from the internal cavity 556, through to a pair of counterbore recesses 564 formed along a bottom surface 565 of the base 552 of the housing 550. As discussed in greater detail below, the counterbore recesses 564 are each configured to receive the body portion 522 of a corresponding the male-female isolators 520 therein. The housing 550 also includes a plurality of mounting holes 549 to receive mounting hardware, e.g., screws, for mounting the second cover member 554*b* and a connection interface board 570 (described below; see also, e.g., FIG. 16) to the housing 550.

Figure 14C:
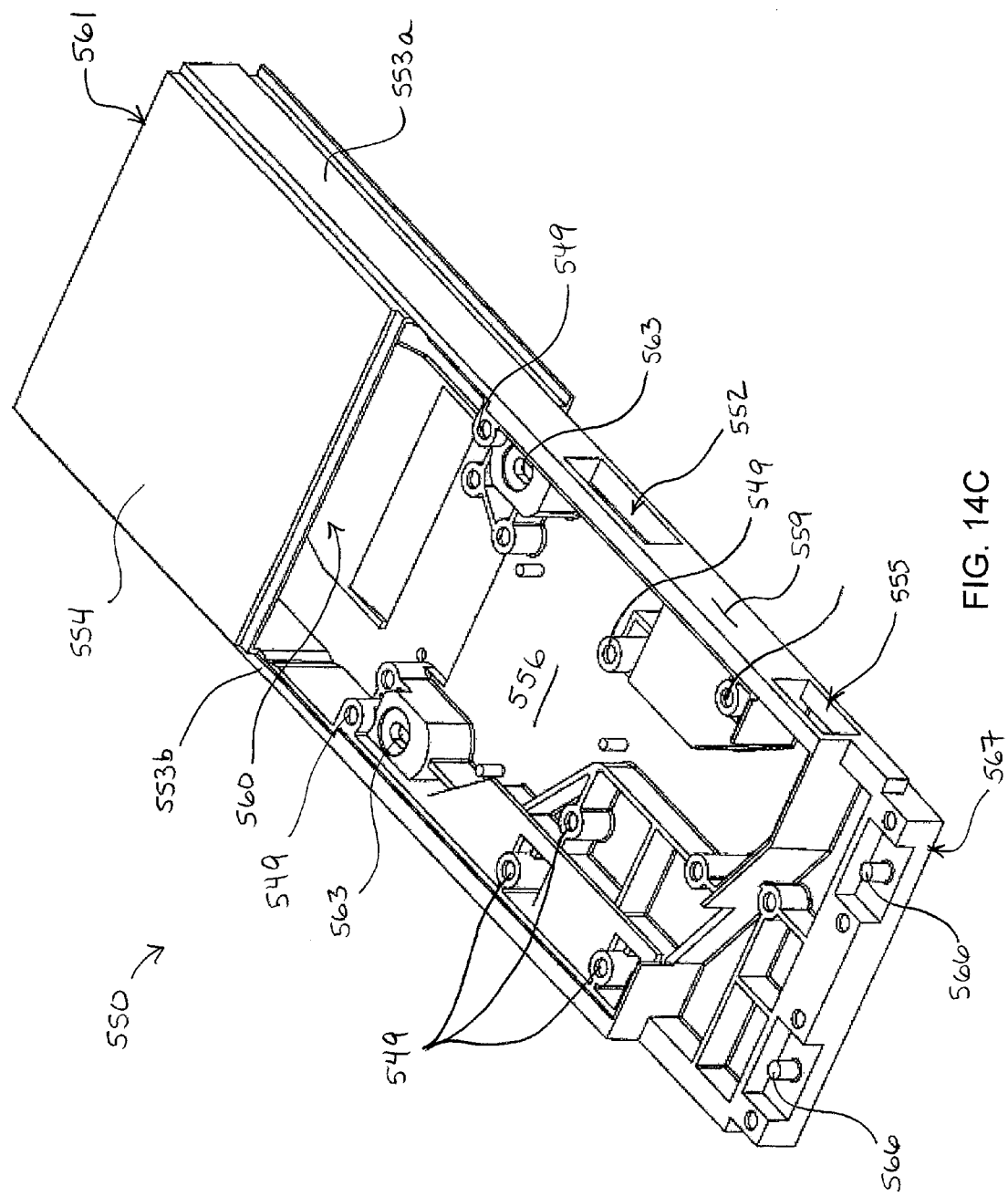
Figure 15A:
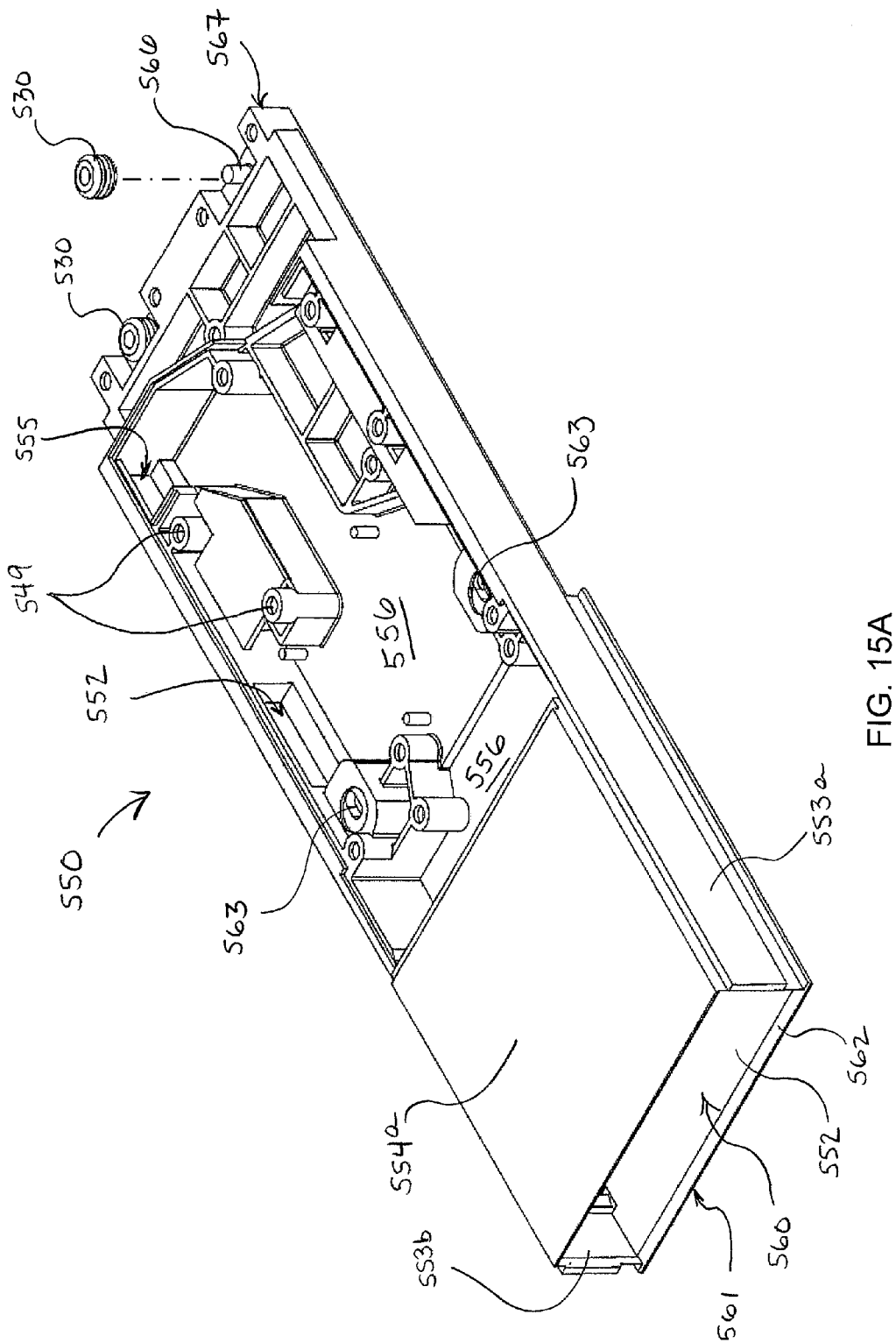
FIGS. 15A-15D illustrate assembly of a test slot.
Figure 15B:
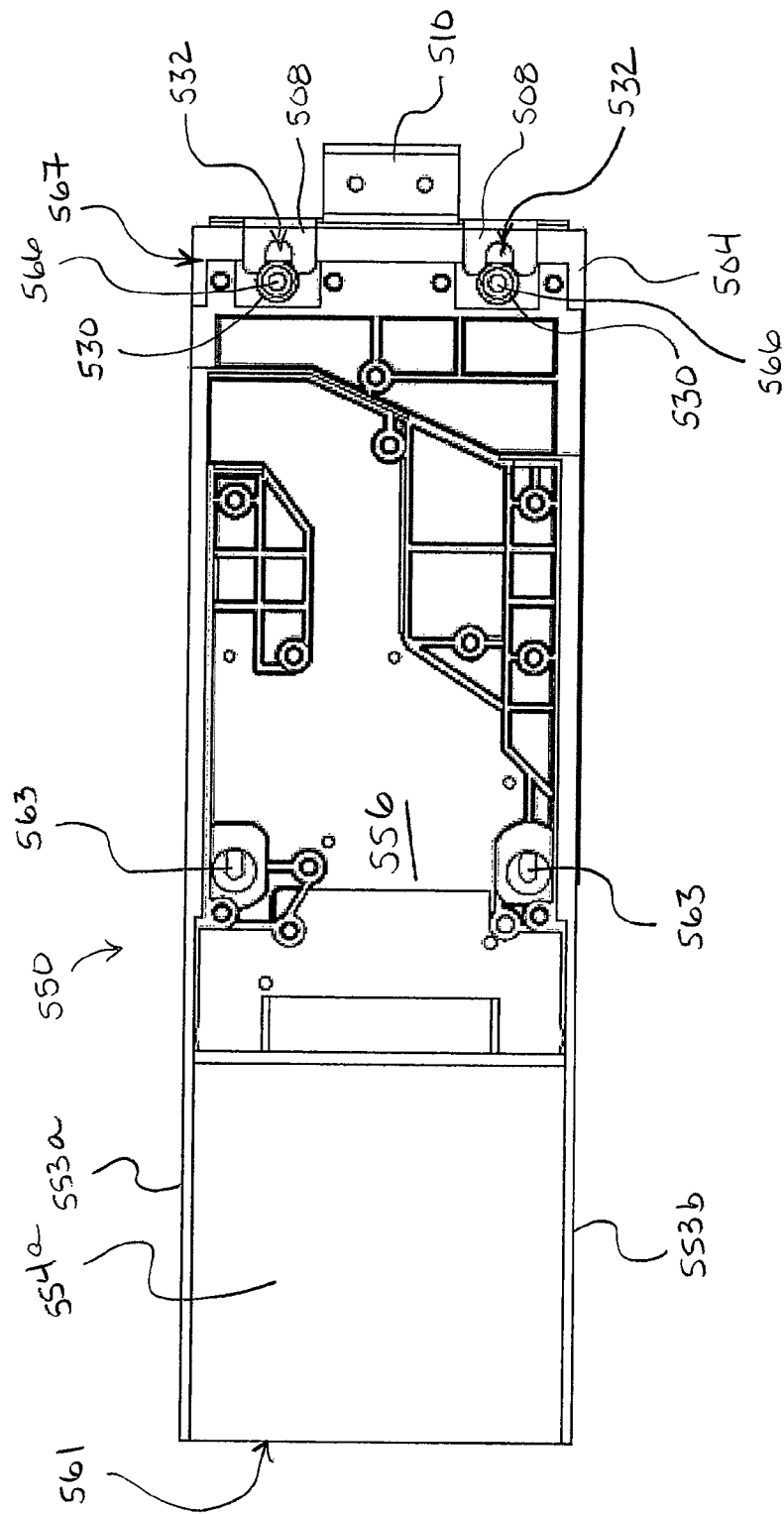
Figure 15C:
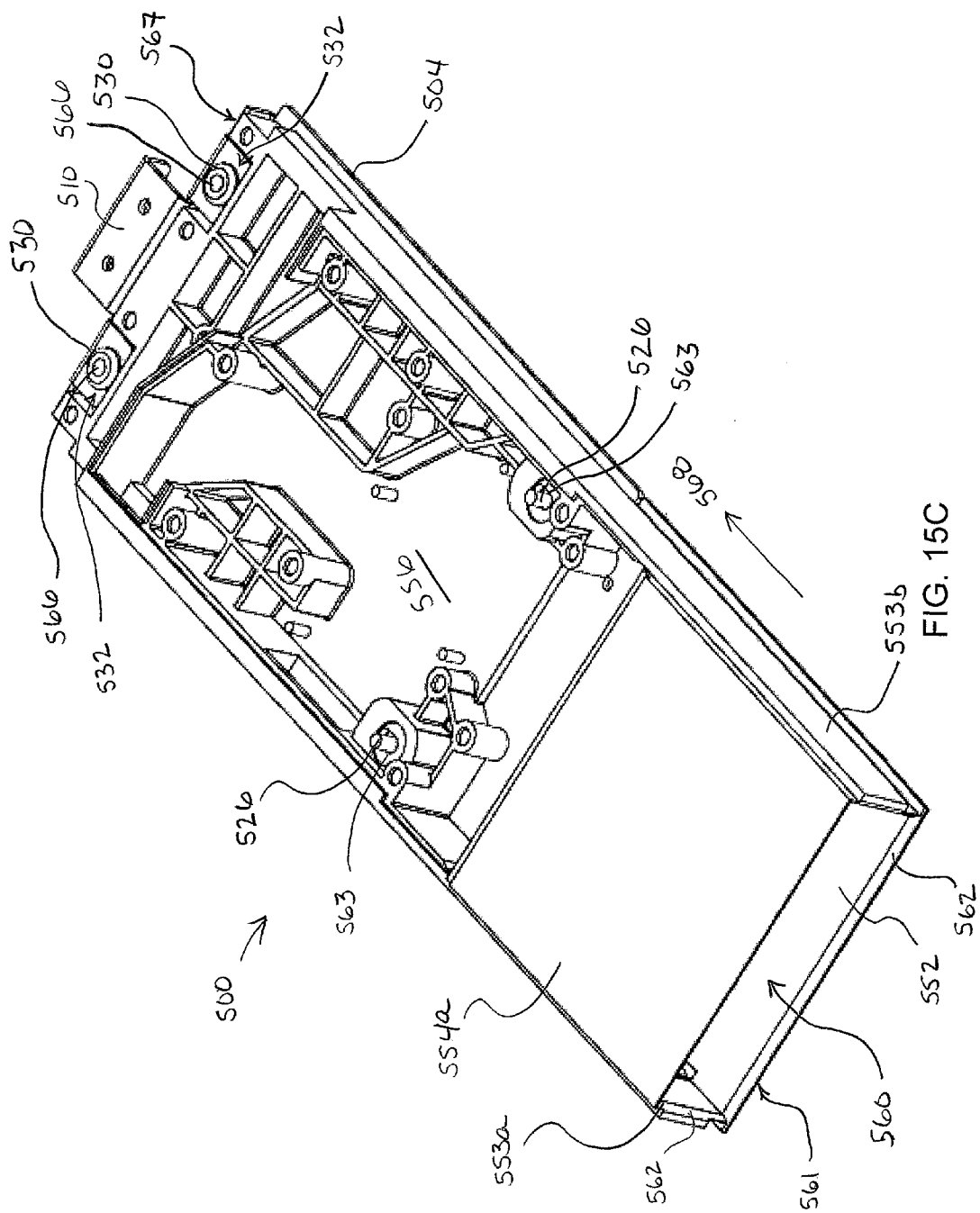
Figure 15D:
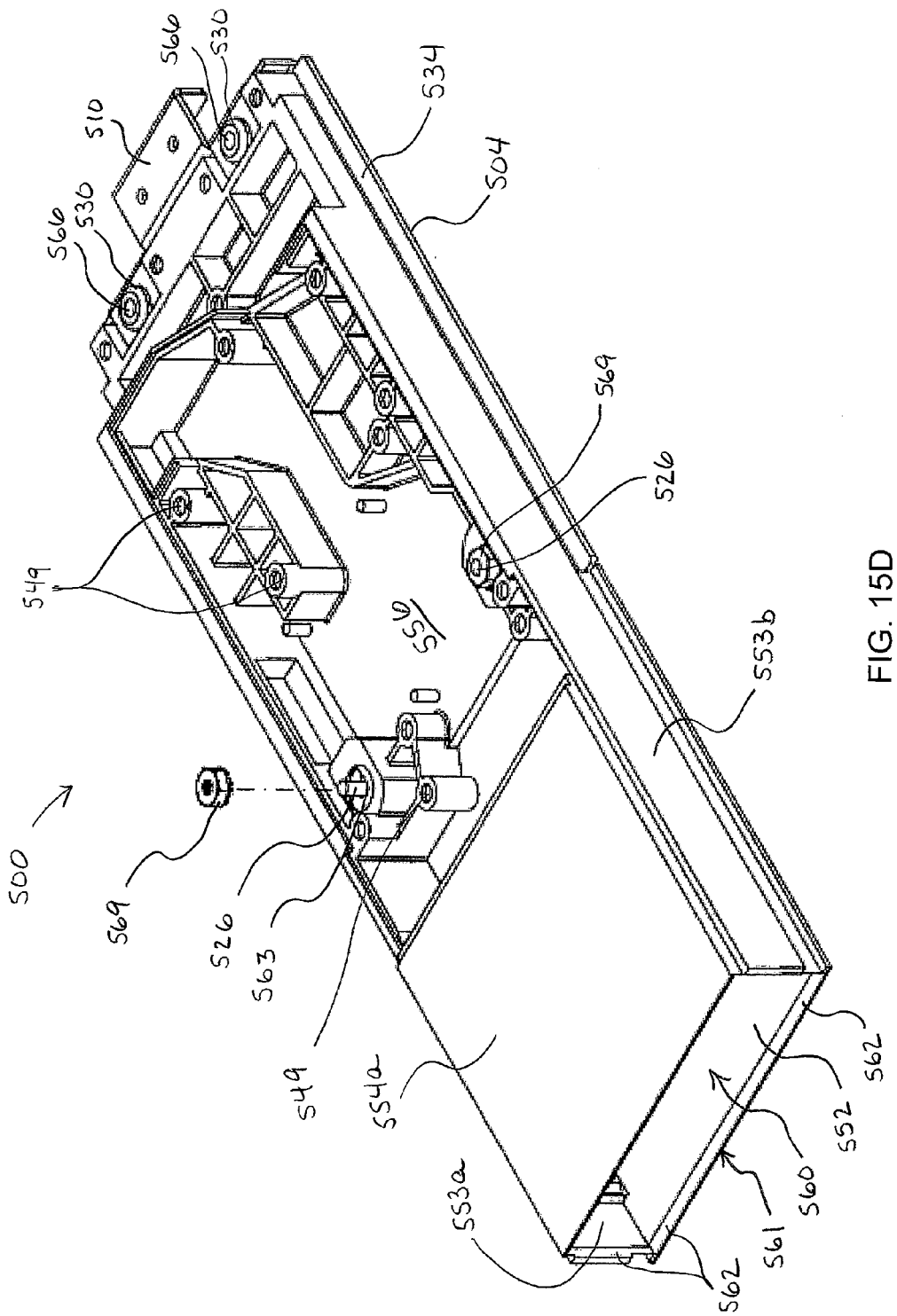

Referring to FIG. 14C, the housing 550 also includes a pair of contact pins 566 disposed along a second end 567 of the housing 550. The contact pins 566 are sized to engage the grommets 530 of the mounting plate assembly 502. The housing 550 is mounted to the mounting plate assembly 502 by first placing the grommets 530 around the contact pins 566, as shown in FIG. 15A. Then, the second end 567 of the housing 550 is aligned with the mounting plate 504 such that the contact pins 566 and grommets 530 are substantially aligned with the forked openings 532 in the flange member 508, as shown in FIG. 15B. When aligned properly, the male-female isolators 520 will sit at least partially within the counterbore recesses 564 (FIG. 14B). As illustrated in FIG. 15C, following alignment, the housing 550 is displaced relative to the mounting plate 504, as indicated by arrow 568, such that the grommets 530 and contact pins 566 come to rest with the forked openings 532 and such that the male threaded fasteners 526 extend through the through holes 563 and into the internal cavity 556. As shown in FIG. 15D, with the grommets 530 and contact pins 566 disposed within the forked openings 532, and with the male threaded fasteners 526 of the isolators 520 extending into the internal cavity 556, threaded nuts 569 are fastened to the male threaded fasteners 526 thereby providing a secure mechanical connection between the housing 550 and the mounting plate assembly 502.

As shown in FIG. 16, the rear portion 557 of the internal cavity 556 houses a connection interface board 570, which carries the connection interface circuit 182 (FIGS. 9 and 10). The connection interface board 570 extends between the test compartment 560 and the second end 567 of the housing 550. A plurality of electrical connectors 572 are disposed along a distal end 573 of the connection interface board 570. The electrical connectors 572 provide for electrical communication between the connection interface circuit 182 and the test electronics 160 (e.g., self test system 180 and/or functional test system 190) in the associated test rack 100. The connection interface board 570 also includes a test slot connector 574, arranged at a proximal end 575 of the connection interface board 570, which provides for electrical communication between the connection interface circuit 182 and a disk drive 600 in the test slot 500. As shown in FIG. 16, the test slot housing 550 can also include a ducting conduit 540 disposed within the internal cavity 556. The ducting conduit 540 is configured to convey an air flow from the inlet aperture 551, i.e., from a source external to the housing 550, towards the test compartment 560. The ducting conduit 540 is configured to direct an air flow underneath a disk drive 600 disposed within the test compartment 560, with a return air flow to flow over the disk drive 600 and back towards the outlet aperture 555. An electric heating assembly 726 is disposed within a first opening 542 in the ducting conduit 540 and is configured to heat an air flow being conveyed through the ducting conduit 540. The electric heating assembly 726 includes a heater heatsink 728 and an electric heating device (e.g., an resistive heater 729). The resistive heater 729 is electrically connected to the connection interface board 570, and is configured for electrical communication with the test electronics 160 (e.g., via the connection interface circuit 182). The resistive heater 729 is operable to convert an electric current (e.g., provided by the test electronics 160) into heat energy, which is used for heating the heater heatsink 728, which, in turn, is used to heat an air flow passing through the ducting conduit 540. In the absence of a disk drive 600 and a disk drive transporter 400, the housing 500 carries substantially no moving parts. A detailed description of the electric heating assembly 726 and other details and features combinable with those described herein may be found in the following U.S. patent application filed concurrently herewith, entitled "Temperature Control within Disk Drive Testing Systems, inventor: Brian Merrow, and having assigned Ser. No. 12/105,103., the entire contents of which are hereby incorporated by reference.

Figure 17:
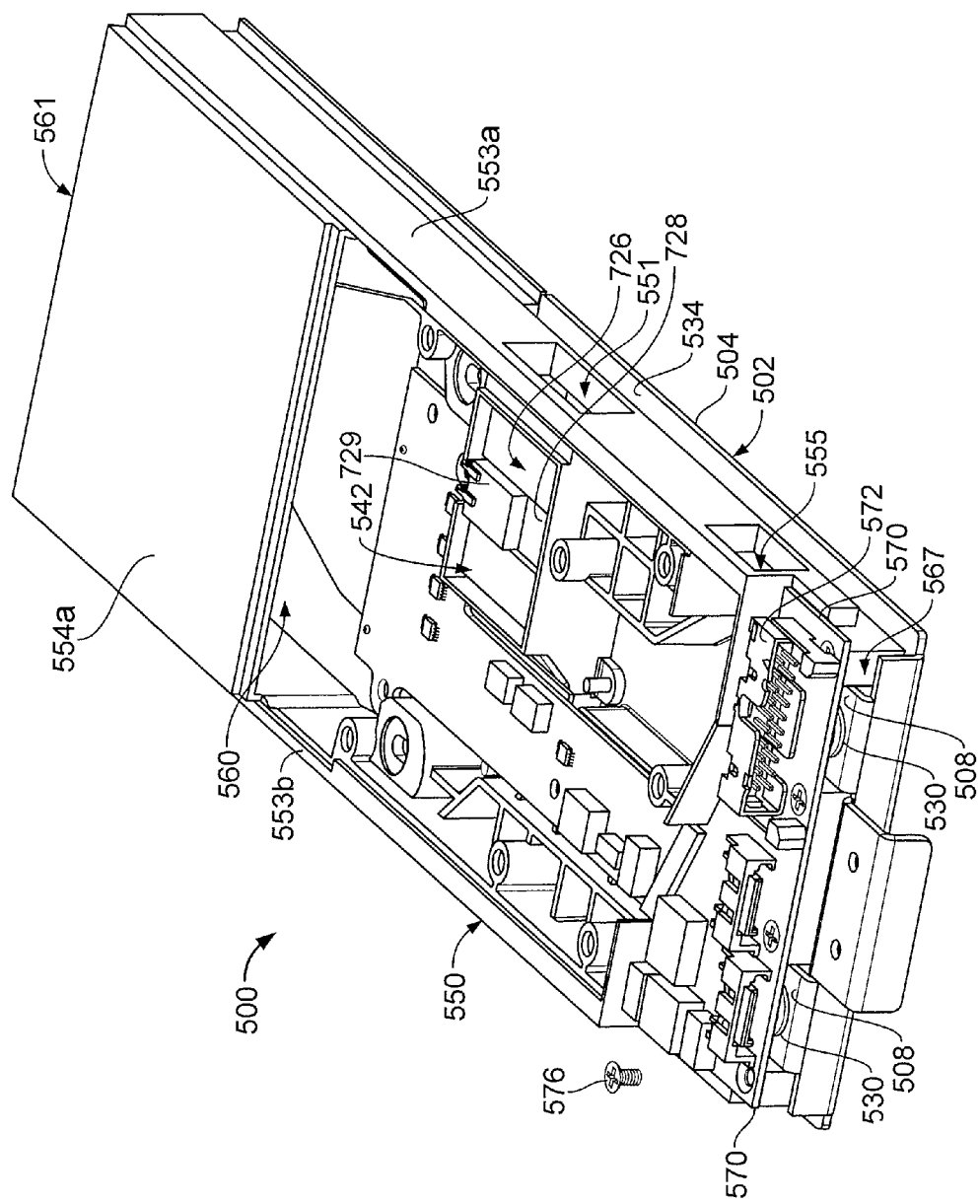

As shown in FIG. 17, the connection interface board 570 overlaps the grommets 530 along the second end 567 of the housing 550, thereby sandwiching the grommets 530, or at least a portion thereof, between the flange member 508 and the connection interface board 570. The connection interface board 570 is fastened to the housing 550, e.g., with fasteners 576, in such a manner as to preload the grommets 530. The grommets 530 are mechanically preloaded to achieve optimum performance of resistance to vibration and shock. Optimum performance of vibration and shock is generally achieved with up to 5 percent preloading of the grommets 530.

Figure 18:
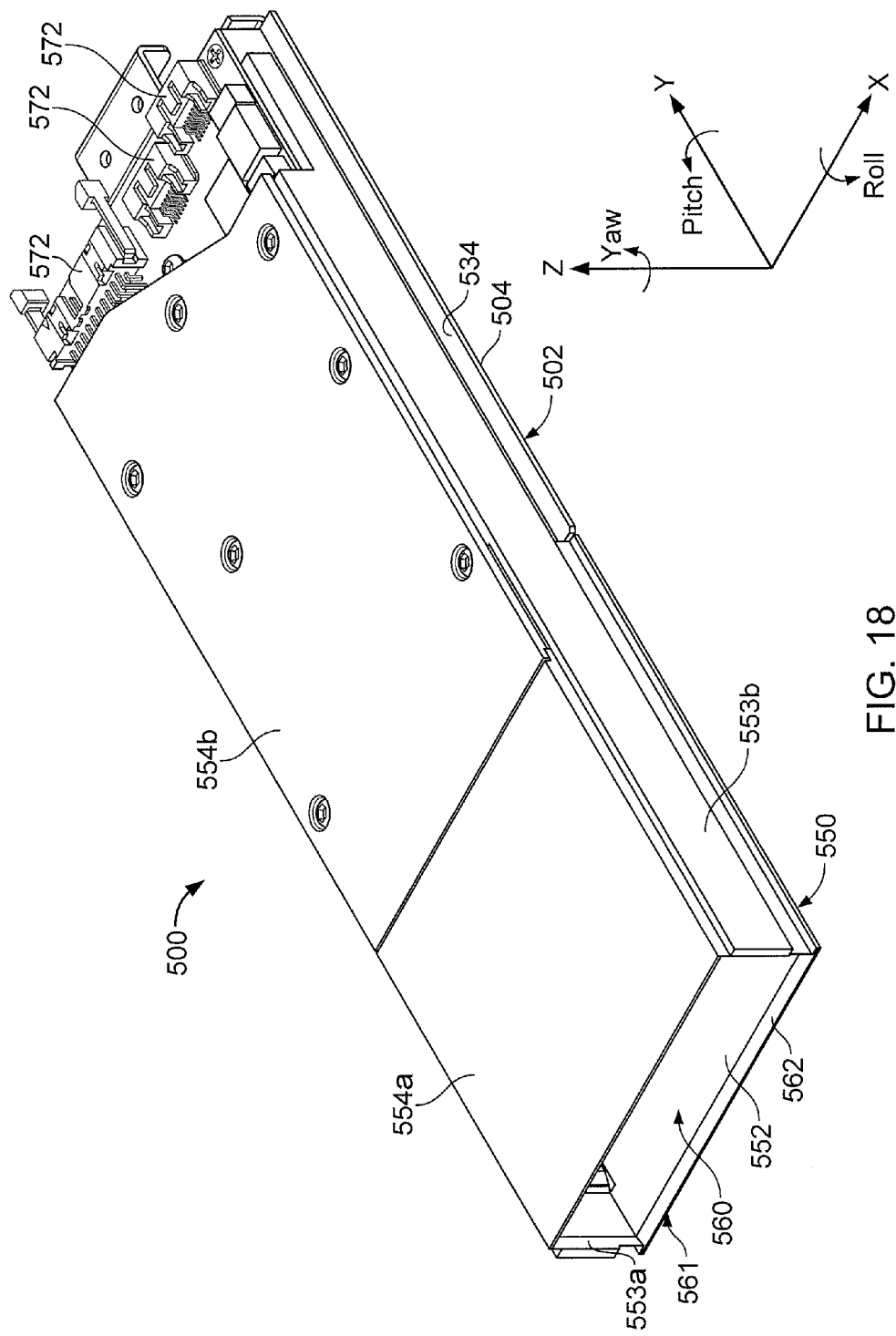
FIG. 18 is a perspective view of a test slot showing a rear portion of the test slot housing enclosed by a cover.

Referring to FIG. 18, once assembled, the male-female isolators 520 (FIG. 12) permit movement of the housing 550 relative to the mounting plate 504 all six-degrees of freedom (i.e., X, Y, Z, Roll, Pitch and Yaw). The grommets 530 are substantially constrained, within the forked openings 532, in all directions except for the negative Y-direction. As shown in FIG. 20A, the grommets 530 and forked openings 532 effectively form a pair of floating contacts (one shown in FIG. 20A), i.e., first and second floating contacts 580*a*, 580*b* (see, e.g., FIG. 19), about which the housing can move (e.g., in a rocking motion) relative to the mounting plate 504.

Figure 19:
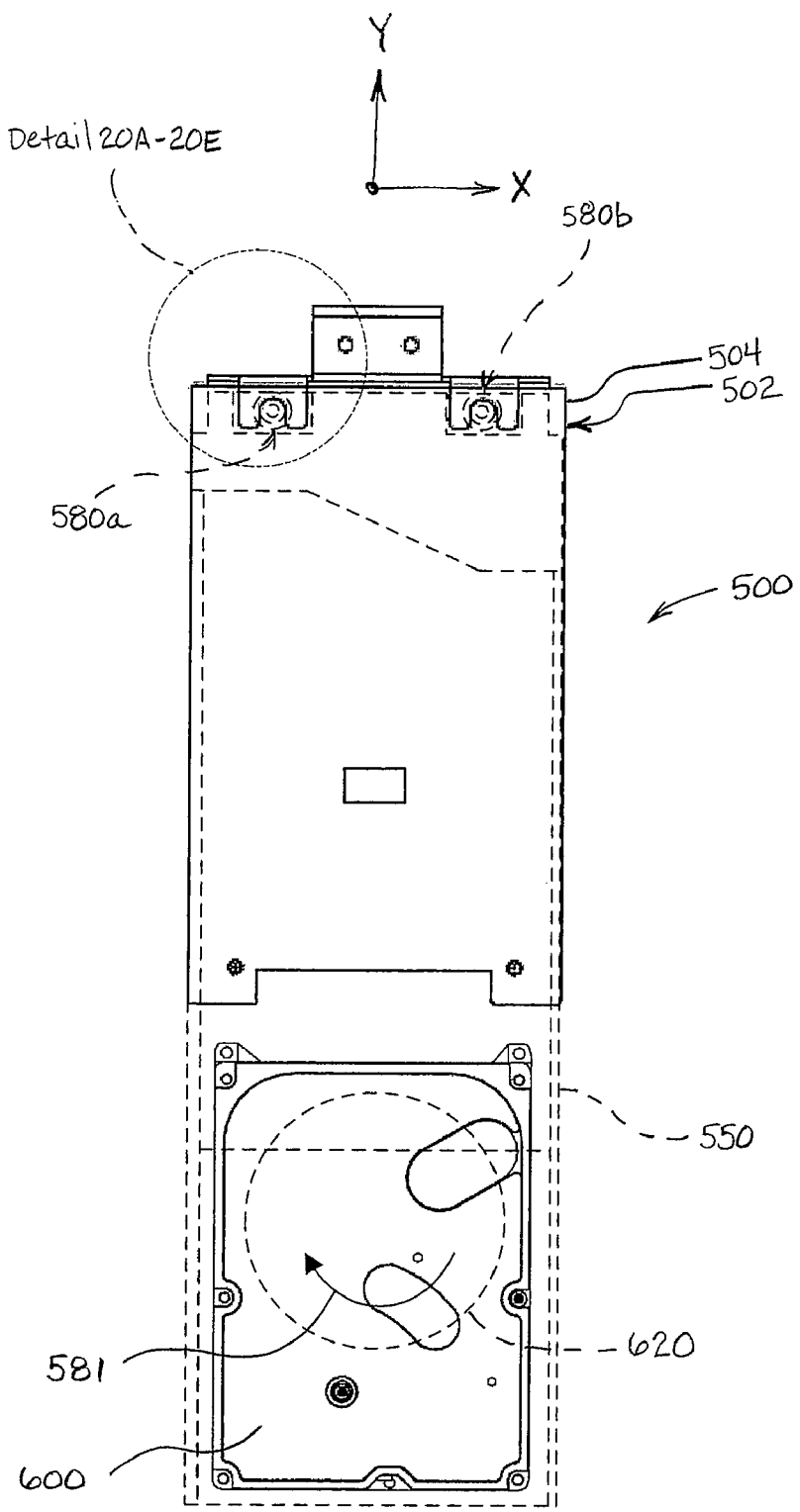
FIG. 19 is plan view of a test slot with a disk drive therein.
Figure 20B:
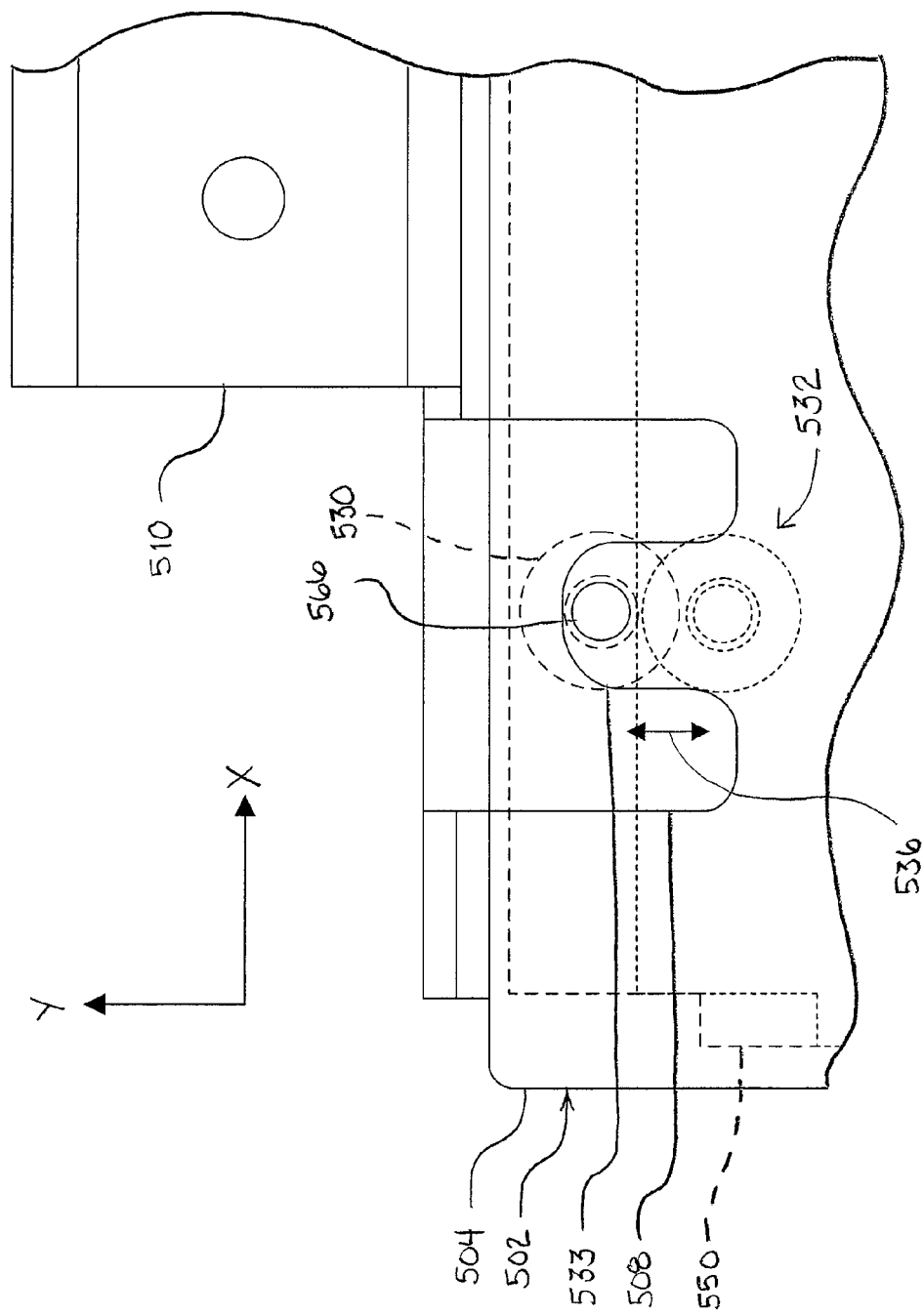
Figure 20C:
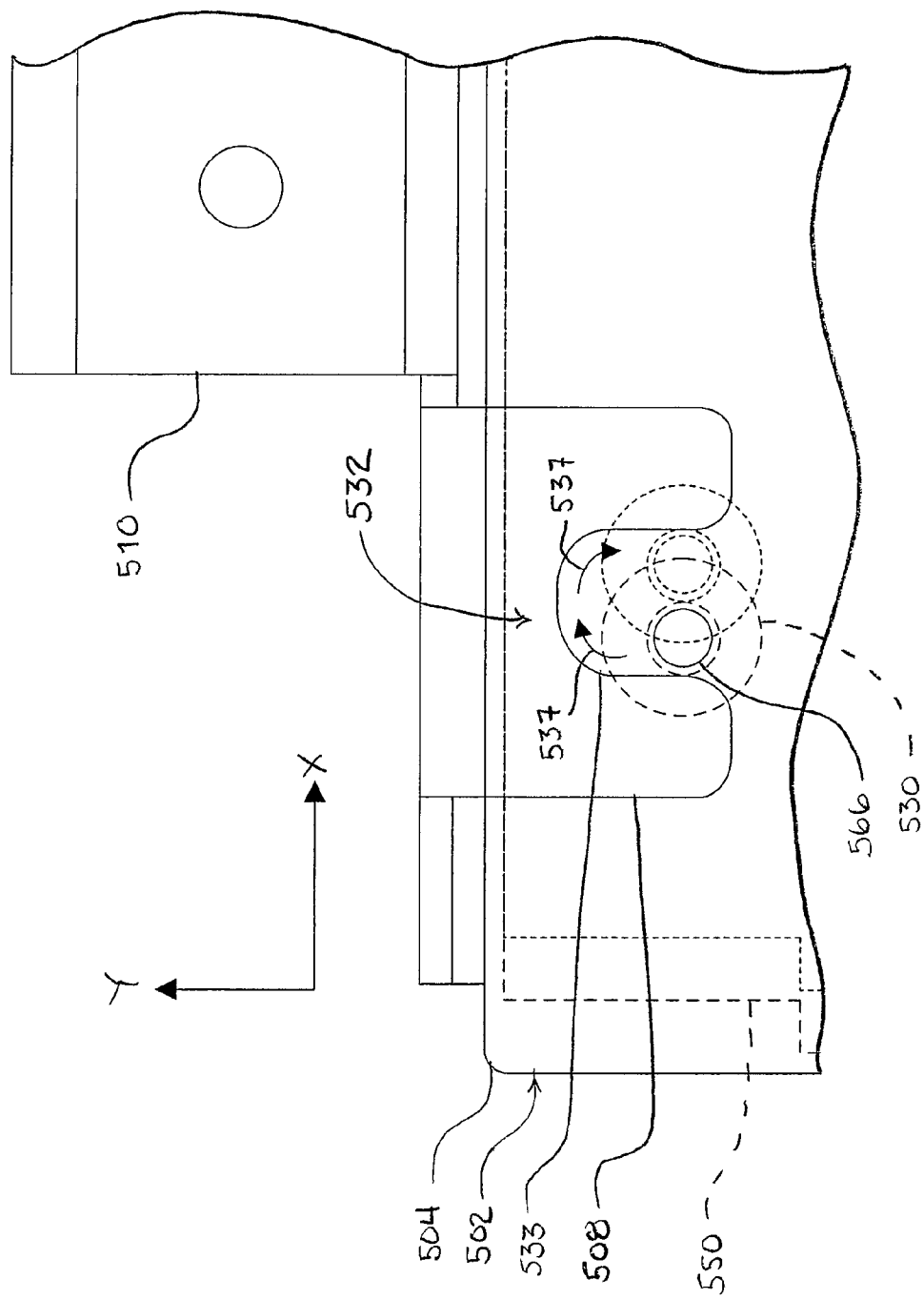
Figure 20D:
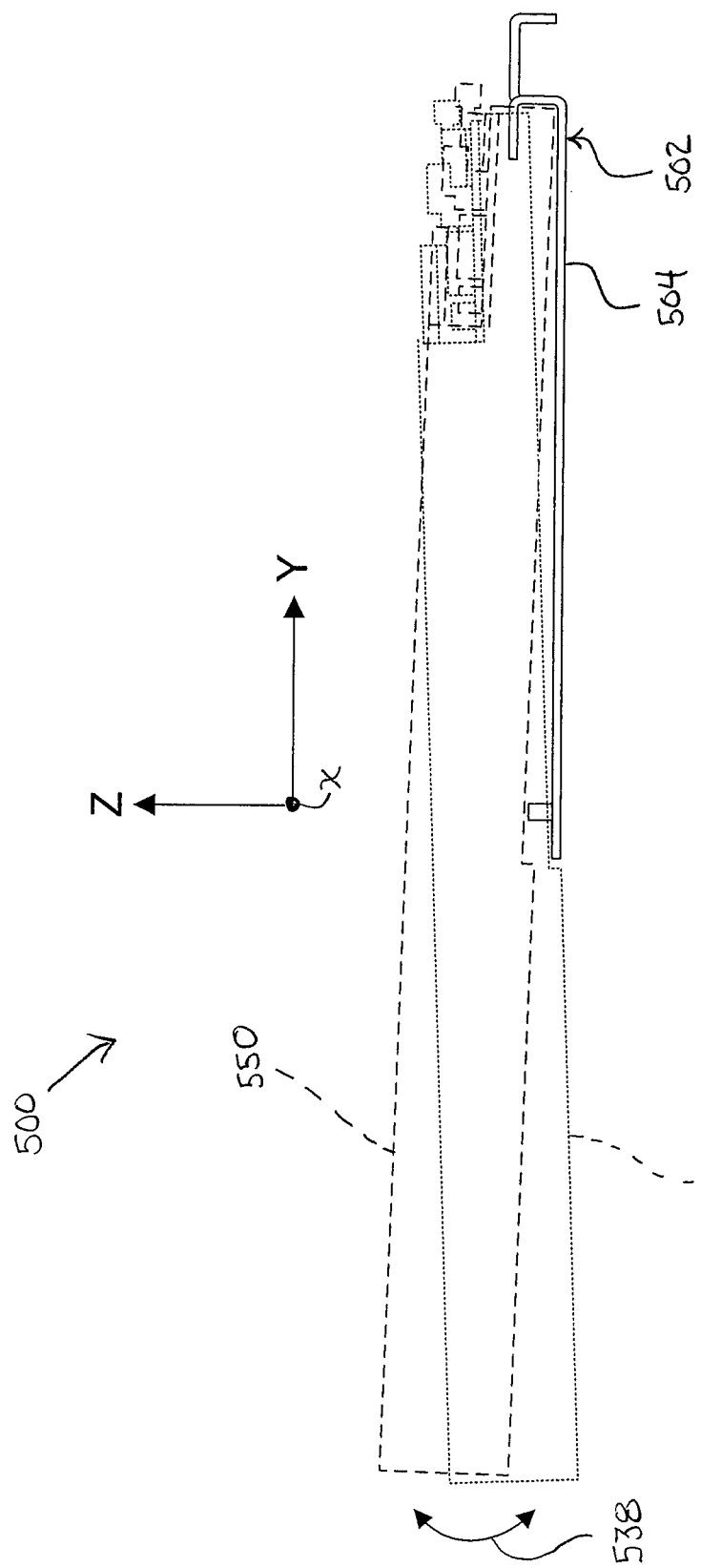
Figure 20E:
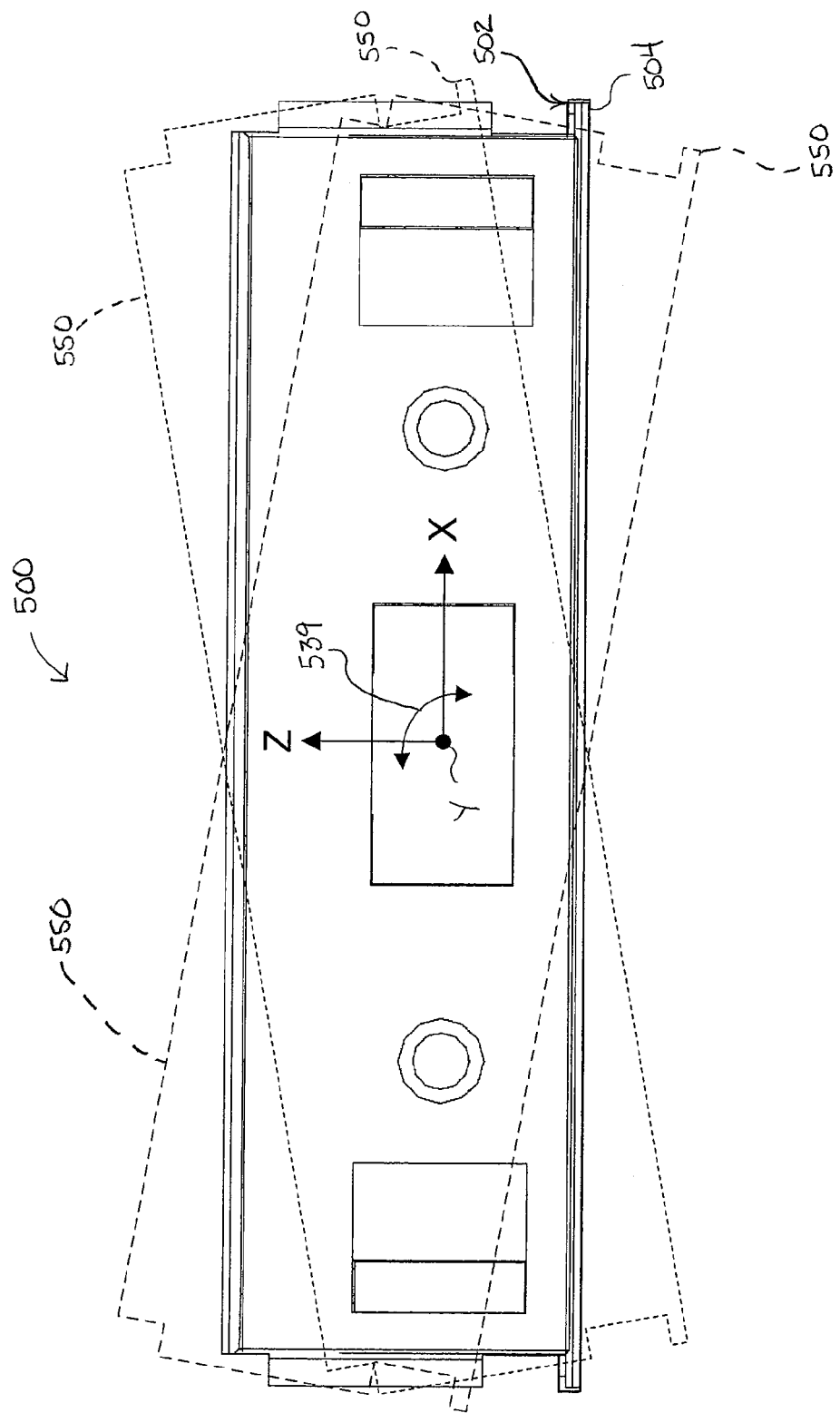
Figure 20F:
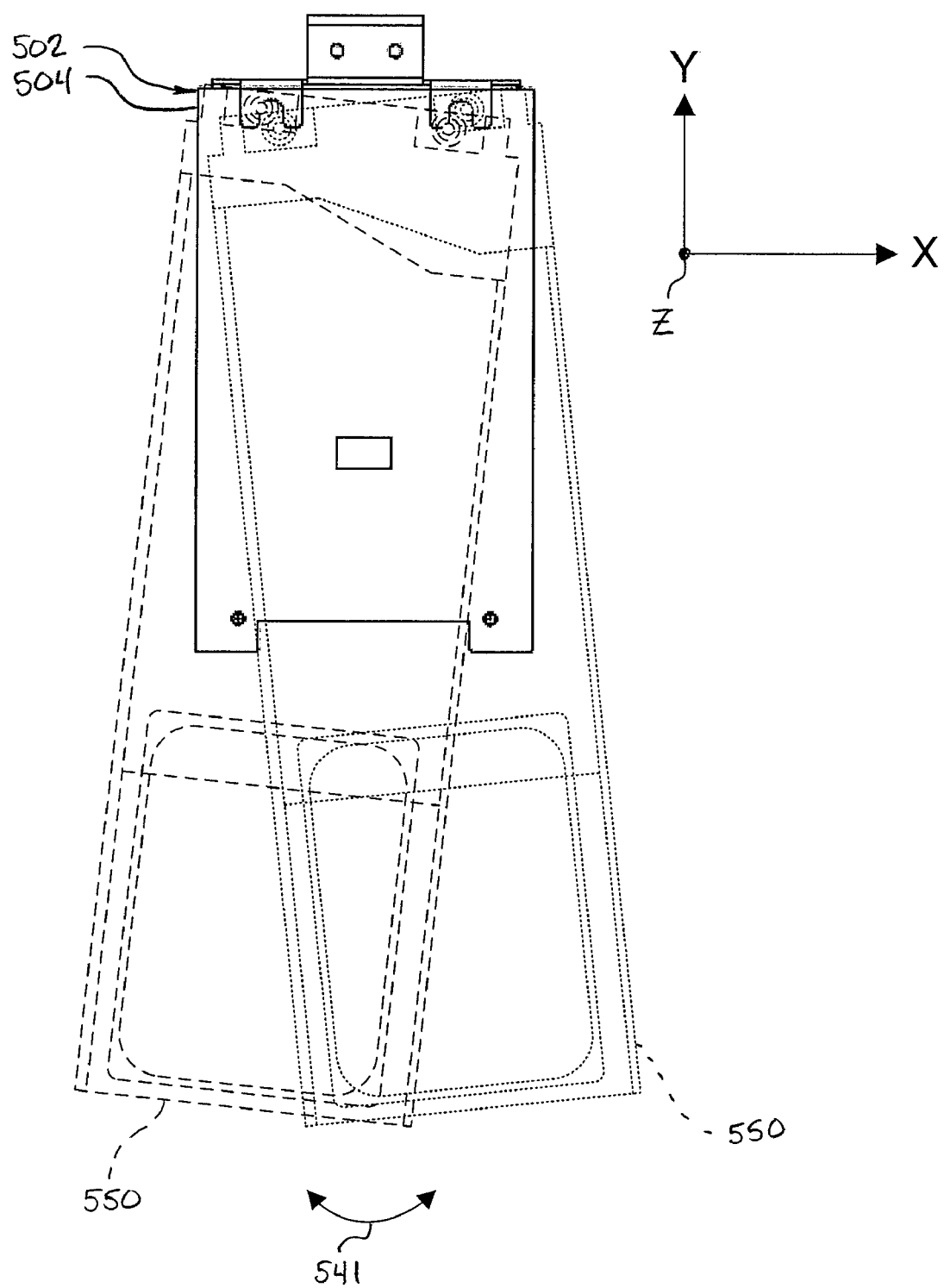

Referring to FIG. 19, vibrations often arise as a result of the rotation, as indicated by arrow 581, of a disk 620 (e.g., a magnetic disk) within the disk drive 600. As a result, during testing, rotation of a disk 620 and head movements in the disk drive 600 being tested induces movements of the housing 550. As illustrated in FIGS. 20A-20C, this arrangement allows the grommets 530 and contact pins 566 to move within the corresponding forked opening 532 (see also FIG. 12), thereby allowing a displacement of a position of the housing 550 relative to the mounting plate 504. In particular, the grommets 530 can travel in linear motions, e.g., side-to-side along the X-axis (as indicated by arrow 535 in FIG. 20A) and/or front-to-back along the Y-axis (as indicated by arrow 536 in FIG. 20B) within the forked openings 532. The grommets 530 can also travel along the edge 533 of the corresponding forked opening 532, as indicated by arrows 537 in FIG. 20C. This, together with the pliable nature of the grommets 530 and isolators 520, allows for a displacement of position of the housing 550 relative to the mounting plate 504 as well as rotation of the housing 550 relative to the mounting plate 504. For example, as illustrated in FIGS. 20D-20F, respectively, this construction allows the housing 550 to rotate, relative to the mounting plate 504, along or about the X-axis (as indicated by arrow 538 in FIG. 20D), the Y-axis (as indicated by arrow 539 in FIG. 20E), and/or the Z-axis (as indicated by arrow 541 in FIG. 20F). The result is a complex motion of the housing 550 relative to the mounting plate 504 which encompasses all the movements shown and described with regard to FIGS. 20A-20F. This compliance serves to inhibit transmission of vibration from one of the test slots 500 to other, neighboring test slots 500. There is, however, no single constraint in the illustrated construction that would restrict any possible motion of the housing 550 relative to the mounting plate 504 to one of rotation around any particular axis or around any fixed point.

Figure 21A:
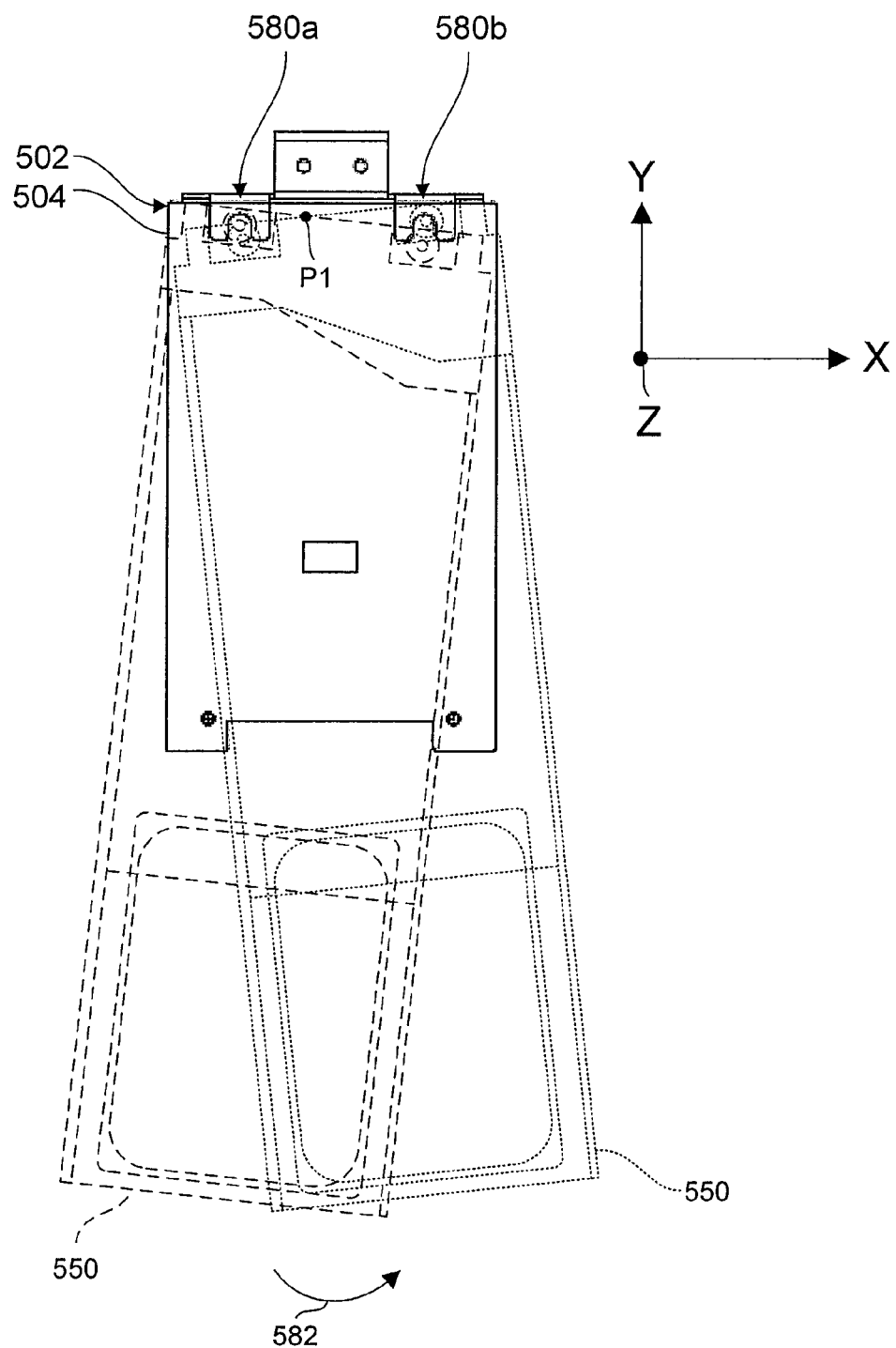
FIGS. 21A-21C illustrate movements of a floating center of the housing.
Figure 21B:
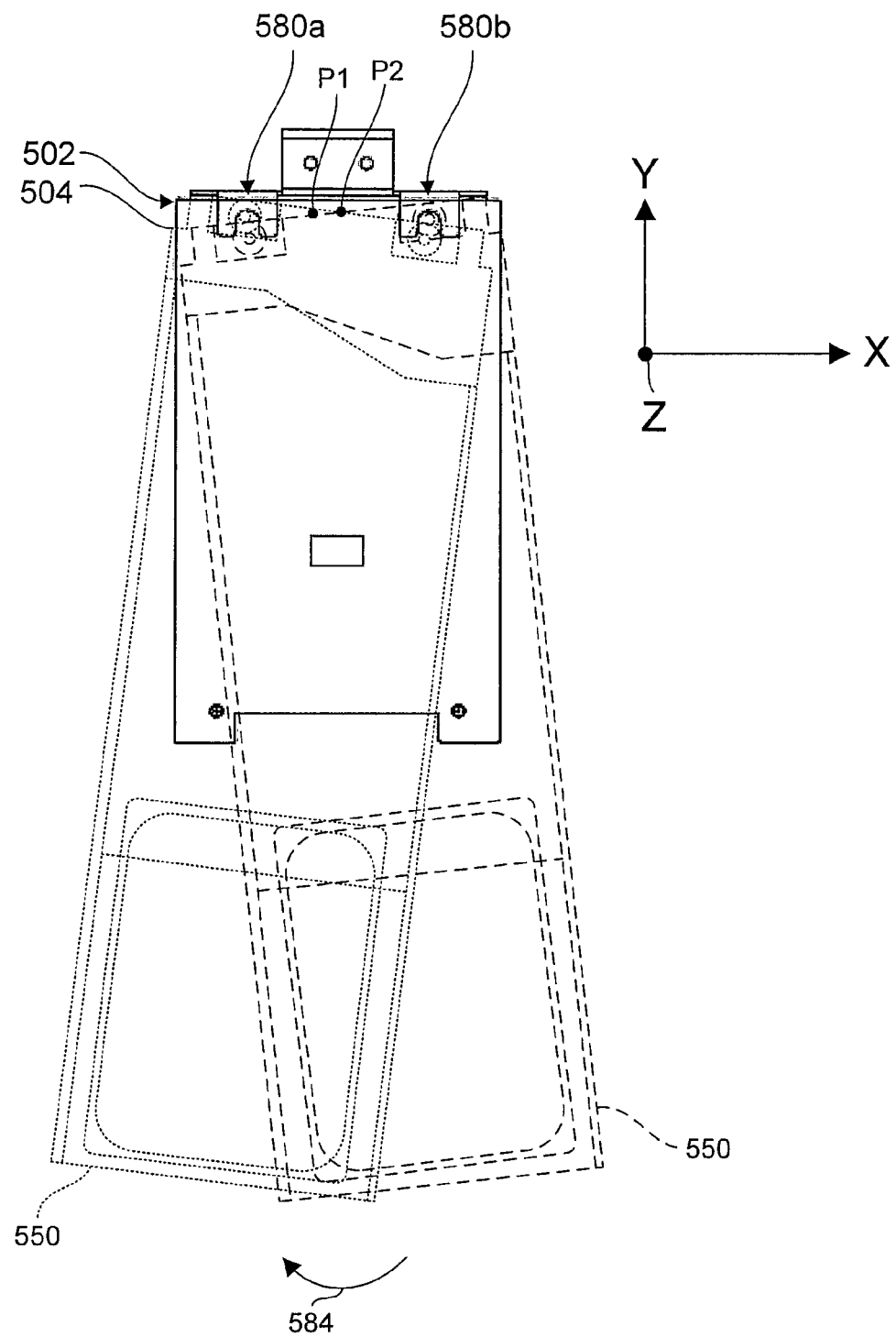
Figure 21C:
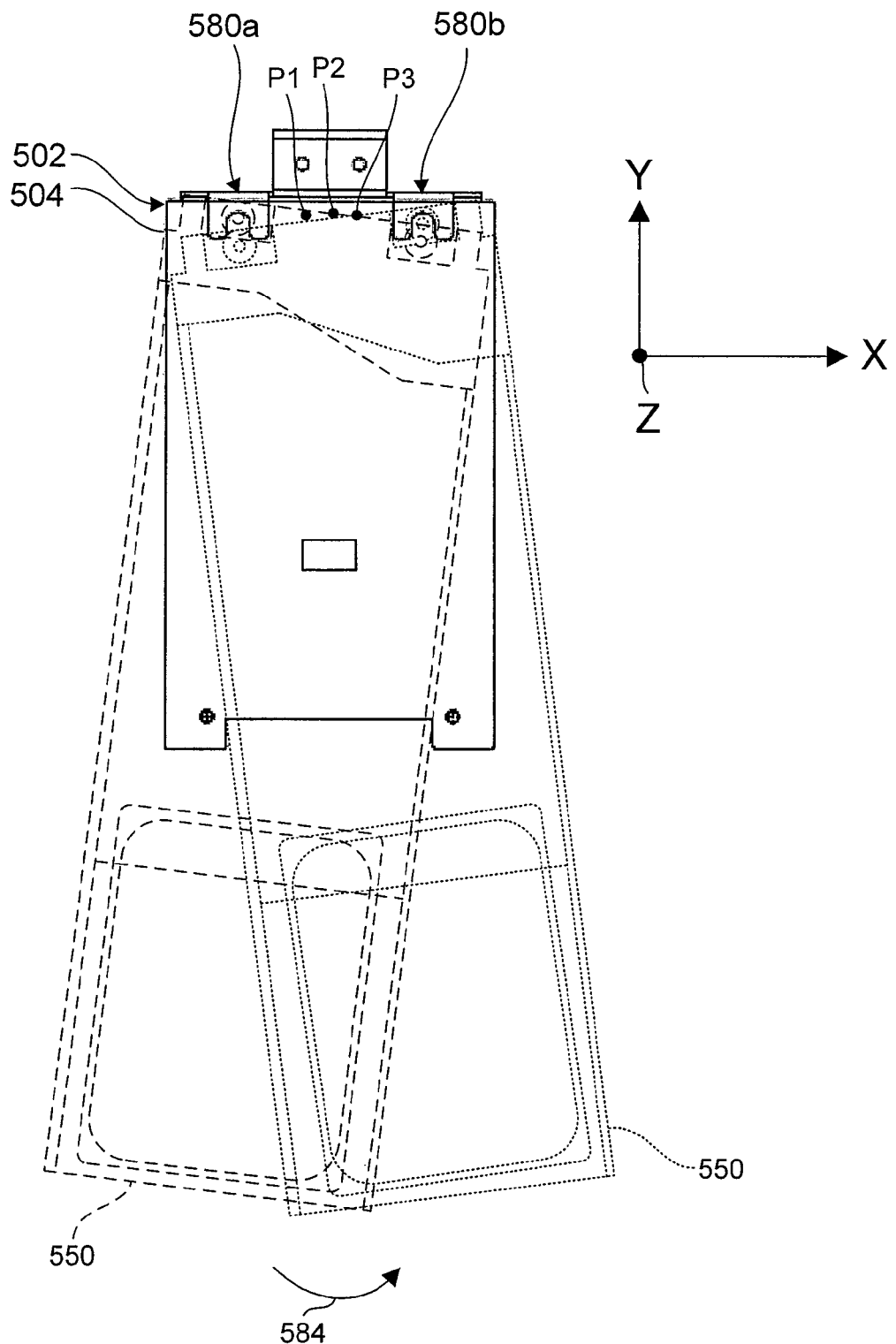

For example, FIGS. 21A-21C illustrate how, in the X-Y plane, there exists no single or fixed center of rotation as the center of rotation assumes a floating position as the housing 550 oscillates rotationally along or about the Z-axis, due in part to translational movements of the housing 550 relative the to the mounting plate 504 along or about the X and Y-axes. As illustrated in FIGS. 21A-21C, as the housing 550 rocks back-and-forth as indicated by arrows 582 (FIG. 21A), 584 (FIG. 21B), and 586 (FIG. 21C) between the first and second floating contacts 580a, 580b, the center of rotation of the housing 550 shifts from a first point P1 (shown in FIG. 21A), to a second point P2 (shown in FIG. 21B), and then to a third point P3 (shown in FIG. 21C) and so on. Movement of the housing 550 relative to the mounting plate 504 can be further realized by rotation of the housing 550 along or about the X and/or Y-axes (illustrated in FIGS. 20D and 20E, respectively) with the result being a rotational movement that floats in three dimensions.

Figure 22A:
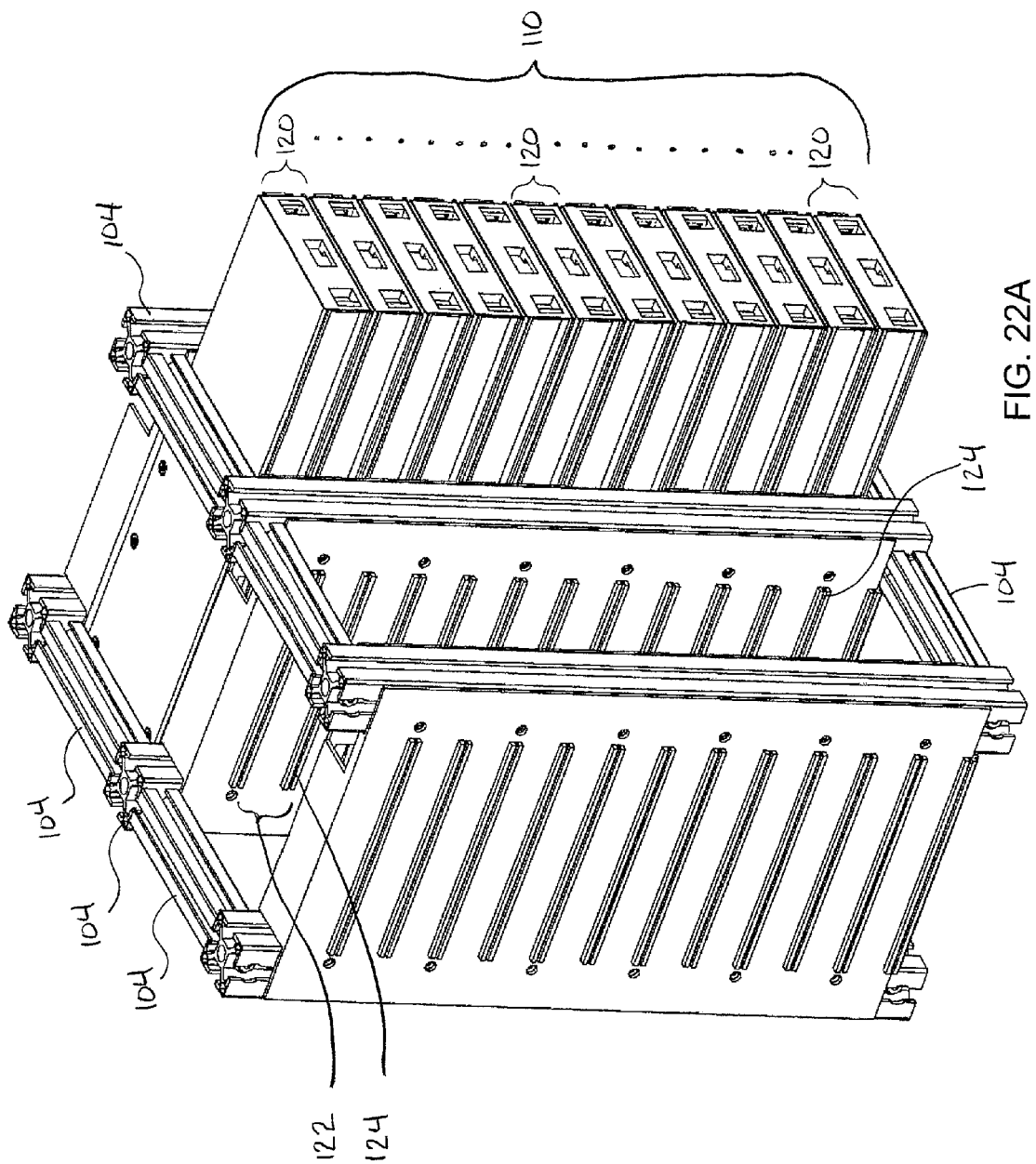
FIGS. 22A-22D illustrate the mounting of test slots within a slot bank of a test rack.
Figure 22B:
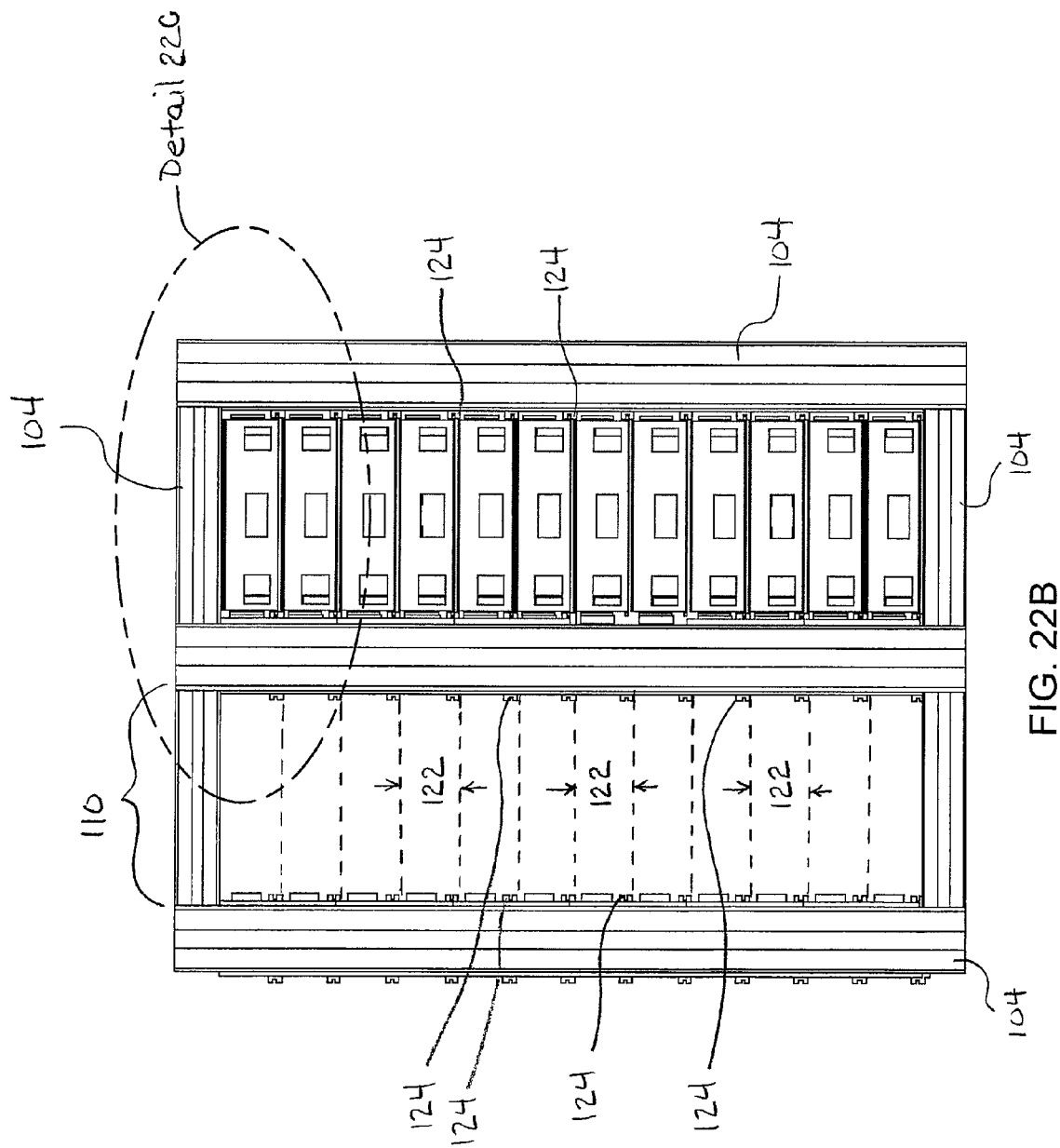
Figure 22C:
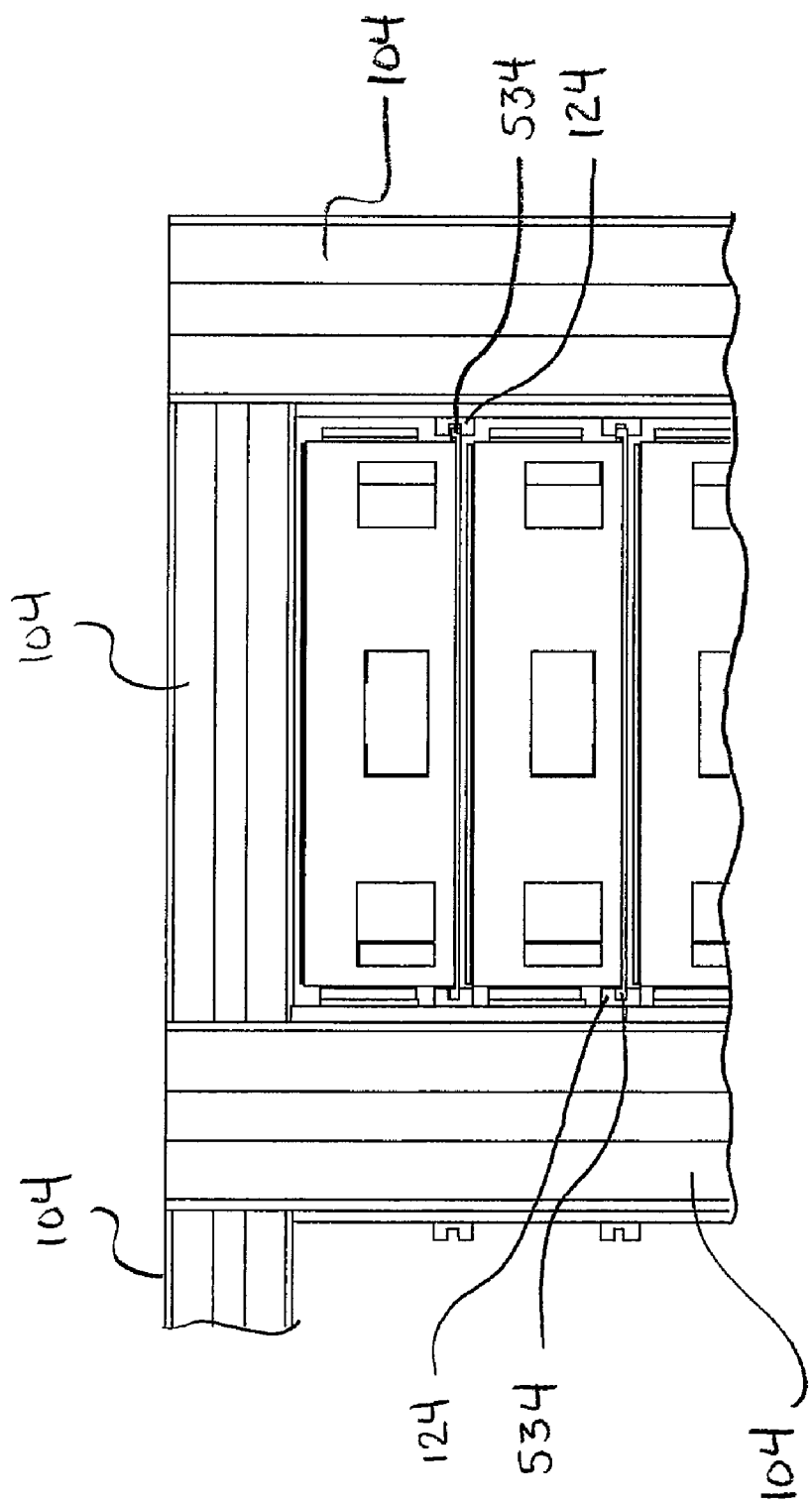
Figure 22D:
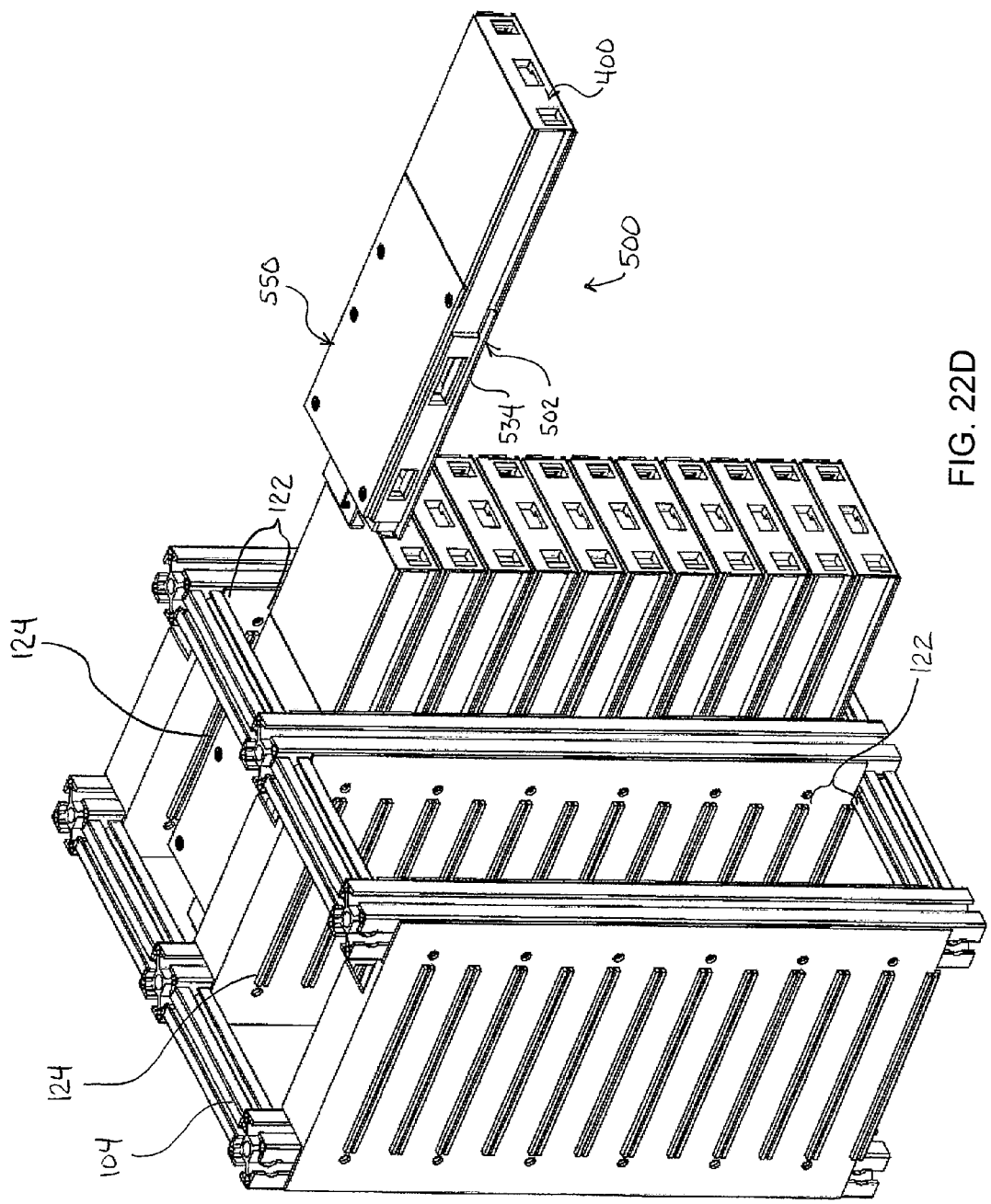

Moreover, by constraining the grommets 530 and contact pins 566 in the positive Y-direction, the flange members 508 also provide a set of fixed surfaces against which the housing can abut during the insertion of a disk drive transporter 400 (with or without a disk drive 600 therein) into the test compartment 560 of the housing 550 without the opportunity for rotation within the test housing. As illustrated in FIGS. 22A-22C, each of the slot banks 110 includes a plurality of test slot receptacles 122 each of which is configured to receive and support one of the test slots 500. Each of the test slot receptacles 122 includes a pair of card guide assemblies 124. The card guide assemblies 124 are sized to receive the mounting flanges 534 (see, e.g., FIG. 18) of the mounting plate 504 therein. The card guide assemblies 124 can include, for example, cam locks or thumbscrews, to provide a mechanical connection between the card guide assemblies 124 and the mounting plate assemblies 502, thereby tying the mounting plate assemblies 502 to ground. Since the card guide assemblies 124 engage only the mounting plate assembly 502, and not the test slot housing 550, the housing 550 can move not only relative to the respective mounting plate 504 but also relative to the test rack chassis 102. In this manner, the mounting plate assemblies 502 operate to support isolation, via the isolators (e.g., male-female isolators 520 and grommets 530), between the test rack chassis 102 and the respective test slots 500 and there is no rigid connection between the two. As a result, the transfer of vibrations from one test slot 500 to other test slots 500 within a common test rack 100 is reduced. Such vibrations may, for example, emanate from the rotation of a disk drive 600 within one the test slots 500 or from the insertion and/or removal of a disk drive transporter 400 (with or without a disk drive 600 therein) to and/or from one of the test slots 500. Vibrations originating within the test racks 100 themselves, e.g., as a result of the rotation of cooling fans within the test racks 100, are also isolated or damped before reaching the individual test compartments 560 within the test slots 500. This construction also allows for the individual insertion and removal of the test slots 500 to and from the test racks 100, as illustrated by FIG. 22D.

Other details and features combinable with those described herein may be found in the following U.S. patent applications filed Dec. 18, 2007, entitled "DISK DRIVE TESTING", inventors: Edward Garcia et al., and having assigned Ser. No. 11/958,817; and "DISK DRIVE TESTING", inventors: Edward Garcia et al., and having assigned Ser. No. 11/958,788. Other details and features combinable with those described herein may also be found in the following U.S. patent applications filed concurrently herewith, entitled "Disk Drive Emulator And Method Of Use Thereof", inventors: Edward Garcia, and having assigned Ser. No. 12/104,594; "Transferring Disk Drives Within Disk Drive Testing Systems", inventors: Evgeny Polyakov et al., and having assigned Ser. No. 12/104,536; "Temperature Control within Disk Drive Testing Systems", inventor: Brian Merrow, and having assigned Ser. No. 12/105,061; "Bulk Feeding Disk Drives To Disk Drive Testing Systems", inventors: Scott Noble et al., and having assigned Ser. No. 12/104,869; "Dependent Temperature Control within Disk Drive Testing Systems", inventors: Brian Merrow et al., and having assigned Ser. No. 12/105,069; "Enclosed Operating Area for Disk Drive Testing Systems", inventor: Brian Merrow, and having assigned Ser. No. 12/105,041; and "Temperature Control within Disk Drive Testing Systems", inventor: Brian Merrow, and having assigned Ser. No. 12/105,107. The entire contents of all of the aforementioned patent applications are hereby incorporated by reference.

A number of implementations have been described. Nevertheless, it will be understood that various modifications may be made without departing from the spirit and scope of the disclosure. Accordingly, other implementations are within the scope of the following claims.

What is claimed is:
1. A disk drive test slot comprising:
   a housing defining:
      a test compartment for receiving and supporting a disk drive transporter carrying a disk drive for testing, and
      an open end providing access to the test compartment for insertion and removal of the disk drive transporter carrying the disk drive for testing;
   a mounting plate connected to the housing; and
   one or more isolators disposed between the housing and the mounting plate, said one or more isolators being operable to inhibit transmission of vibrational energy between the housing and the mounting plate, wherein the one or more isolators are displaceable in a negative Y direction relative to flange members that are U-shaped or fork-shaped extending from the mounting plate, the flange members being configured to engage respective second isolators;
   wherein a main body member associated with the mounting plate comprises one or more self-clinching studs connecting the main body member to at least one of the one or more isolators.
2. A disk drive test slot comprising:
   a housing defining:
      a test compartment for receiving and supporting a disk drive transporter carrying a disk drive for testing, and an open end providing access to the test compartment for insertion and removal of the disk drive transporter carrying the disk drive for testing;

a mounting plate connected to the housing; and one or more isolators disposed between the housing and the mounting plate, said one or more isolators being operable to inhibit transmission of vibrational energy between the housing and the mounting plate, wherein the one or more isolators are displaceable in a negative Y direction relative to flange members that are U-shaped or fork-shaped extending from the mounting plate, the flange members being configured to engage respective second isolators;

wherein the one or more isolators comprise a male-female isolator.

3. The disk drive test slot of claim 2, wherein the male-female isolator comprises a body formed of urethane elastomer.

4. A disk drive test slot comprising:

a housing defining:

a test compartment for receiving and supporting a disk drive transporter carrying a disk drive for testing, and an open end providing access to the test compartment for insertion and removal of the disk drive transporter carrying the disk drive for testing;

a mounting plate connected to the housing; and one or more isolators disposed between the housing and the mounting plate, said one or more isolators being operable to inhibit transmission of vibrational energy between the housing and the mounting plate, wherein the one or more isolators are displaceable in a negative Y direction relative to flange members that are U-shaped or fork-shaped extending from the mounting plate, the flange members being configured to engage respective second isolators;

wherein the respective second isolators comprise respective grommets, and wherein the respective grommets are displaceable relative to the mounting plate.

5. The disk drive test slot of claim 4, wherein the housing comprises a plurality of contact pins each of which engage a corresponding one of the respective grommets.

6. The disk drive test slot of claim 5, wherein the contact pins are disposed at a first end of the housing opposite the open end.

7. The disk drive test slot of claim 4, wherein the mounting plate comprises:

a main body member;

wherein the flange members are connected to main body member and configured to receive and support the respective grommets.

8. The disk drive test slot of claim 7, wherein the flange members are configured to support the respective grommets in a position spaced apart from the main body member.

9. The disk drive test slot of claim 4, wherein the housing is connected to the respective grommets in such a manner as to preload the respective grommets.

10. The disk drive test slot of claim 4, wherein the respective grommets are formed of thermoplastic vinyl.

11. The disk drive test slot of claim 4, wherein the one or more isolators further comprise one or more male-female isolators disposed between the housing and the mounting plate.

12. The disk drive test slot of claim 4, wherein the one or more isolators comprise a plurality of said isolators each disposed between the housing and the mounting plate, wherein the plurality of isolators are each operable to inhibit transmission of vibrational energy between the housing and the mounting plate.

13. A disk drive testing system comprising:

a plurality of test slots, each test slot comprising:

a housing defining:

a test compartment for receiving and supporting a disk drive transporter carrying a disk drive for testing, and an open end providing access to the test compartment for insertion and removal of a disk drive transporter carrying a disk drive for testing, a mounting plate, and one or more isolators disposed between the housing and the mounting plate, said one or more isolators being operable to inhibit transmission of vibrational energy between the housing and the mounting plate, wherein the one or more isolators are displaceable in a negative Y direction relative to flange members that are U-shaped or fork-shaped extending from the mounting plate, the flange members being configured to engage respective second isolators; and a chassis defining a plurality of test slot receptacles each configured to receive and support one of the test slots, wherein the test slots are each independently removable from the chassis;

wherein, in the absence of a disk drive and a disk drive transporter, the test slot housing carries substantially no moving parts.

14. A disk drive testing system comprising:

a plurality of test slots, each test slot comprising:

a housing defining:

a test compartment for receiving and supporting a disk drive transporter carrying a disk drive for testing, and an open end providing access to the test compartment for insertion and removal of a disk drive transporter carrying a disk drive for testing;

a mounting plate assembly connected to the housing; and one or more isolators disposed between the housing and the mounting plate, said one or more isolators being operable to inhibit transmission of vibrational energy between the housing and the mounting plate, wherein the one or more isolators are displaceable in a negative Y direction relative to flange members that are U-shaped or fork-shaped extending from the mounting plate, the flange members being configured to engage respective second isolators; and a chassis defining a plurality of test slot receptacles each configured to receive and support one of the test slots, wherein each of the test slot receptacles comprises a corresponding card guide assembly configured to releasably engage one of the mounting plate assemblies;

wherein the test slots are each independently removable from the chassis.

15. A disk drive testing system comprising:

a plurality of test slots, each test slot comprising:

a housing defining:

a test compartment for receiving and supporting a disk drive transporter carrying a disk drive for testing, an open end providing access to the test compartment for insertion and removal of a disk drive transporter carrying a disk drive for testing; and a mounting plate assembly connected to the housing; and one or more isolators disposed between the housing and the mounting plate, said one or more isolators being operable to inhibit transmission of vibrational energy between the housing and the mounting plate, wherein the one or more isolators are displaceable in a negative Y direction relative to flange members that are U-shaped or fork-shaped extending from the mounting plate, the flange members being configured to engage respective second isolators; and a chassis defining a plurality of test slot receptacles each configured to receive and support one of the test slots, wherein each of the test slot receptacles comprises a corresponding card guide assembly configured to releasably engage one of the mounting plate assemblies;

wherein the mounting plate assemblies are operable to inhibit transmission of vibrational energy between the test slot housings and the chassis.

16. A disk drive testing system comprising:

a plurality of test slots, each test slot comprising:
    a housing defining:
        a test compartment for receiving and supporting a disk drive transporter carrying a disk drive for testing,
        an open end providing access to the test compartment for insertion and removal of a disk drive transporter carrying a disk drive for testing; and
    a mounting plate assembly connected to the housing; and
    one or more isolators disposed between the housing and the mounting plate, said one or more isolators being operable to inhibit transmission of vibrational energy between the housing and the mounting plate, wherein the one or more isolators are displaceable in a negative Y direction relative to flange members that are U-shaped or fork-shaped extending from the mounting plate, the flange members being configured to engage respective second isolators; and a chassis defining a plurality of test slot receptacles each configured to receive and support one of the test slots, wherein each of the test slot receptacles comprises a corresponding card guide assembly configured to releasably engage one of the mounting plate assemblies;

wherein the mounting plate comprises a mounting flange sized to fit within one of the corresponding card guide assemblies thereby providing a mechanical connection between the associated test slot and the chassis.

17. A disk drive testing system comprising:

a plurality of test slots, each test slot comprising:
    a housing defining:
        a test compartment for receiving and supporting a disk drive transporter carrying a disk drive for testing,
        an open end providing access to the test compartment for insertion and removal of a disk drive transporter carrying a disk drive for testing; and
    a mounting plate assembly connected to the housing; and
    one or more isolators disposed between the housing and the mounting plate, said one or more isolators being operable to inhibit transmission of vibrational energy between the housing and the mounting plate, wherein the one or more isolators are displaceable in a negative Y direction relative to flange members that are U-shaped or fork-shaped extending from the mounting plate, the flange members being configured to engage respective second isolators; and a chassis defining a plurality of test slot receptacles each configured to receive and support one of the test slots, wherein each of the test slot receptacles comprises a corresponding card guide assembly configured to releasably engage one of the mounting plate assemblies;

wherein the test slots are interchangeable with each other within the test slot receptacles.

18. A disk drive testing system comprising:

a plurality of test slots, each test slot comprising:
    a housing defining:
        a test compartment for receiving and supporting a disk drive transporter carrying a disk drive for testing, and
        an open end providing access to the test compartment for insertion and removal of a disk drive transporter carrying a disk drive for testing,
    a mounting plate, and
    one or more isolators disposed between the housing and the mounting plate, said one or more isolators being operable to inhibit transmission of vibrational energy between the housing and the mounting plate, wherein the one or more isolators are displaceable in a negative Y direction relative to flange members that are U-shaped or fork-shaped extending from the mounting plate, the flange members being configured to engage respective second isolators; and a chassis defining a plurality of test slot receptacles each configured to receive and support one of the test slots, wherein the test slots are each independently removable from the chassis.

19. A disk drive testing system comprising:

a plurality of test slots, each test slot comprising:
    a housing defining:
        a test compartment for receiving and supporting a disk drive transporter carrying a disk drive for testing, and
        an open end providing access to the test compartment for insertion and removal of a disk drive transporter carrying a disk drive for testing,
    a mounting plate, and
    one or more isolators disposed between the housing and the mounting plate, said one or more isolators being operable to inhibit transmission of vibrational energy between the housing and the mounting plate, wherein the one or more isolators are displaceable in a negative Y direction relative to flange members that are U-shaped or fork-shaped extending from the mounting plate, the flange members being configured to engage respective second isolators; and a chassis defining a plurality of test slot receptacles each configured to receive and support one of the test slots, wherein the test slots are each independently removable from the chassis;

wherein the test slot receptacles are each configured to releasably engage one of the test slot mounting plates thereby mechanically connecting the associated test slot to the chassis.

20. A disk drive testing system comprising:

a plurality of test slots, each test slot comprising:
    a housing defining:
        a test compartment for receiving and supporting a disk drive transporter carrying a disk drive for testing, and
        an open end providing access to the test compartment for insertion and removal of a disk drive transporter carrying a disk drive for testing,
    a mounting plate, and
    one or more isolators disposed between the housing and the mounting plate, said one or more isolators being operable to inhibit transmission of vibrational energy between the housing and the mounting plate, wherein the one or more isolators are displaceable in a negative Y direction relative to flange members that are U-shaped or fork-shaped extending from the mounting plate, the flange members being configured to engage respective second isolators; and a chassis defining a plurality of test slot receptacles each configured to receive and support one of the test slots, wherein the test slots are each independently removable from the chassis;

wherein the one or more isolators are operable to inhibit transmission of vibrational energy between the test slot housings and the chassis.

21. A disk drive testing system comprising:
a plurality of test slots, each test slot comprising:
   a housing defining:
      a test compartment for receiving and supporting a disk drive transporter carrying a disk drive for testing, and
      an open end providing access to the test compartment for insertion and removal of a disk drive transporter carrying a disk drive for testing,
   a mounting plate, and
   one or more isolators disposed between the housing and the mounting plate, said one or more isolators being operable to inhibit transmission of vibrational energy between the housing and the mounting plate, wherein the one or more isolators are displaceable in a negative Y direction relative to flange members that are U-shaped or fork-shaped extending from the mounting plate, the flange members being configured to engage respective second isolators; and
a chassis defining a plurality of test slot receptacles each configured to receive and support one of the test slots, wherein the test slots are each independently removable from the chassis;
wherein the one or more isolators comprise grommets.

22. A disk drive testing system comprising:
a plurality of test slots, each test slot comprising:
   a housing defining:
      a test compartment for receiving and supporting a disk drive transporter carrying a disk drive for testing, and
      an open end providing access to the test compartment for insertion and removal of a disk drive transporter carrying a disk drive for testing,
   a mounting plate, and
   one or more isolators disposed between the housing and the mounting plate, said one or more isolators being operable to inhibit transmission of vibrational energy between the housing and the mounting plate, wherein the one or more isolators are displaceable in a negative Y direction relative to flange members that are U-shaped or fork-shaped extending from the mounting plate, the flange members being configured to engage respective second isolators; and
a chassis defining a plurality of test slot receptacles each configured to receive and support one of the test slots, wherein the test slots are each independently removable from the chassis;
wherein the one or more isolators comprise male-female isolators.

23. A disk drive testing system comprising:
a plurality of test slots, each test slot comprising:
   a housing defining:
      a test compartment for receiving and supporting a disk drive transporter carrying a disk drive for testing, and
      an open end providing access to the test compartment for insertion and removal of a disk drive transporter carrying a disk drive for testing,
   a mounting plate, and
   one or more isolators disposed between the housing and the mounting plate, said one or more isolators being operable to inhibit transmission of vibrational energy between the housing and the mounting plate, wherein the one or more isolators are displaceable in a negative Y direction relative to flange members that are U-shaped or fork-shaped extending from the mounting plate, the flange members being configured to engage respective second isolators; and
a chassis defining a plurality of test slot receptacles each configured to receive and support one of the test slots, wherein the test slots are each independently removable from the chassis;
wherein, in the absence of a disk drive and a disk drive transporter, the test slot housings carry substantially no moving parts.

24. A disk drive testing system comprising:
a plurality of test slots, each test slot comprising:
   a housing defining:
      a test compartment for receiving and supporting a disk drive transporter carrying a disk drive for testing, and
      an open end providing access to the test compartment for insertion and removal of a disk drive transporter carrying a disk drive for testing,
   a mounting plate, and
   one or more isolators disposed between the housing and the mounting plate, said one or more isolators being operable to inhibit transmission of vibrational energy between the housing and the mounting plate, wherein the one or more isolators are displaceable in a negative Y direction relative to flange members that are U-shaped or fork-shaped extending from the mounting plate, the flange members being configured to engage respective second isolators; and
a chassis defining a plurality of test slot receptacles each configured to receive and support one of the test slots, wherein the test slots are each independently removable from the chassis;
wherein the test slots are interchangeable with each other within the test slot receptacles.

* * * * *